(12) United States Patent
Nakamura et al.

(10) Patent No.: US 7,289,802 B2
(45) Date of Patent: Oct. 30, 2007

(54) COMMUNICATION TERMINAL PERFORMANCE MEASUREMENT SYSTEM HAVING EFFECTIVE TRACE INFORMATION DISPLAY FUNCTION AND COMMUNICATION TERMINAL PERFORMANCE MEASUREMENT METHOD

(75) Inventors: Shoichi Nakamura, Atsugi (JP); Tsuyoshi Sato, Atsugi (JP); Hiroyuki Tsuda, Ebina (JP); Tsutomu Tokuke, Atsugi (JP); Hiroki Shiina, Atsugi (JP); Takashi Sakamoto, Atsugi (JP); Yoichi Katsuki, Atsugi (JP)

(73) Assignee: Anritsu Corporation, Atsugi-shi (JP)

( * ) Notice: Subject to any disclaimer, the term of this patent is extended or adjusted under 35 U.S.C. 154(b) by 176 days.

(21) Appl. No.: 10/554,568

(22) PCT Filed: Feb. 28, 2005

(86) PCT No.: PCT/JP2005/003322
§ 371 (c)(1),
(2), (4) Date: Oct. 25, 2005

(87) PCT Pub. No.: WO2005/086374
PCT Pub. Date: Sep. 15, 2005

(65) Prior Publication Data
US 2006/0270398 A1 Nov. 30, 2006

(30) Foreign Application Priority Data
Mar. 5, 2004 (JP) ............... 2004-062425

(51) Int. Cl.
*H04Q 7/20* (2006.01)
*H04B 1/38* (2006.01)
*H04B 7/00* (2006.01)
*H04M 1/29* (2006.01)

(52) U.S. Cl. ............. 455/423; 455/566; 455/425; 455/67.11; 455/67.14; 379/27.01; 379/29.01

(58) Field of Classification Search ............ 455/67.11, 455/425, 423, 67.14, 566; 379/27.01, 27.02, 379/29.01, 434
See application file for complete search history.

(56) References Cited

U.S. PATENT DOCUMENTS

| | | | | |
|---|---|---|---|---|
| 6,456,845 | B1* | 9/2002 | Drum et al. | 455/424 |
| 7,016,672 | B1* | 3/2006 | Lipsit | 455/425 |
| 2005/0075097 | A1* | 4/2005 | Lehikoinen et al. | 455/414.1 |

FOREIGN PATENT DOCUMENTS

| | | |
|---|---|---|
| EP | 1 355 504 A1 | 10/2003 |
| JP | 10-133916 A | 5/1998 |
| JP | 2002-344448 A | 11/2002 |
| JP | 2003-60735 A | 2/2003 |
| JP | 2003-177979 A | 6/2003 |

OTHER PUBLICATIONS

International Preliminary Report on Patentability and Written Opinion, Chapter I of the Patent Cooperation Treaty dated Dec. 7, 2006 for PCT/JP2005/003322, 5 sheets.
Signaling Tester "MD8470A" manufactured by Anritsu Corporation (Catalog No. MD8470A-E-A-1-(1.00) Printed in Japan 2004. 7W/CDT).

* cited by examiner

*Primary Examiner*—Edan Orgad
*Assistant Examiner*—Muhammad Akbar
(74) *Attorney, Agent, or Firm*—Frishauf, Holtz, Goodman & Chick, P.C.

(57) ABSTRACT

An acquisition section acquires trace information including a plurality of log information having information on contents and types of log information based on message information of test signals transmitted to a communication terminal and a series of reply signals from the communication terminals, and provides clock time information at which the respective message information have been acquired. The trace information including the plurality of log information, is displayed in predetermined formats. An indication bar display section displays an indication bar on which the plurality of log information are arranged in a time series based on the clock time at which the respective message information have been acquired. A log sequence display section displays a predetermined number of log information as log sequences having time stamps based on the clock time information at which the respective log information have been acquired, so as to be associated with the indication bar.

80 Claims, 27 Drawing Sheets

FIG. 9

IB setting

(1) IB division according to plural communication systems
  Yes ☐  No ☒

(1)-2 IB division according to up and down
  Yes ☐  No ☒

(2) How many U planes 1 line of IB is made from
  10 lines/1 pixel    1 line/1 pixel (3) How many off-lines 1 line of IB is made from
  10 lines/1 pixel    1 line/1 pixel  0

(4) How many seconds are regarded as off-line ?
  1s/1 line    10s/1 line (5) What IB is made to work with ?
  Trace acquisition Time stamps numbers ☒  ☐

---

Opt...
- LPIB setting
- Communication...
- Color layout s...
- Task bar setti...
- Search conditi...
- Trigger key s...

| Start | Stop | 12 |
|---|---|---|
| 1 | 00:00:00:00 | (Blue) |
| 2 | 00:00:00:02 | W1 (Blue) |
| 3 | 00:00:00:10 | G2 (Red) |
| 4 | 00:00:00:20 | G2 (Red) |
| 5 | 00:00:00:25 | G2 (Blue) |
| 6 | 00:00:00:37 | |
| 7 | 00:00:01:11 | |
| 8 | 00:00:01:15 | |
| 9 | 00:00:01:25 | |

COMMUNICATION TERMINAL PERFORMANCE MEASUREMENT SYSTEM HAVING EFFECTIVE TRACE INFORMATION DISPLAY FUNCTION AND COMMUNICATION TERMINAL PERFORMANCE MEASUREMENT METHOD

This application is a U.S. National Phase Application under 35 USC 371 of International Application PCT/JP2005/003322 filed Feb. 28, 2005.

TECHNICAL FIELD

The present invention relates to a performance measurement system for a communication terminal and a performance measurement method for a communication terminal, and in particular, to a performance measurement system for a communication terminal and a performance measurement method for a communication terminal by which it is possible for an operator to easily find objective log sequence information from a trace information group having an enormous information amount by providing an efficient trace information display function.

BACKGROUND ART

Accordingly, as a performance measurement system for a communication terminal to be provided for performance evaluation of a communication terminal under development as a product, for example, a mobile cellular phone, as shown in FIG. 26, a performance measurement system for a communication terminal has been known which is built up in such a manner that a communication terminal 21 for being evaluated is connected to one end of a test measuring instrument 22, and an evaluation device, for example, a terminal device 23 such as a personal computer is connected to the other end of the test measuring instrument 22.

In a case of such a performance measurement system for a communication terminal, the test measuring instrument 22 incorporates therein a circuit for executing various communication tests with the communication terminal 21 for being evaluated in a plurality of communication systems having communication protocols which are different from one another, which are concretely a W-CDMA (Wideband-Code Division Multiple Access) and a GSM (Global System for Mobile communication: Digital mobile cellular phone system).

Note that, as the communication systems, in addition to the above-described communication systems, for example, the following communication system and the like have been known.

cdma2000 (Code Division Multiple Access 2000)

TD-CDMA (Time Division-Code Division Multiple Access)

TD-SCDMA (Time Division-Synchronous Code Division Multiple Access)

Namely, the test measuring instrument 22 possesses a series of procedures for predetermined performance measurement corresponding to a plurality of communication systems in a state of connecting the communication terminal 21 for being evaluated, and is configured to transmit a series of test signals including predetermined message information along the procedures to the communication terminal 21 for being evaluated, and to receive a series of reply signals corresponding to the series of test signals for predetermined performance measurement from the communication terminal 21 for being evaluated.

In the performance measurement system for a communication terminal, by transmitting a series of test signals for performance measurement from the test measuring instrument 22 to the communication terminal 21 for being evaluated, and by receiving a series of reply signals from the communication terminal 21 for being evaluated at the test measuring instrument 22, a communication test is carried out between the measuring instrument 22 and the communication terminal 21, and trace information in the terminal device 23 for evaluation as a result of the communication test is stored as performance measurement data of the communication terminal 21 for being evaluated.

Then, the operator causes to display on a display screen the trace information as the performance measurement data of the communication terminal 21 for being evaluated stored in the terminal device 23 for evaluation, and evaluates the performance of the communication terminal 21 for being evaluated by analyzing the contents thereof.

Further, as a testing device for a mobile cellular phone, a testing device for carrying out a ciphering test for a W-CDMA system mobile terminal is disclosed in the following Pat. Document 1 by the same applicant as in the present application.

In the testing device disclosed in the Pat. Document 1, as shown in FIG. 27, the flow of communication information is displayed so as to include the internal detailed flow at the testing time.

Pat. Document 1: EP 1 355 504 A1.

However, in the testing device disclosed in the Pat. Document 1 described above, as shown in FIG. 27, communication information corresponding to Config (configuration) denoting various configuration information inside the measuring instrument 22 on call starting and U plane (user plane) denoting data of a user are displayed over a plurality of lines, and it is difficult for an operator to acquire desired log sequence information because the displayed information are superbtle.

In order to solve the problem, only decode information on scenario messages may be displayed as communication information on the display screen.

However, in this case, the operator has to search for the decode information by trial and error after acquiring the trace information, and when there are an enormous amount of trace information, it is difficult to find which point desired information is at.

Accordingly, also in a case where only decode information on scenario messages are displayed as communication information on the display screen, it is difficult for the operator to easily find desired log sequence information from among enormous trace information as in the testing device in the Pat. Document 1 described above.

Then, as current mobile cellular phones, there are a plurality of communication systems, such as W-CDMA and GSM, having communication protocols which are different from one another, and it is possible to communicate with any of the plurality of communication systems through one communication terminal.

Accordingly, in a case where a communication terminal which can communicate with any of a plurality of communication systems is developed as a product, a testing device for measuring whether or not communication is being appropriately carried out even while switching the plurality of communication systems is required.

In addition, in order for the operator to slowly and carefully evaluate measured results, it is necessary to be able to see the communication records by storing once all of communication records as measured results.

In this case as well, because the trace information which are as the communication records as measured results are made to be an enormous amount, a performance measurement system for a communication terminal by which it is possible for an operator to easily find desired log sequence information from among those has been desired.

DISCLOSURE OF INVENTION

Then, the present invention has been achieved in consideration of the above-described problem, and an object of the invention is to provide a performance measurement system for a communication terminal and a performance measurement method for a communication terminal in which, in an evaluation system for a communication terminal in which a trace information group including log sequence information showing the flow of communication test information between a communication terminal in a plurality of communication systems and a measuring instrument for evaluation is displayed to be provided for performance evaluation for a communication terminal, it is possible for an operator to easily find objective log sequence information from a trace information group having an enormous information amount by being supported with a trace information analysis software built in for realizing an efficient trace information display function.

In order to achieve the above object, according to a first aspect of the present invention, there is provided a performance measurement system for a communication terminal, comprising:

a communication terminal test measuring instrument (22) which possesses a series of procedures for predetermined performance measurement corresponding to types of communication systems in a state of connecting a communication terminal (21) for being evaluated, the communication terminal test measuring instrument transmitting test signals including predetermined message information along the procedures to the communication terminal (21) for being evaluated, and receiving a series of reply signals including the predetermined message information corresponding to the series of test signals for predetermined performance measurement from the communication terminal (21) for being evaluated;

a trace information acquisition section (3) which acquires trace information including a plurality of log information which have information on contents and types of log information based on the predetermined message information of each of the series of test signals transmitted by the communication terminal test measuring instrument (22) and the series of reply signals received by the test measuring instrument (22), and which provides clock time information expressing clock times at which the respective predetermined message information have been acquired to the plurality of log information included in the trace information; and a trace information display processing control section (4) which displays on a display (5) the trace information including the plurality of log information acquired by the trace information acquisition section (3) in predetermined formats, wherein the trace information display processing control section (4) comprises:

an indication bar display section (4a) which displays an indication bar (13) on which the plurality of log information included in the trace information acquired by the trace information acquisition section (3) are arranged in a time series based on the clock time information provided to each of the plurality of log information so as to be identifiable by being sorted in accordance with types of the predetermined message information based on the information on the contents and types of the log information; and a log sequence display section (4b) which displays flows of the series of test signals and the series of replay signals with respect to a predetermined number of log information among the plurality of log information included in the trace information acquired by the trace information acquisition section (3) so as to be associated with the indication bar (13), as log sequences (12) having time stamps (12b) according to the clock time information provided to each of the predetermined number of log information based on the information on the contents and types of the log information.

In order to achieve the above object, according to a second aspect of the present invention, there is provided a performance measurement system for a communication terminal according to the first aspect, further comprising a configuration input information setting section (2) which sets predetermined configuration input information with respect to at least one of the trace information acquisition section (3) and the trace information display processing control section (4).

In order to achieve the above object, according to a third aspect of the present invention, there is provided a performance measurement system for a communication terminal according to the second aspect, wherein the trace information display processing control section (4) further comprises a task bar display section (4c) which displays a task bar (14) by which an arbitrary position on the indication bar (13) displayed by the indication bar display section (4a) is selected based on selection configuration input information set by the configuration input information setting section.

In order to achieve the above object, according to a fourth aspect of the present invention, there is provided a performance measurement system for a communication terminal according to the first aspect, wherein the trace information acquisition section (3) includes a storage section (3a) which stores the trace information including the plurality of log information acquired by the trace information acquisition section (3) along with the clock time information provided to the plurality of log information by the trace information acquisition section (3).

In order to achieve the above object, according to a fifth aspect of the present invention, there is provided a performance measurement system for a communication terminal according to the first aspect, wherein communication system information showing the types of the communication systems are included in each of the plurality of log information included in the trace information acquired by the trace information acquisition section (3), and the indication bar display section (4a) displays the indication bar (13) such that the types of the respective communication systems of the plurality of log information are made to be identifiable based on the communication system information.

In order to achieve the above object, according to a sixth aspect of the present invention, there is provided a performance measurement system for a communication terminal according to the second aspect, wherein the log sequence display section (4b) comprises a trace information display bar display section (4b3) which displays a trace information display bar (12d) including at least one of types of planes of the predetermined message information and communication directions based on the information on the contents and types of the log information with respect to at least a predetermined number of log information among the plurality of log information included in the trace information acquired by the trace information acquisition section (3).

In order to achieve the above object, according to a seventh aspect of the present invention, there is provided a performance measurement system for a communication terminal according to the sixth aspect, wherein, the types of planes comprise at least one of a control plane showing various configuration information for test included in the series of test signals and the series of reply signals, and a user plane showing user data which are included in the series of test signals and the series of reply signals to be communicated.

In order to achieve the above object, according to an eighth aspect of the present invention, there is provided a performance measurement system for a communication terminal according to the sixth aspect, wherein Config information showing configuration information inside the communication terminal test measuring instrument (22) for communication test by the series of test signals and the series of reply signals are included in the trace information display bar (12d) displayed by the trace information display bar display section (4b3).

In order to achieve the above object, according to a ninth aspect of the present invention, there is provided a performance measurement system for a communication terminal according to the sixth aspect, wherein the log sequence display section (4b) further comprises:

a communication system display bar display section (4b2) which displays a communication system display bar (12c) showing the types of the respective communication systems relating to a predetermined number of log information among the plurality of log information included in the trace information acquired by the trace information acquisition section (3) so as to correspond to the trace information display bar (12d) displayed by the trace information display bar display section (4b3) based on the information on the contents and types of the log information; and a time stamp display section (4b1) which displays time stamps (12b) according to the clock time information provided to each of the predetermined number of log information so as to correspond to the trace information display bar (12d) displayed by the trace information display bar display section (4b3) and the communication system display bar (12c) displayed by the communication system display bar display section (4b2).

In order to achieve the above object, according to a tenth aspect of the present invention, there is provided a performance measurement system for a communication terminal according to the ninth aspect, wherein the communication system display bar display section (4b2) displays the types of the communication systems to be displayed on the communication system display bar (12c) so as to be selectable based on selection configuration input information set by the configuration input information setting section (2).

In order to achieve the above object, according to an eleventh aspect of the present invention, there is provided a performance measurement system for a communication terminal according to the ninth aspect, wherein the communication system display bar display section (4b2) displays the communication system display bar (12c) by color coding so as to correspond to the types of the respective communication systems relating to the predetermined number of log information.

In order to achieve the above object, according to a twelfth aspect of the present invention, there is provided a performance measurement system for a communication terminal according to the sixth aspect, wherein the trace information display bar display section (4b3) displays the trace information display bar (12d) by color coding so as to correspond to the types of the planes of the predetermined message information on each of the predetermined number of log information.

In order to achieve the above object, according to a thirteenth aspect of the present invention, there is provided a performance measurement system for a communication terminal according to the eleventh aspect, wherein the communication system display bar display section (4b2) enables a color coding display based on color-coding configuration input information set by the configuration input information setting section (2) at the time of displaying the communication system display bar (12c) by color coding so as to correspond to the types of the respective communication systems relating to the predetermined number of log information.

In order to achieve the above object, according to a fourteenth aspect of the present invention, there is provided a performance measurement system for a communication terminal according to the twelfth aspect, wherein the trace information display bar display section (4b3) enables a color coding display based on color-coding configuration input information set by the configuration input information setting section (2) at the time of displaying the trace information display bar (12d) by color coding so as to correspond to the types of the planes of the predetermined message information on each of the predetermined number of log information.

In order to achieve the above object, according to a fifteenth aspect of the present invention, there is provided a performance measurement system for a communication terminal according to the eighth aspect, wherein the trace information display bar display section (4b3)

displays an arbitrary position on the trace information display bar (12d) including the types of the planes of the predetermined message information on each of the predetermined number of log information, the communication directions, and the Config information showing the configuration information inside the communication terminal test measuring instrument (22) for communication test so as to be selectable based on the selection configuration input information set by the configuration input information setting section (2), and displays detailed information on log information corresponding to the arbitrary position on the trace information display bar (12d) selected based on selection configuration input information set by the configuration input information setting section (2).

In order to achieve the above object, according to a sixteenth aspect of the present invention, there is provided a performance measurement system for a communication terminal according to the second aspect, wherein the indication bar display section (4a) displays the plurality of log information included in the trace information acquired by the trace information acquisition section (3) by color coding on the indication bar (13) in each type in accordance with the types of the predetermined message information.

In order to achieve the above object, according to a seventeenth aspect of the present invention, there is provided a performance measurement system for a communication terminal according to the ninth aspect, wherein the log sequence display section (4b) further comprises an index information display section (4b4) which displays index information (12a) showing respective orders in which a predetermined number of log information among the plurality of log information included in the trace information acquired by the trace information acquisition section (3) have been acquired, so as to correspond to the trace information display bar (12d) displayed by the trace information display bar display section (4b3) and the communication system display bar (12c) displayed by the communication system display bar display section (4b2).

In order to achieve the above object, according to an eighteenth aspect of the present invention, there is provided a performance measurement system for a communication terminal according to the seventeenth aspect, wherein the indication bar display section (4a) comprises:

a first indication bar display section (4a1) which displays a predetermined number of log information among the plurality of log information included in the trace information acquired by the trace information acquisition section (3), as a first indication bar (13b) on which the predetermined number of log information are arranged in a time series based on the clock time information provided to each of the predetermined number of log information so as to be identifiable by being sorted in accordance with the types of the predetermined message information based on the information on the contents and types of the log information; and a second indication bar display section (4a2) which, when there are log information which cannot be displayed on the first indication bar (13b) displayed by the first indication bar display section (4a1), displays all of the plurality of log information included in the trace information acquired by the trace information acquisition section (3) as a second indication bar (13a) on which all the information are arranged in a time series based on the clock time information provided to each of the plurality of log information in a state of being substantially compressed without being made to be identifiable by being sorted in accordance with the types of the predetermined message information based on the information on the contents and types of the log information so as to correspond to the first indication bar (13b).

In order to achieve the above object, according to a nineteenth aspect of the present invention, there is provided a performance measurement system for a communication terminal according to the eighteenth aspect, wherein the indication bar display section (4a)

displays an arbitrary position on the second indication bar (13a) displayed by the second indication bar display section (4a2) so as to be selectable based on selection configuration input information set by the configuration input information setting section (2), and when an arbitrary position on the second indication bar (13a) is selected based on selection configuration input information set by the configuration input information setting section (2), displays log information in a predetermined range including log information at the arbitrary position so as to be enlarged on the first indication bar (13b) displayed by the first indication bar display section (4a1).

In order to achieve the above object, according to a twentieth aspect of the present invention, there is provided a performance measurement system for a communication terminal according to the second aspect, wherein the indication bar display section (4a) comprises a plural-indication-bars display section (4a3) which displays a predetermined number of log information among the plurality of log information included in the trace information acquired by the trace information acquisition section (3) as a plurality of indication bars (13bA, 13bB) on which the predetermined number of log information are arranged in a time series based on the clock time information provided to each of the predetermined number of log information so as to be identifiable by being divided into a plurality of bars in correspondence to the types of the communication systems based on the information on the contents and types of the log information, and so as to be identifiable by being sorted in accordance with the types of the predetermined message information for each bar of the plurality of bars, based on configuration input information set by the configuration input information setting section (2).

In order to achieve the above object, according to a twenty-first aspect of the present invention, there is provided a performance measurement system for a communication terminal according to the second aspect, wherein the indication bar display section (4a) comprises a two-indication-bars display section (4a4) which displays a predetermined number of log information among the plurality of log information included in the trace information acquired by the trace information acquisition section (3) as two indication bars (13bC, 13bD) on which the predetermined number of log information are arranged in a time series based on the clock time information provided to each of the predetermined number of log information so as to be identifiable by being divided into two bars in up and down communication directions based on the information on the contents and types of the log information, and so as to be identifiable by being sorted in accordance with the types of the predetermined message information for each bar of the two bars, based on configuration input information set by the configuration input information setting section (2).

In order to achieve the above object, according to a twenty-second aspect of the present invention, there is provided a performance measurement system for a communication terminal according to the second aspect, wherein the indication bar display section (4a) comprises a plural-indication-bars display section (4a3) which displays a predetermined number of log information among the plurality of log information included in the trace information acquired by the trace information acquisition section (3) as a plurality of indication bars (13bA, 13bB, 13bC, 13bD) on which the predetermined number of log information are arranged in a time series based on the clock time information provided to each of the predetermined number of log information so as to be identifiable by being divided into a plurality of bars in correspondence to the types of the communication systems based on the information on the contents and types of the log information, and so as to be identifiable by being divided into two bars in the up and down communication directions, and so as to be identifiable by being sorted in accordance with the types of the predetermined message information for each bar of the two bars, based on configuration input information set by the configuration input information setting section (2).

In order to achieve the above object, according to a twenty-third aspect of the present invention, there is provided a performance measurement system for a communication terminal according to the eighteenth aspect, wherein, when a search of arbitrary log information is selected based on configuration input information set by the configuration input information setting section (2), the indication bar display section (4a) instructs to search the arbitrary log information from log information corresponding to a display of the first indication bar (13b), and displays a place on the first indication bar (13b) at which the log information found by the search has been positioned so as to be identifiable on the first indication bar (13b).

In order to achieve the above object, according to a twenty-fourth aspect of the present invention, there is provided a performance measurement system for a communication terminal according to the twenty-third aspect, wherein the indication bar display section (4a) displays a corresponding place on the first indication bar (13b) at which the log information found by the search has been positioned so as to blink on and off.

In order to achieve the above object, according to a twenty-fifth aspect of the present invention, there is provided a performance measurement system for a communication terminal according to the twenty-third aspect, wherein, when a plurality of log information are found by the search, the log sequence display section (4b) displays a log sequence (12) at a place at which first log information among the plurality of log information has been positioned, as the log sequence (12) displayed so as to be associated with the indication bar (13).

In order to achieve the above object, according to a twenty-sixth aspect of the present invention, there is provided a performance measurement system for a communication terminal according to the eighteenth aspect, wherein when a search of arbitrary log information is selected based on a search condition due to configuration input information set by the configuration input information setting section (2), a search of the arbitrary log information is started from log information corresponding to a display of the second indication bar (13a), and the indication bar display section (4a) displays a place at which the log information found by the search has been positioned so as to be identifiable on the second indication bar (13a), and when a place displayed so as to be identifiable on the second indication bar (13a) is selected based on configuration input information set by the configuration input information setting section (2), the indication bar display section (4a) displays a corresponding place which conforms with the search condition so as to be identifiable on the first indication bar (13b).

In order to achieve the above object, according to a twenty-seventh aspect of the present invention, there is provided a performance measurement system for a communication terminal according to the twenty-sixth aspect, wherein the indication bar display section (4a)

displays a corresponding place on the second indication bar (13a) at which the log information found by the search has been positioned so as to blink on and off, and displays a corresponding place on the first indication bar (13b) at which the log information found by the search has been positioned so as to blink on and off.

In order to achieve the above object, according to a twenty-eighth aspect of the present invention, there is provided a performance measurement system for a communication terminal according to the twenty-sixth aspect, wherein, when a plurality of log information are found by the search, the log sequence display section (4b) displays a log sequence (12) at a place at which the first log information among the plurality of log information has been positioned, as the log sequence (12) displayed so as to be associated with the indication bar (13).

In order to achieve the above object, according to a twenty-ninth aspect of the present invention, there is provided a performance measurement system for a communication terminal according to the eighteenth aspect, wherein the indication bar display section (4a)

allows trigger information serving as a condition for trace information intended for search to be internally set in advance based on configuration input information set by the configuration input information setting section (2), and displays a position at a corresponding place on the first indication bar (13b) so as to be identifiable when trace information which conforms with the trigger information set in advance is obtained from the trace information acquisition section (3).

In order to achieve the above object, according to a thirtieth aspect of the present invention, there is provided a performance measurement system for a communication terminal according to the twenty-ninth aspect, wherein the indication bar display section (4a) displays the position of the corresponding place on the first indication bar (13b) so as to blink on and off when trace information which conforms with the trigger information set in advance is obtained from the trace information acquisition section (3).

In order to achieve the above object, according to a thirty-first aspect of the present invention, there is provided a performance measurement system for a communication terminal according to the twenty-ninth aspect, wherein, when trace information which conforms with the trigger information set in advance is obtained from the trace information acquisition section (3), the log sequence display section (4b) displays a log sequence (12) of log information included in the trace information as the log sequence (12) displayed so as to be associated with the indication bar (13).

In order to achieve the above object, according to a thirty-second aspect of the present invention, there is provided a performance measurement system for a communication terminal according to the first aspect, wherein, when a plurality of log information included in the trace information acquired by the trace information acquisition section (3) include log information in an off-line state, the log sequence display section (4b) displays a log sequence (12) of the log information so as to omit records of the log information in an off-line state, as the log sequence (12) displayed so as to be associated with the indication bar (13).

In order to achieve the above object, according to a thirty-third aspect of the present invention, there is provided a performance measurement system for a communication terminal according to the third aspect, wherein the task bar display section (4c) displays a task bar (14) showing a range of the log sequence (12) displayed at this point in time by the log sequence display section (4b) in the vicinity of the indication bar (13) displayed by the indication bar display section (4a) based on selection configuration input information set by the configuration input information setting section (2).

In order to achieve the above object, according to a thirty-fourth aspect of the present invention, there is provided a performance measurement system for a communication terminal according to the third aspect, wherein the task bar display section (4c) displays a task bar (14) showing a top of the log sequence (12) displayed at this point in time by the log sequence display section (4b) with a point, in the vicinity of the indication bar (13) displayed by the indication bar display section (4a) based on selection configuration input information set by the configuration input information setting section (2).

In order to achieve the above object, according to a thirty-fifth aspect of the present invention, there is provided a performance measurement system for a communication terminal according to the eighteenth aspect, wherein, when log information in which the types of the predetermined message information are the same, and the types of the communication systems are the same are continued in the plurality of log information included in the trace information acquired by the trace information acquisition section (3), the first indication bar display section (4a1) displays the continuous log information so as to compress a length corresponding to one item of log information on the first indication bar (13b).

In order to achieve the above object, according to a thirty-sixth aspect of the present invention, there is provided a performance measurement system for a communication terminal according to the eighteenth aspect, wherein, when the plurality of log information included in the trace information acquired by the trace information acquisition section (3) include log information in an off-line state, the first indication bar display section (4a1) displays entire log information on the first indication bar (13b) so as to include the records of the log information in an off-line state.

In order to achieve the above object, according to a thirty-seventh aspect of the present invention, there is provided a performance measurement system for a communication terminal according to the eighteenth aspect, wherein the second indication bar display section (4a2) displays the second indication bar (13a) so as to be divided into a plurality of ranges at each range which can be displayed on the first indication bar (13b) displayed by the first indication bar display section (4a1).

In order to achieve the above object, according to a thirty-eighth aspect of the present invention, there is provided a performance measurement system for a communication terminal according to the eighteenth aspect, wherein the first indication bar display section (4a1) displays the first indication bar (13b) so as to work with at least one of the time stamps (12b) and the index information (12a) displayed in the vicinity of the first indication bar (13b), based on configuration input information set by the configuration input information setting section (2).

In order to achieve the above object, according to a thirty-ninth aspect of the present invention, there is provided a performance measurement system for a communication terminal according to the eighteenth aspect, wherein the second indication bar display section (4a2) displays the second indication bar (13a) so as to work with at least one of the time stamps (12b) and the index information (12a) displayed in the vicinity of the second indication bar (13a), based on configuration input information set by the configuration input information setting section (2).

In order to achieve the above object, according to a fortieth aspect of the present invention, there is provided a performance measurement system for a communication terminal according to the second aspect, wherein the configuration input information setting section (2) has a plurality of operation keys (11) which are displayed on a display screen of the display (5) and which are composed of soft keys, the plurality of operation keys including a Start key (11a) which is operated at the time of starting acquisition of the trace information, a Stop key (11b) which is operated at the time of stopping acquisition of the trace information, an Option key (11c) which is operated at the time of various settings, a Find key (11d) which is operated at the time of searching objective trace information from among the trace information, a Save key (11e) which is operated at the time of storing acquired trace information, and a Load key (11f) which is operated at the time of reading stored trace information.

In order to achieve the above object, according to a forty-first aspect of the present invention, there is provided a performance measurement method for a communication terminal, comprising:

a step of preparing a communication terminal test measuring instrument (22) which possesses a series of procedures for predetermined performance measurement corresponding to types of communication systems in a state of connecting a communication terminal (21) for being evaluated, the communication terminal test measuring instrument transmitting test signals including predetermined message information along the procedures to the communication terminal (21) for being evaluated, and receiving a series of reply signals including the predetermined message information corresponding to the series of test signals for predetermined performance measurement from the communication terminal (21) for being evaluated;

a step of acquiring trace information including a plurality of log information which have information on contents and types of log information based on the predetermined message information of each of the series of test signals transmitted by the communication terminal test measuring instrument (22) and the series of reply signals received by the communication terminal test measuring instrument (22), and of providing clock time information showing clock times at which the respective predetermined message information have been acquired to the plurality of log information included in the trace information; and a step of displaying on a display (5) trace information including the plurality of log information acquired by the step of acquiring trace information, wherein the step of displaying trace information comprises:

a step of displaying an indication bar (13) on which the plurality of log information included in the trace information acquired by the step of acquiring trace information are arranged in a time series based on the clock time information provided to each of the plurality of log information so as to be identifiable by being sorted in accordance with the types of the predetermined message information based on the information on the contents and types of the log information; and a step of displaying flows of the series of test signals and the series of replay signals with respect to a predetermined number of log information from among the plurality of log information included in the trace information acquired by the step of acquiring the trace information so as to be associated with the indication bar (13), as log sequences (12) having time stamps (12b) according to the clock time information provided to each of the predetermined number of log information based on the information on the contents and types of the log information.

In order to achieve the above object, according to a forty-second aspect of the present invention, there is provided a performance measurement method for a communication terminal according to the forty-first aspect, further comprising a step of setting predetermined configuration input information with respect to at least one of the step of acquiring trace information and the step of displaying trace information.

In order to achieve the above object, according to a forty-third aspect of the present invention, there is provided a performance measurement method for a communication terminal according to the forty-second aspect, wherein the step of displaying trace information further comprises a step of displaying a task bar (14) by which an arbitrary position on the indication bar (13) is selected based on selection configuration input information set by the step of setting configuration input information.

In order to achieve the above object, according to a forty-fourth aspect of the present invention, there is provided a performance measurement method for a communication terminal according to the forty-first aspect, wherein the step of acquiring trace information includes a step of storing in a storage section (3a) the trace information including the plurality of log information acquired by the step of acquiring trace information along with the clock time information provided to the plurality of log information by the step of acquiring trace information.

In order to achieve the above object, according to a forty-fifth aspect of the present invention, there is provided a performance measurement method for a communication terminal according to the forty-first aspect, wherein communication system information showing the types of the communication systems are included in each of the plurality of log information included in the trace information acquired by the step of acquiring trace information, and the step of displaying an indication bar displays the indication bar (13) such that the types of the respective communication systems of the plurality of log information are made to be identifiable based on the communication system information.

In order to achieve the above object, according to a forty-sixth aspect of the present invention, there is provided a performance measurement method for a communication terminal according to the forty-second aspect, wherein the step of displaying a log sequence comprises at least a step of displaying a trace information display bar (12d) including at least one of types of planes of the predetermined message information and communication directions based on the information on the contents and types of the log information at least on a predetermined number of log information among the plurality of log information included in the trace information acquired by the step of acquiring trace information.

In order to achieve the above object, according to a forty-seventh aspect of the present invention, there is provided a performance measurement method for a communication terminal according to the forty-sixth aspect, wherein, the types of planes comprise at least one of a control plane showing various configuration information for test included in the series of test signals and the series of reply signals, and a user plane showing user data which are included in the series of test signals and the series of reply signals to be communicated.

In order to achieve the above object, according to a forty-eighth aspect of the present invention, there is provided a performance measurement method for a communication terminal according to the forty-sixth aspect, wherein Config information showing configuration information inside the communication terminal test measuring instrument (22) for communication test by the series of test signals and the series of reply signals are included in the trace information display bar (12d) displayed by the step of displaying a trace information display bar (12d).

In order to achieve the above object, according to a forty-ninth aspect of the present invention, there is provided a performance measurement method for a communication terminal according to the forty-sixth aspect, wherein the step of displaying a log sequence further comprises:

a step of displaying a communication system display bar (12c) showing the types of the respective communication systems relating to a predetermined number of log information among the plurality of log information included in the trace information acquired by the step of acquiring trace information so as to correspond to the trace information display bar (12d) displayed by the step of displaying a trace information display bar based on the information on the contents and types of the log information; and a step of displaying time stamps (12b) according to the clock time information provided to each of the predetermined number of log information so as to correspond to the trace information display bar (12d) displayed by the step of displaying a trace information display bar (12d) and the communication system display bar (12c) displayed by the step of displaying a communication system display bar (12c).

In order to achieve the above object, according to a fiftieth aspect of the present invention, there is provided a performance measurement method for a communication terminal according to the forty-ninth aspect, wherein the step of displaying a communication system display bar (12c) displays the types of the communication systems to be displayed on the communication system display bar (12c) so as to be selectable based on selection configuration input information set by the step of setting configuration input information.

In order to achieve the above object, according to a fifty-first aspect of the present invention, there is provided a performance measurement method for a communication terminal according to the forty-ninth aspect, wherein the step of displaying a communication system display bar (12c) displays the communication system display bar (12c) by color coding so as to correspond to the types of the respective communication systems relating to the predetermined number of log information.

In order to achieve the above object, according to a fifty-second aspect of the present invention, there is provided a performance measurement method for a communication terminal according to the forty-sixth aspect, wherein the step of displaying a trace information display bar (12d) displays the trace information display bar (12d) by color coding so as to correspond to the types of the planes of the predetermined message information on each of the predetermined number of log information.

In order to achieve the above object, according to a fifty-third aspect of the present invention, there is provided a performance measurement method for a communication terminal according to the fifty-first aspect, wherein the step of displaying a communication system display bar (12c) enables a color coding display based on color-coding configuration input information set by the step of setting configuration input information at the time of displaying the communication system display bar (12c) by color coding so as to correspond to the types of the respective communication systems relating to the predetermined number of log information.

In order to achieve the above object, according to a fifty-fourth aspect of the present invention, there is provided a performance measurement method for a communication terminal according to the fifty-second aspect, wherein the step of displaying a trace information display bar (12d) enables a color coding display based on color-coding configuration input information set by the step of setting configuration input information at the time of displaying the trace information display bar (12d) by color coding so as to correspond to the types of the planes of the predetermined message information on each of the predetermined number of log information.

In order to achieve the above object, according to a fifty-fifth aspect of the present invention, there is provided a performance measurement method for a communication terminal according to the forty-eighth aspect, wherein the step of displaying a trace information display bar (12d) comprises:

a step of displaying an arbitrary position on the trace information display bar (12d) including the types of the planes of the predetermined message information on each of the predetermined number of log information, the communication directions, and the Config information showing configuration information inside the communication terminal test measuring instrument (22) for communication test, so as to be selectable based on selection configuration input information set by the step of setting configuration input information; and a step of displaying detailed information on log information corresponding to the arbitrary position on the trace information display bar (12*d*) selected based on selection configuration input information set by the step of setting configuration input information.

In order to achieve the above object, according to a fifty-sixth aspect of the present invention, there is provided a performance measurement method for a communication terminal according to the forty-second aspect, wherein the step of displaying an indication bar (13) displays the plurality of log information included in the trace information acquired by the step of acquiring trace information by color coding on the indication bar (13) in each type in accordance with the types of the predetermined message information.

In order to achieve the above object, according to a fifty-seventh aspect of the present invention, there is provided a performance measurement method for a communication terminal according to the forty-ninth aspect, wherein the step of displaying a log sequence (12) further comprises a step of displaying index information (12*a*) showing respective orders in which a predetermined number of log information among the plurality of log information included in the trace information acquired by the step of acquiring trace information have been acquired, so as to correspond to the trace information display bar (12*d*) displayed by the step of displaying a trace information display bar (12*d*) and the communication system display bar (12*c*) displayed by the step of a displaying communication system display bar (12*c*).

In order to achieve the above object, according to a fifty-eighth aspect of the present invention, there is provided a performance measurement method for a communication terminal according to the fifty-seventh aspect, wherein the step of displaying an indication bar (13) comprises:

a step of displaying a first indication bar (13*b*) on which a predetermined number of log information among the plurality of log information included in the trace information acquired by the step of acquiring trace information are arranged in a time series based on the clock time information provided to each of the predetermined number of log information so as to be identifiable by being sorted in accordance with the types of the predetermined message information based on the information on the contents and types of the log information; and a step of, when there are log information which cannot be displayed on the first indication bar (13*b*) displayed by the step of displaying a first indication bar (13*b*), displaying a second indication bar (13*a*) on which all of the plurality of log information included in the trace information acquired by the step of acquiring trace information are arranged in a time series based on the clock time information provided to each in a state of being substantially compressed without being made to be identifiable by being sorted in accordance with the types of the predetermined message information based on the information on the contents and types of the log information, so as to correspond to the first indication bar (13*b*).

In order to achieve the above object, according to a fifty-ninth aspect of the present invention, there is provided a performance measurement method for a communication terminal according to the fifty-eighth aspect, wherein the step of displaying an indication bar (13) comprises:

a step of displaying an arbitrary position on the second indication bar (13*a*) displayed by the step of displaying a second indication bar (13*a*) so as to be selectable based on selection configuration input information set by the step of setting configuration input information; and a step of, when an arbitrary position on the second indication bar (13*a*) is selected based on selection configuration input information set by the step of setting configuration input information, displaying log information in a predetermined range including log information at the arbitrary position so as to be enlarged on the first indication bar (13*b*) displayed by the step of displaying a first indication bar (13*b*).

In order to achieve the above object, according to a sixtieth aspect of the present invention, there is provided a performance measurement method for a communication terminal according to the forty-second aspect, wherein the step of displaying an indication bar (13) comprises a step of displaying a plurality of indication bars (13*b*A, 13*b*B) on which a predetermined number of log information among the plurality of log information included in the trace information acquired by the step of acquiring trace information are arranged in a time series based on the clock time information provided to each of the predetermined number of log information so as to be identifiable by being divided into a plurality of bars in correspondence to the types of the communication systems based on the information on the contents and types of the log information, and so as to be identifiable by being sorted in accordance with the types of the predetermined message information for each bar of the plurality of bars, based on configuration input information set by the step of setting configuration input information.

In order to achieve the above object, according to a sixty-first aspect of the present invention, there is provided a performance measurement method for a communication terminal according to the forty-second aspect, wherein the step of displaying an indication bar (13) comprises a step of two indication bars (13*b*C, 13*b*D) on which a predetermined number of log information among the plurality of log information included in the trace information acquired by the step of acquiring trace information are arranged in a time series based on the clock time information provided to each of the predetermined number of log information so as to be identifiable by being divided into two bars in up and down communication directions based on the information on the contents and types of the log information, and so as to be identifiable by being sorted in accordance with the types of the predetermined message information for each bar of the two bars, based on configuration input information set by the step of setting configuration input information.

In order to achieve the above object, according to a sixty-second aspect of the present invention, there is provided a performance measurement method for a communication terminal according to the forty-second aspect, wherein the step of displaying an indication bar (13) comprises a step of displaying a plurality of indication bars (13*b*A, 13*b*B, 13*b*C, 13*b*D) on which a predetermined number of log information among the plurality of log information included in the trace information acquired by the step of acquiring trace information are arranged in a time series based on the clock time information provided to each of the predetermined number of log information so as to be identifiable by being divided into a plurality of bars in correspondence to the types of the communication systems based on the information on the contents and types of the log information, and so as to be identifiable by being divided into two bars in up and down communication directions, and so as to be identifiable by being sorted in accordance with the types of the predetermined message information for each bar of the two bars, based on configuration input information set by the step of setting configuration input information.

In order to achieve the above object, according to a sixty-third aspect of the present invention, there is provided a performance measurement method for a communication terminal according to the fifty-eighth aspect, wherein, when a search of arbitrary log information is selected based on configuration input information set by the step of setting configuration input information, the step of displaying an indication bar (13) instructs to search the arbitrary log information from log information corresponding to a display of the first indication bar (13b), and displays a place on the first indication bar (13b) at which log information found by the search has been positioned so as to be identifiable on the first indication bar (13b).

In order to achieve the above object, according to a sixty-fourth aspect of the present invention, there is provided a performance measurement method for a communication terminal according to the sixty-third aspect, wherein the step of displaying an indication bar (13) displays a corresponding place on the first indication bar (13b) at which the log information found by the search has been positioned so as to blink on and off.

In order to achieve the above object, according to a sixty-fifth aspect of the present invention, there is provided a performance measurement method for a communication terminal according to the sixty-third aspect, wherein, when a plurality of log information are found by the search, the step of displaying a log sequence (12) displays a log sequence (12) at a place at which the first log information among the plurality of log information has been positioned as the log sequence (12) displayed so as to be associated with the indication bar (13).

In order to achieve the above object, according to a sixty-sixth aspect of the present invention, there is provided a performance measurement method for a communication terminal according to the fifty-eighth aspect, wherein the step of displaying an indication bar (13) comprises:

a step of, when a search of arbitrary log information is selected based on a search condition due to configuration input information set by the step of setting configuration input information, starting a search of the arbitrary log information from the log information corresponding to a display of the second indication bar (13a), and displaying a place at which the log information found by the search has been positioned so as to be identifiable on the second indication bar (13a); and a step of, when a place displayed so as to be identifiable on the second indication bar (13a) is selected based on the configuration input information set by the step of setting configuration input information, displaying a corresponding place which conforms with the search condition so as to be identifiable on the first indication bar (13b).

In order to achieve the above object, according to a sixty-seventh aspect of the present invention, there is provided a performance measurement method for a communication terminal according to the sixty-sixth aspect, wherein the step of displaying an indication bar (13) comprises:

a step of displaying a corresponding place on the second indication bar (13a) at which the log information found by the search has been positioned so as to blink on and off; and a step of displaying a corresponding place on the first indication bar (13b) at which the log information found by the search has been positioned so as to blink on and off.

In order to achieve the above object, according to a sixty-eighth aspect of the present invention, there is provided a performance measurement method for a communication terminal according to the sixty-sixth aspect, wherein when a plurality of log information are found by the search, the step of displaying a log sequence (12) displays a log sequence (12) at a place at which the first log information among the plurality of log information has been positioned as the log sequence (12) displayed so as to be associated with the indication bar (13).

In order to achieve the above object, according to a sixty-ninth aspect of the present invention, there is provided a performance measurement method for a communication terminal according to the fifty-eighth aspect, wherein the step of displaying an indication bar (13) comprises:

a step of allowing trigger information serving as a condition of trace information intended for search to be internally set in advance based on configuration input information set by the step of setting configuration input information; and a step of displaying a position of a corresponding place on the first indication bar (13b) so as to be identifiable when trace information which conforms with the trigger information set in advance is obtained from the trace information acquired by the step of acquiring trace information.

In order to achieve the above object, according to a seventieth aspect of the present invention, there is provided a performance measurement method for a communication terminal according to the sixty-ninth aspect, wherein the step of displaying an indication bar (13) displays the position of the corresponding place on the first indication bar (13b) so as to blink on and off when trace information which conforms with the trigger information set in advance is obtained from the trace information acquired by the step of acquiring trace information.

In order to achieve the above object, according to a seventy-first aspect of the present invention, there is provided a performance measurement method for a communication terminal according to the sixty-ninth aspect, wherein, when trace information which conforms with the trigger information set in advance is obtained from the trace information acquired by the step of acquiring trace information, the step of displaying a log sequence (12) displays a log sequence (12) of log information included in the trace information as the log sequence (12) displayed so as to be associated with the indication bar (13).

In order to achieve the above object, according to a seventy-second aspect of the present invention, there is provided a performance measurement method for a communication terminal according to the forty-first aspect, wherein, when a plurality of log information included in the trace information acquired by the step of acquiring trace information include log information in an off-line state, the step of displaying a log sequence (12) displays a log sequence (12) of the log information so as to omit records of the log information in an off-line state as the log sequence (12) displayed so as to be associated with the indication bar (13).

In order to achieve the above object, according to a seventy-third aspect of the present invention, there is provided a performance measurement method for a communication terminal according to the forty-third aspect, wherein the step of displaying a task bar (14) displays a task bar (14) showing a range of the log sequence (12) displayed at this point in time by the step of displaying a log sequence (12), in the vicinity of the indication bar (13) displayed by the step of displaying an indication bar (13), based on selection configuration input information set by the step of setting configuration input information.

In order to achieve the above object, according to a seventy-fourth aspect of the present invention, there is provided a performance measurement method for a communication terminal according to the forty-third aspect, wherein the step of displaying a task bar (14) displays a task bar (14) showing a top of the log sequence (12) displayed at this point in time by the step of displaying a log sequence with a point, in the vicinity of the indication bar (13) displayed by the step of displaying an indication bar (13), based on selection configuration input information set by the step of setting configuration input information.

In order to achieve the above object, according to a seventy-fifth aspect of the present invention, there is provided a performance measurement method for a communication terminal according to the fifty-eighth aspect, wherein, when log information in which the types of the predetermined message information are the same, and the types of the communication systems are the same are continued in the plurality of log information included in the trace information acquired by the step of acquiring trace information, the step of displaying a first indication bar (13b) displays the continuous log information so as to compress a length corresponding to one item of log information on the first indication bar (13b).

In order to achieve the above object, according to a seventy-sixth aspect of the present invention, there is provided a performance measurement method for a communication terminal according to the fifty-eighth aspect, wherein, when the plurality of log information included in the trace information acquired by the step of acquiring trace information include log information in an off-line state, the step of displaying a first indication bar (13b) displays entire log information on the first indication bar (13b) so as to include the records of the log information in an off-line state.

In order to achieve the above object, according to a seventy-seventh aspect of the present invention, there is provided a performance measurement method for a communication terminal according to the fifty-eighth aspect, wherein the step of displaying a second indication bar (13a) displays the second indication bar (13a) so as to be divided into a plurality of ranges at each range which can be displayed on the first indication bar (13b) displayed by the step of displaying a first indication bar (13b).

In order to achieve the above object, according to a seventy-eighth aspect of the present invention, there is provided a performance measurement method for a communication terminal according to the fifty-eighth aspect, wherein the step of displaying a first indication bar (13b) displays the first indication bar (13b) so as to work with at least one of the time stamps (12b) and the index information (12a) displayed in the vicinity of the first indication bar (13b) based on configuration input information set by the step of setting configuration input information.

In order to achieve the above object, according to a seventy-ninth aspect of the present invention, there is provided a performance measurement method for a communication terminal according to the fifty-eighth aspect, wherein the step of displaying a second indication bar (13a) displays the second indication bar (13a) so as to work with at least one of the time stamps (12b) and the index information (12a) displayed in the vicinity of the second indication bar (13a) based on configuration input information set by the step of setting configuration input information.

In order to achieve the above object, according to an eightieth aspect of the present invention, there is provided a performance measurement method for a communication terminal according to the fifty-eighth aspect, wherein the step of setting configuration input information uses at least one of a plurality of operation keys (11) which are displayed on a display screen of the display (5) and which are composed of soft keys, the plurality of operation keys including a Start key (11a) which is operated at the time of starting acquisition of the trace information, a Stop key (11b) which is operated at the time of stopping acquisition of the trace information, an Option key (11c) which is operated at the time of various settings, a Find key (11d) which is operated at the time of searching objective trace information from among the trace information, a Save key (11e) which is operated at the time of storing acquired trace information, and a Load key (11f) which is operated at the time of reading stored trace information.

Here, the operational advantages with respect to the performance measurement system for a communication terminal and the performance measurement method for a communication terminal in accordance with the respective aspects of the present invention having a structure as described above will be described.

When there are many trace information, it is difficult to find objective trace information in the prior art. In contrast thereto, in accordance with the performance measurement system for a communication terminal and the performance measurement method for a communication terminal according to the respective aspects of the invention, it is basically possible for an operator to find objective trace information immediately by minimal operations.

Then, in accordance with the performance measurement system according to the first aspect and the performance measurement method according to the forty-first aspect of the invention, an indication bar (13) is displayed on which a plurality of log information included in trace information are arranged in a time series based on the clock time information provided to each of the plurality of log information, so as to be identifiable by being sorted in accordance with types of the predetermined message information based on the information on the contents and types of the log information. In addition, flows of the series of test signals and the series of replay signals with respect to a predetermined number of log information among the plurality of log information included in the trace information are displayed as log sequences (12) having time stamps (12b) according to the clock time information provided to each of the predetermined number of log information based on the information on the contents and types of the log information, so as to be associated with the indication bar (13). Consequently, it is easy for the operator to recognize the predetermined number of log information including objective log information from the plurality of log information, as the log sequences (12) having the time stamps (12b) according to the information on time at which the respective log information have been acquired.

In accordance with the performance measurement system according to the second aspect and the performance measurement method according to the forty-second aspect of the invention, a configuration input information setting section (2) which sets predetermined configuration input information is provided, and therefore, it is possible for the operator to set desired configuration input information, and to carry out a desired selection based on the configuration input information.

In accordance with the performance measurement system according to the third aspect and the performance measurement method according to the forty-third aspect of the invention, a task bar (14) is displayed by which an arbitrary position on the indication bar (13) can be selected based on configuration input information, and therefore, it is possible for the operator to easily select and display a log sequence in an arbitrary range from among a plurality of log information by the indication bar (13).

In accordance with the performance measurement system according to the fourth aspect and the performance measurement method according to the forty-fourth aspect of the invention, it is configured so that the trace information including the plurality of log information which have been acquired are stored in a storage section (3*a*) along with the clock time information provided to the plurality of log information. Consequently, it is possible for the operator to carry out performance measurement for a communication terminal in real-time and off-time.

In accordance with the performance measurement system according to the fifth aspect and the performance measurement method according to the forty-fifth aspect of the invention, the indication bar (13) is displayed such that the types of the respective communication systems of the plurality of log information are made to be identifiable, and therefore, it is possible for the operator to identify the types of the respective communication systems on the indication bar (13).

In accordance with the performance measurement system according to the sixth aspect and the performance measurement method according to the forty-sixth aspect of the invention, the log sequence display section (4*b*) displays a trace information display bar (12*d*) including at least one of types of planes of the predetermined message information and communication directions based on the information on the contents and types of the log information on at least a predetermined number of log information among the plurality of log information included in the trace information acquired by the trace information acquisition section (3). As a result, it is possible for the operator to identify the types of the planes constituting protocols of the communication system of the trace information shown by the trace information display bar (12*d*) and the communication directions.

Further, in accordance with the performance measurement system according to the seventh aspect and the performance measurement method according to the forty-seventh aspect of the invention, the types of planes comprise at least one of a control (C) plane showing various configuration information for test included in the series of test signals and the series of reply signals, and a user (U) plane showing user data which are included in the series of test signals and the series of reply signals to be communicated, and thus, the operator can identify a C plane or a U plane.

Further, in accordance with the performance measurement system according to the eighth aspect and the performance measurement method according to the forty-eighth aspect of the present invention, the trace information display bar (12*d*) includes Config information showing configuration information inside the communication terminal test measuring instrument (22) for communication test by the series of test signals and the series of reply signals, and thus, the operator can identify the Config information.

In accordance with the performance measurement system according to the ninth aspect and the performance measurement method according to the forty-ninth aspect of the present invention, the log sequence display section (4*b*) displays a communication system display bar (12*c*) showing the types of the respective communication systems relating to a predetermined number of log information among the plurality of log information so as to correspond to the trace information display bar (12*d*), and time stamps (12*b*) according to the clock time information provided to each of the predetermined number of log information. Consequently, it is possible for the operator to identify the types of the respective communication systems relating to the predetermined number of log information, and the time stamps (12*b*) according to the clock time information provided to each thereof.

In accordance with the performance measurement system according to the tenth aspect and the performance measurement method according to the fiftieth aspect of the invention, the types of the communication systems to be displayed on the communication system display bar (12*c*) are displayed so as to be selectable based on selection configuration input information set by the configuration input information setting section (2), and thus, it is possible to easily identify the types of the communication systems.

In accordance with the performance measurement system according to the eleventh aspect and the performance measurement method according to the fifty-first aspect of the invention, the communication system display bar (12*c*) is displayed by color coding so as to correspond to the types of the respective communication systems relating to the predetermined number of log information, and thus, the operator can easily identify the types of the communication systems.

In accordance with the performance measurement system according to the twelfth aspect and the performance measurement method according to the fifty-second aspect of the invention, the trace information display bar (12*d*) is displayed by color coding so as to correspond to the types of the planes of the predetermined message information on each of the predetermined number of log information. Accordingly, the operator can easily identify the types of the planes.

In accordance with the performance measurement system according to the thirteenth aspect and the performance measurement method according to the fifty-third aspect of the invention, a color coding display based on color-coding configuration input information set by the configuration input information setting section (2) is made possible at the time of color coding display so as to correspond to the types of the communication systems. Therefore, the operator can easily identify the types of the communication systems.

In accordance with the performance measurement system according to the fourteenth aspect and the performance measurement method according to the fifty-fourth aspect of the invention, a color coding display based on color-coding configuration input information set by the configuration input information setting section (2) is made possible at the time of color coding display so as to correspond to the types of the planes of the predetermined message information. Therefore, the operator can easily identify the types of the planes of the predetermined message information.

In accordance with the performance measurement system according to the fifteenth aspect and the performance measurement method according to the fifty-fifth aspect of the invention, when an arbitrary position on the trace information display bar (12*d*) including the types of the planes, the communication directions, and the Config information showing the configuration information inside the communication terminal test measuring instrument (22) for communication test is selected by the configuration input information setting section (2), detailed information on log information corresponding to the arbitrary position on the trace information display bar (12d) is selected. As a result, the operator can easily identify the detailed information on the types of the planes and the Config information.

In accordance with the performance measurement system according to the sixteenth aspect and the performance measurement method according to the fifty-sixth aspect of the invention, the plurality of log information are displayed by color coding on the indication bar (13) in each type in accordance with the types of the predetermined message information, and thus, the operator can easily identify the types of the predetermined message information of the plurality of log information on the indication bar (13).

In accordance with the performance measurement system according to the seventeenth aspect and the performance measurement method according to the fifty-seventh aspect of the invention, the log sequence display section (4b) displays index information (12a) showing respective orders in which the predetermined number of log information have been acquired. Consequently, it is possible for the operator to easily identify the respective orders in which the predetermined number of log information have been acquired.

In this case, the index information (12a) may be appropriately displayed so as to be attached to the respective acquired sequences at predetermined intervals, or so as to be attached at the time of switching a plurality of communication systems.

Further, in accordance with the performance measurement system according to the eighteenth aspect and the performance measurement method according to the fifty-eighth aspect of the invention, the indication bar display section (4a) displays the predetermined number of log information so as to be identifiable on a first indication bar (13b). When there are log information which cannot be displayed on the first indication bar (13b), the indication bar display section (4a) displays as the first indication bar (13b) on which the log information are arranged in a time series based on the clock time information provided to each of the predetermined number of log information so as to be identifiable by being sorted in accordance with the types of the predetermined message information based on the information on the contents and types of the log information. In addition, when there are log information which cannot be displayed on the first indication bar (13b), all of the plurality of log information are displayed without being made to be identifiable on the second indication bar (13a). As a result, the operator can identify each of the predetermined number of log information on the first indication bar (13b) by being sorted in accordance with the types of the predetermined message, and when there are log information which cannot be displayed on the first indication bar (13b), the operator can identify all of the plurality of log information on the second indication bar (13a).

In accordance with the performance measurement system according to the nineteenth aspect and the performance measurement method according to the fifty-ninth aspect of the invention, when an arbitrary position on the second indication bar (13a) is selected based on selection configuration input information set by the configuration input information setting section (2), log information in a predetermined range including log information at the arbitrary position are displayed so as to be enlarged on the first indication bar (13b) displayed by the first indication bar display section (4a1). Therefore, the operator can rapidly identify objective log information.

Further, in accordance with the performance measurement system according to the twentieth aspect and the performance measurement method according to the sixtieth aspect of the invention, the indication bar display section (4a) displays the predetermined number of log information by a plurality of indication bars (13bA, 13bB) on which the predetermined number of log information are arranged in a time series based on the clock time information provided to each of the predetermined number of log information so as to be identifiable by being divided into a plurality of bars in correspondence to the types of the communication systems based on the information on the contents and types of the log information, and so as to be identifiable by being sorted in accordance with the types of the predetermined message information for each bar of the plurality of bars. Consequently, it is possible for the operator to identify the predetermined number of log information by being sorted in accordance with the types of the predetermined message information, to easily identify the types of the communication systems, and to display a log sequence focused on only information transmitted from a communication terminal, for example, a mobile cellular phone, or information transmitted from a test measuring instrument. Moreover, the operator can cause to display so as to be identifiable with respect to communication with a mobile cellular phone in accordance with a protocol in a different type of communication system.

In accordance with the performance measurement system according to the twenty-first aspect and the performance measurement method according to the sixty-first aspect of the invention, the indication bar display section (4a) displays the predetermined number of log information as two indication bars (13bC, 13bD) on which the predetermined number of log information are arranged in a time series based on the clock time information provided to each of the predetermined number of log information so as to be identifiable by being divided into two bars in up and down communication directions based on the information on the contents and types of the log information, and so as to be identifiable by being sorted in accordance with the types of the predetermined message information for each bar of the two bars. As a result, it is possible for the operator to identify the predetermined number of log information by being sorted in accordance with the types of the predetermined message information, and to easily identify the up and down communication directions thereof.

In accordance with the performance measurement system according to the twenty-second aspect and the performance measurement method according to the sixty-second aspect of the invention, the indication bar display section (4a) displays the predetermined number of log information as a plurality of indication bars (13bA, 13bB, 13bC, 13bD) on which the predetermined number of log information are arranged in a time series based on the clock time information provided to each of the predetermined number of log information so as to be identifiable by being divided into a plurality of bars in correspondence to the types of the communication systems based on the information on the contents and types of the log information, and so as to be identifiable by being divided into two bars in the up and down communication directions, and so as to be identifiable by being sorted in accordance with the types of the predetermined message information for each bar of the two bars. Therefore, it is possible for the operator to identify the predetermined number of log information by being sorted in accordance with the types of the predetermined message information, and to easily identify the types of the communication systems and the up and down communication directions thereof.

Further, in accordance with the performance measurement system according to the twenty-third aspect and the performance measurement method according to the sixty-third aspect of the invention, when a search of arbitrary log information is selected based on configuration input information set by the configuration input information setting section (2), the indication bar display section (4a) instructs to search the arbitrary log information from log information corresponding to a display of the first indication bar (13b), and displays a place on the first indication bar (13b) at which the log information found by the search has been positioned so as to be identifiable on the first indication bar (13b). Thus, the operator can easily identify objective log information.

In accordance with the performance measurement system according to the twenty-fourth aspect and the performance measurement method according to the sixty-fourth aspect of the invention, a corresponding place on the first indication bar (13b) at which the log information found by the search has been positioned is displayed so as to blink on and off, so that, the operator can easily identify objective log information.

In accordance with the performance measurement system according to the twenty-fifth aspect and the performance measurement method according to the sixty-fifth aspect of the invention, when a plurality of log information are found by the search, the log sequence display section (4b) displays a log sequence (12) at a place at which the first log information among the plurality of log information has been positioned, so that, the operator can easily identify objective log sequence (12).

In accordance with the performance measurement system according to the twenty-sixth aspect and the performance measurement method according to the sixty-sixth aspect of the invention, when a search of arbitrary log information is selected based on a search condition due to configuration input information set by the configuration input information setting section (2), a search of the arbitrary log information is started from log information corresponding to a display of the second indication bar, and a place at which the log information found by the search has been positioned is displayed so as to be identifiable on the second indication bar (13a). In addition, when a place displayed so as to be identifiable on the second indication bar (13a) is selected based on configuration input information set by the configuration input information setting section (2), a corresponding place which conforms with the search condition is displayed so as to be identifiable on the first indication bar (13b). Thus, the operator can rapidly search objective log information.

Further, in accordance with the performance measurement system according to the twenty-seventh aspect and the performance measurement method according to the sixty-seventh aspect of the invention, a corresponding place on the second indication bar (13a) at which the log information found by the search has been positioned is displayed so as to blink on and off, and a corresponding place on the first indication bar (13b) at which the log information found by the search has been positioned is displayed so as to blink on and off. Accordingly, it is possible for the operator to apparently identify a result of the search, and thus, to easily identify a place at which there are objective log information.

In accordance with the performance measurement system according to the twenty-eighth aspect and the performance measurement method according to the sixty-eighth aspect of the invention, when a plurality of log information are found by the search, the log sequence display section (4b) displays a log sequence (12) at a place at which the first log information among the plurality of log information has been positioned, as the log sequences (12). Consequently, it is possible for the operator to rapidly confirm the corresponding log sequence without carrying out a plurality of operations.

In this case, the operator may make a transition to a display of the following place of the log information corresponding to the search, by clicking with a mouse or operating keys on the display screen.

Moreover, it may be possible for the operator to confirm the previous and next log sequences by displaying a display position of the log information corresponding to the search on the log sequence display at one of the top, the center, and the tail end in the display screen.

In accordance with the performance measurement system according to the twenty-ninth aspect and the performance measurement method according to the sixty-ninth aspect of the invention, the indication bar display section (4a) allows trigger information serving as a condition for trace information intended for search to be internally set in advance based on configuration input information set by the configuration input information setting section (2), and displays a position at a corresponding place on the first indication bar (13b) so as to be identifiable when trace information which conforms with the trigger information set in advance can be obtained from the trace information acquisition section (3). Therefore, it is possible for the operator more apparently identify log information which conforms with a condition of arbitrary trigger information, and thus, to easily identify a place at which there is objective log information.

In this case, it may be possible for the operator to confirm the previous and next log sequences by displaying a display position of the log information which conforms with a condition of arbitrary trigger information on the log sequence display at one of the top, the center, and the tail end in the display screen.

In accordance with the performance measurement system according to the thirtieth aspect and the performance measurement method according to the seventieth aspect of the invention, the indication bar display section (4a) displays the position of the corresponding place on the first indication bar (13b) so as to blink on and off when trace information suitable for the trigger information set in advance can be obtained from the trace information acquisition section (3), so that the operator can easily identify a place at which there is objective log information.

In accordance with the performance measurement system according to the thirty-first aspect and the performance measurement method according to the seventy-first aspect of the invention, the log sequence display section (4b) displays a log sequence (12) of log information included in the trace information as the log sequence (12) when trace information which conforms with the trigger information set in advance can be obtained from the trace information acquisition section (3), so that the operator can easily identify an objective log sequence (12).

In accordance with the performance measurement system according to the thirty-second aspect and the performance measurement method according to the seventy-second aspect of the invention, when a plurality of log information included in the trace information include log information in an off-line state as the log sequence (12), the log sequence display section (4b) displays a log sequence (12) of the log information so as to omit records of the log information in an off-line state, as the log sequence (12). Therefore, because it is possible for the log sequence not to continue to display the log in an off-line state when an off-line state is successively continued, log information in an actual on-line state can be intensively displayed, and it is possible for the operator to determine a time in an off-line state due to an interval of the time stamps of the respective log information.

In accordance with the performance measurement system according to the thirty-third aspect and the performance measurement method according to the seventy-third aspect of the invention, the task bar display section (4c) displays a task bar (14) showing a range of the log sequence (12) displayed at this point in time by the log sequence display section (4b) in the vicinity of the indication bar (13) displayed by the indication bar display section (4a) based on selection configuration input information set by the configuration input information setting section (2). Accordingly, because the operator can identify which range on the indication bar (13) the range of the log sequence displayed at this point in time shows, it is possible for the operator to visually recognize how much of the plurality of log information displayed on the indication bar (13) the log information which have been being displayed occupy, and to change a range in which the log sequence display is carried out so as to work with moving the task bar (14).

In accordance with the performance measurement system according to the thirty-fourth aspect and the performance measurement method according to the seventy-fourth aspect of the invention, the task bar display section (4c) displays a task bar (14) showing a top of the log sequence (12) displayed at this point in time by the log sequence display section (4b) with a point, in the vicinity of the indication bar (13) displayed by the indication bar display section (4a) based on selection configuration input information set by the configuration input information setting section (2). Thus, it is possible to display corresponding log information by selecting an arbitrary place on the indication bar (14), so that the operator can confirm even more log information without carrying out a plurality of operations.

In accordance with the performance measurement system according to the thirty-fifth aspect and the performance measurement method according to the seventy-fifth aspect of the invention, when log information in which the types of the predetermined message information are the same, and the types of the communication systems are the same are continued in the plurality of log information, the continuous log information are displayed so as to compress a length corresponding to one log information on the first indication bar (13). As a result, even more log information can be displayed on the indication bar (14), so that the operator can confirm even more log information without carrying out a plurality of operations.

In accordance with the performance measurement system according to the thirty-sixth aspect and the performance measurement method according to the seventy-sixth aspect of the invention, when the plurality of log information include log information in an off-line state, entire log information is displayed on the first indication bar (13b) so as to include the records of the log information in an off-line state. Therefore, it is possible for the operator to view an actual record amount of the entire log information on the indication bar (13).

In accordance with the performance measurement system according to the thirty-seventh aspect and the performance measurement method according to the seventy-seventh aspect of the present invention, it is possible to display to switch at each range of the first indication bar (13b) by displaying the second indication bar (13a) so as to be divided into a plurality of ranges at each range which can be displayed on the first indication bar (13b). Accordingly, the operator can confirm the display of the log information while being rapidly moved.

In accordance with the performance measurement system according to the thirty-eighth aspect and the performance measurement method according to the seventy-eighth aspect of the invention, the first indication bar (13b) is displayed so as to work with at least one of the time stamps (12b) and the index information (12a) displayed in the vicinity of the first indication bar (13b) based on configuration input information set by the configuration input information setting section (2). Consequently, it is possible for the operator to identify the log information on the first indication bar (13b) in association with the time stamps (12b) and the index information (12a).

In accordance with the performance measurement system according to the thirty-ninth aspect and the performance measurement method according to the seventy-ninth aspect of the invention, the second indication bar (13a) is displayed so as to work with at least one of the time stamps (12b) and the index information (12a) displayed in the vicinity of the second indication bar (13a) based on configuration input information set by the configuration input information setting section (2). As a result, it is possible for the operator to identify the log information on the second indication bar (13a) in association with the time stamps (12b) and the index information (12a).

In accordance with the performance measurement system according to the fortieth aspect and the performance measurement method according to the eightieth aspect of the invention, the configuration input information setting section (2) has a plurality of operation keys (11) including a Start key (11a), a Stop key (11b), an Option key (11c), a Find key (11d), a Save key (11e), and a Load key (11f) which are displayed on a display screen of the display (5) and which are composed of soft keys, so that various operations and settings by the operator are made easy.

BRIEF DESCRIPTION OF DRAWINGS

FIG. 9 is a diagram illustrating a display screen when setting of the first indication bar is further selected by pressing an Option key of operation keys in the performance measurement system for a communication terminal according to the present invention.

FIG. 12 is a diagram illustrating a display screen when the first indication bar is divided into two in the up and down communication directions, and those are further divided so as to correspond to a plurality of communication systems in the performance measurement system for a communication terminal according to the present invention.

BEST MODE FOR CARRYING OUT THE INVENTION

Hereinafter, a preferred embodiment of a performance measurement system for a communication terminal according to the present invention will be described with reference to FIGS. 1 to 25.

Figure 1:
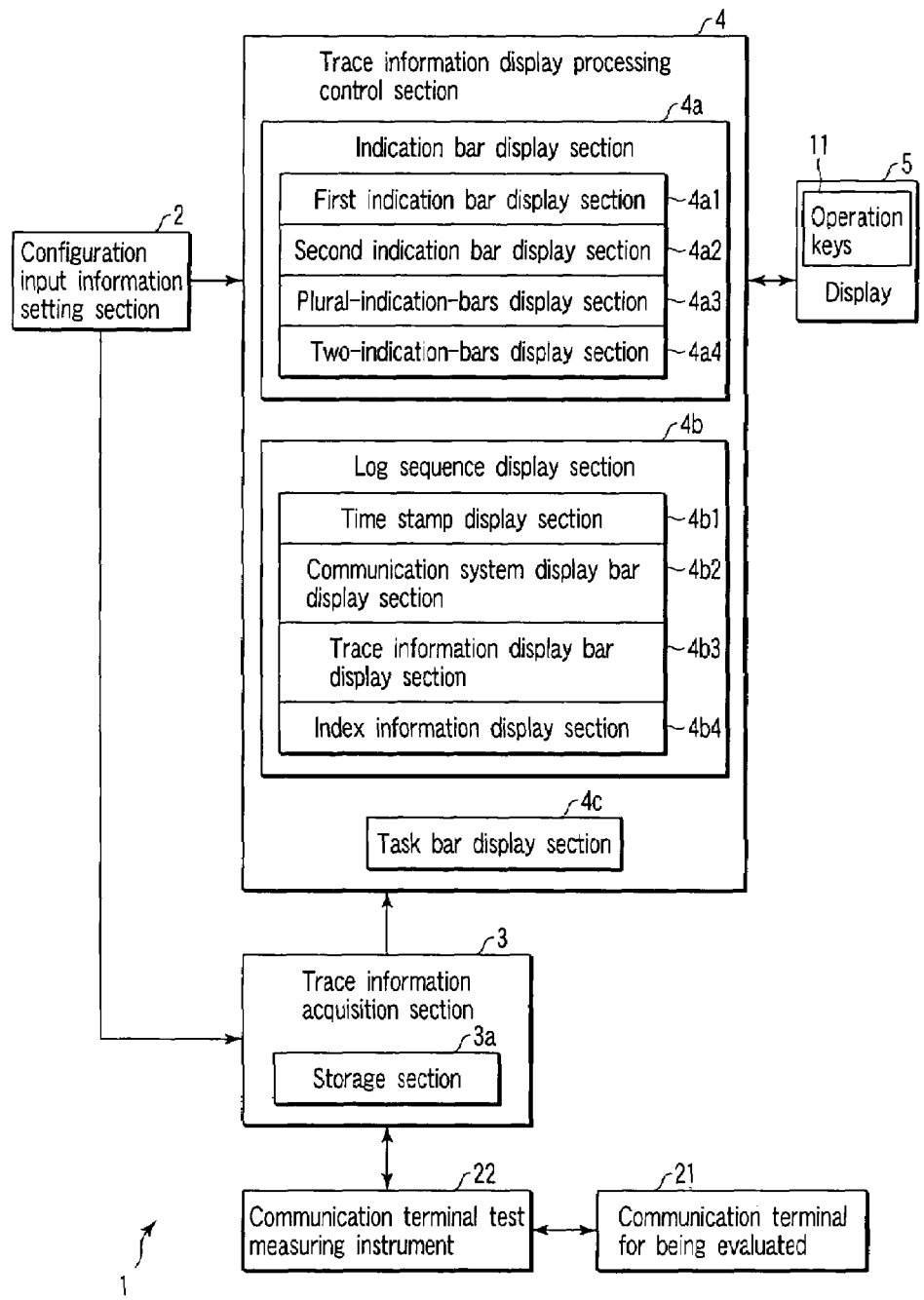
FIG. 1 is a block diagram showing a basic schematic configuration of one embodiment of a performance measurement system for a communication terminal according to the present invention.
Figure 2:
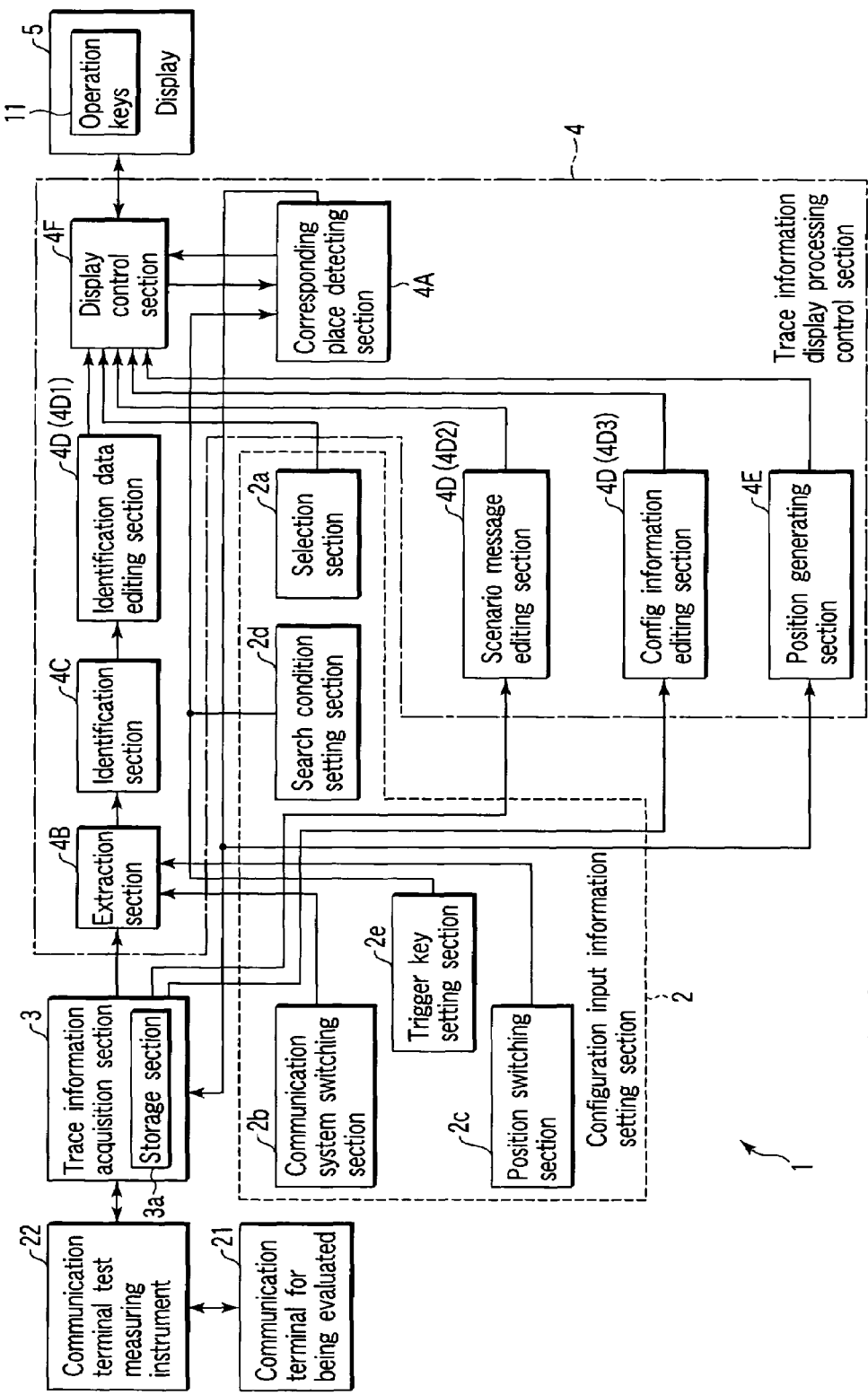
FIG. 2 is a functional block diagram showing a detailed configuration of the embodiment of the performance measurement system for a communication terminal according to the present invention.

FIG. 1 is a block diagram showing a basic schematic configuration of one embodiment of the performance measurement system for a communication terminal according to the invention, and FIG. 2 is a detailed functional block diagram of FIG. 1.

FIGS. 3 to 21 and 25 are diagrams showing respective display examples of a display screen of the performance measurement system for a communication terminal according to the invention.

Figure 22:
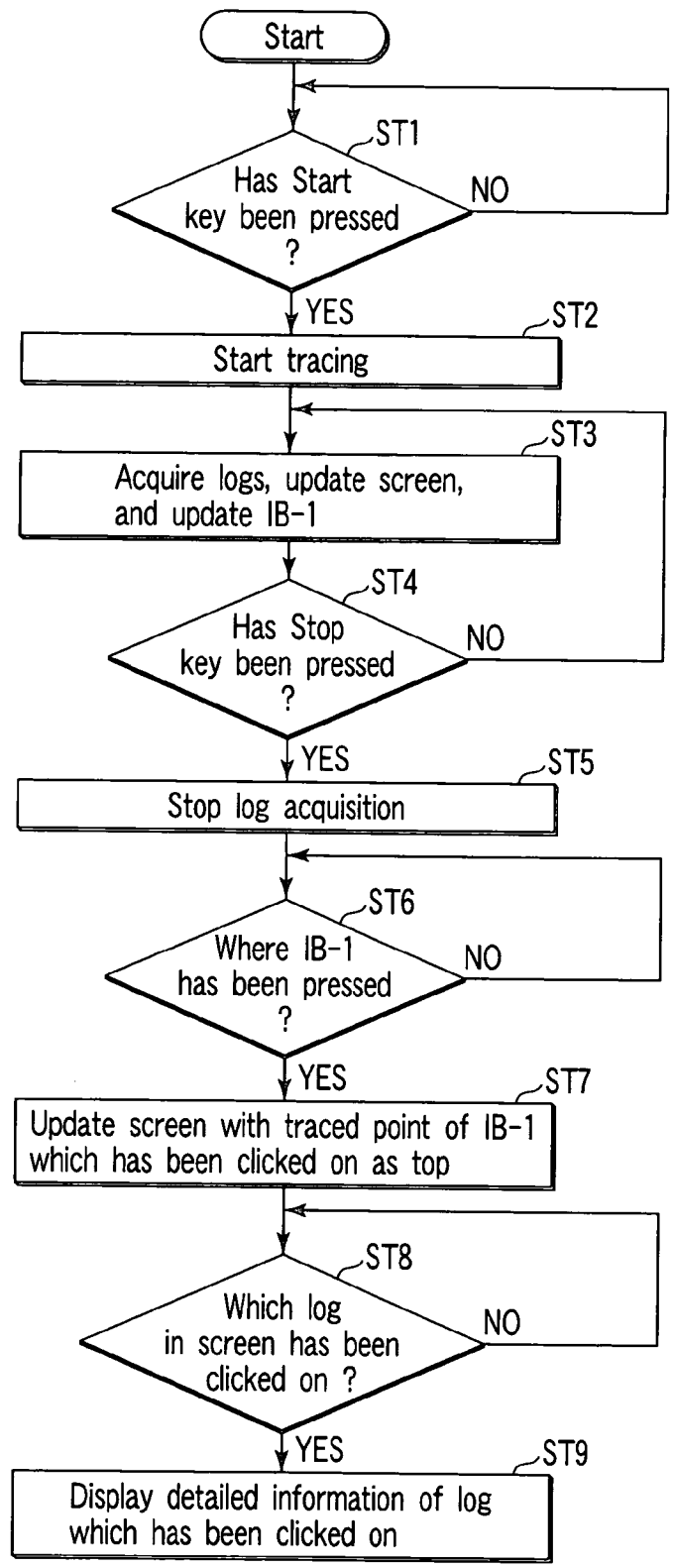
FIG. 22 is a flowchart showing the flow of basic operations in the performance measurement system for a communication terminal according to the present invention.
Figure 23:
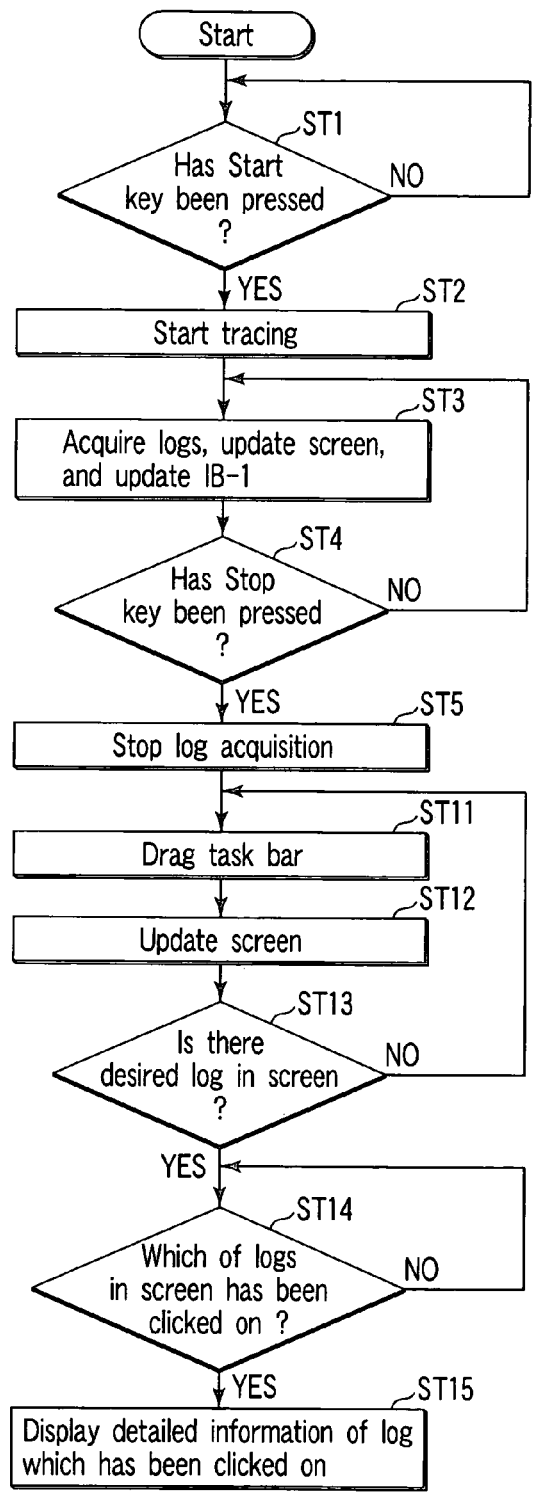
FIG. 23 is a flowchart showing the flow of operations when an objective log is found by the task bar in the performance measurement system for a communication terminal according to the present invention.
Figure 24:
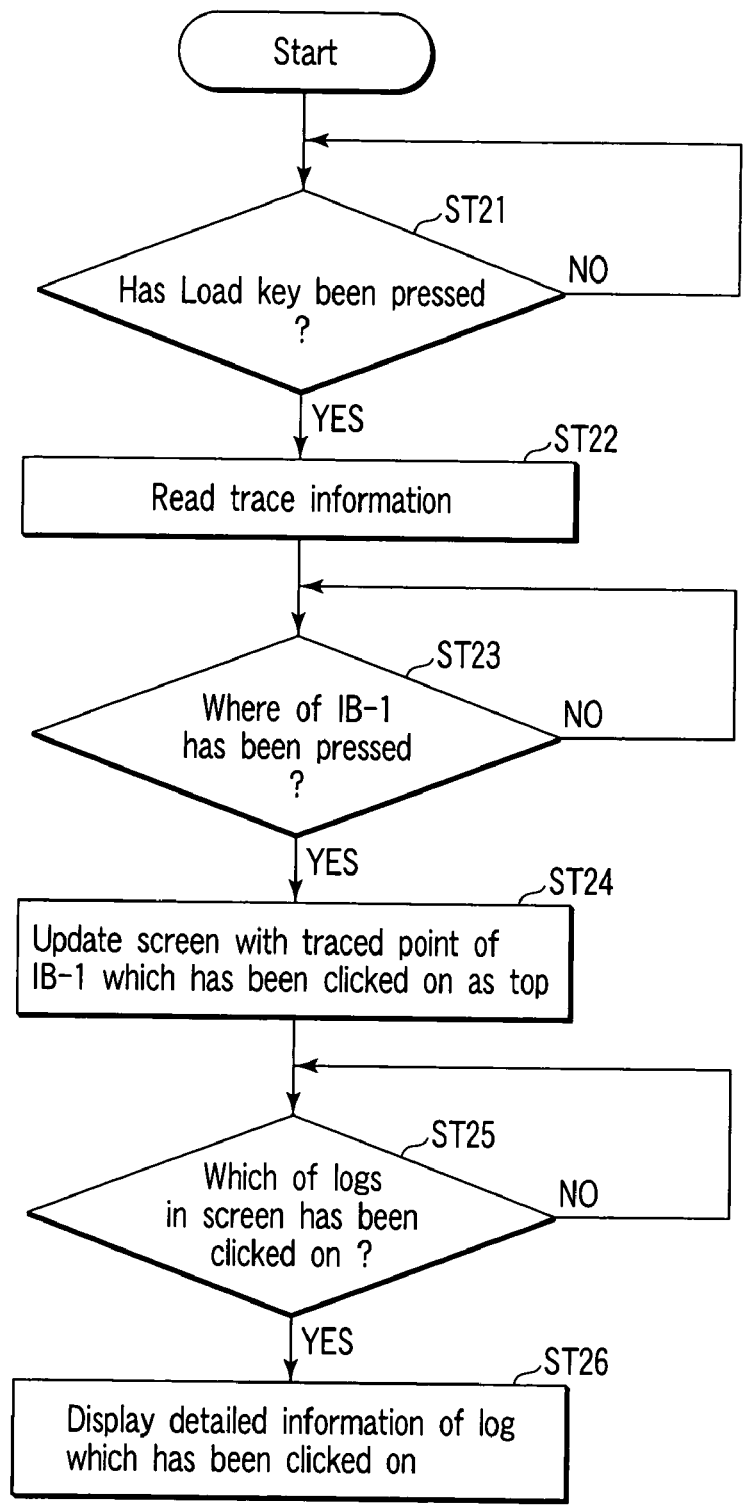
FIG. 24 is a flowchart showing the flow of operations when an objective log is found after loading data in the performance measurement system for a communication terminal according to the present invention.

FIGS. 22 to 24 are flowcharts showing the flows of operations in the performance measurement system for a communication terminal according to the invention.

A performance measurement system 1 for a communication terminal according to the embodiment of the invention displays trace information obtained at the time of a communication test with a communication terminal for being evaluated such as a mobile cellular phone in various formats by a plurality of communication systems having communication protocol types which are different from one another, concretely, W-CDMA (Wideband-Code Division Multiple Access) and GSM (Global System for Mobile communication: digital mobile cellular phone system).

Namely, as shown in FIG. 1, the performance measurement system 1 for a communication terminal according to the invention basically possesses a series of procedures for predetermined performance measurement which correspond to the types of communication systems in a state of connecting a communication terminal 21 for being evaluated. The performance measurement system 1 also has: a communication terminal test measuring instrument 22 which transmits a series of test signals including Config information that is internal configuration information for performing a communication test along the procedures to the communication terminal 21 for being evaluated, and predetermined message information, and which receives a series of reply signals including predetermined message information corresponding to the series of test signals for predetermined performance measurement from the communication terminal 21 for being evaluated; a trace information acquisition section 3 which acquires trace information including a plurality of log information having information on the contents and types of log information based on the predetermined message information on each of the series of test signals transmitted by the communication terminal test measuring instrument 22 and the series of reply signals received by the test measuring instrument 22, and which provides clock time information expressing clock times at which the respective predetermined message information have been acquired to the plurality of log information included in the trace information; a trace information display processing control section 4 which displays on a display 5 the trace information including the plurality of log information acquired by the trace information acquisition section 3 in predetermined formats; and a configuration input information setting section 2 which sets predetermined configuration input information with respect to the trace information acquisition section 3 and the trace information display processing control section 4.

Further, the trace information display processing control section 4 comprises: an indication bar display section 4*a* which displays an indication bar 13 on which the plurality of log information included in the trace information acquired by the trace information acquisition section 3 are arranged in a time series based on the clock time information provided to each of the plurality of log information so as to be identifiable by being sorted in accordance with a type of the predetermined message information based on the information on the contents and types of the log information; and a log sequence display section 4*b* which displays the flows of the series of test signals and the series of reply signals with respect to a predetermined number of log information among the plurality of log information included in the trace information acquired by the trace information acquisition section 3, as log sequences 12 having time stamps 12*b* according to the clock time information provided to each of the predetermined number of log information based on the information on the contents and types of the log information, so as to be associated with the indication bar 13.

Preferably, the trace information display processing control section 4 further comprises a configuration input information setting section 2 which sets predetermined configuration input information with respect to at least one of the trace information acquisition section 3 and the trace information display processing control section 4.

Figure 3:
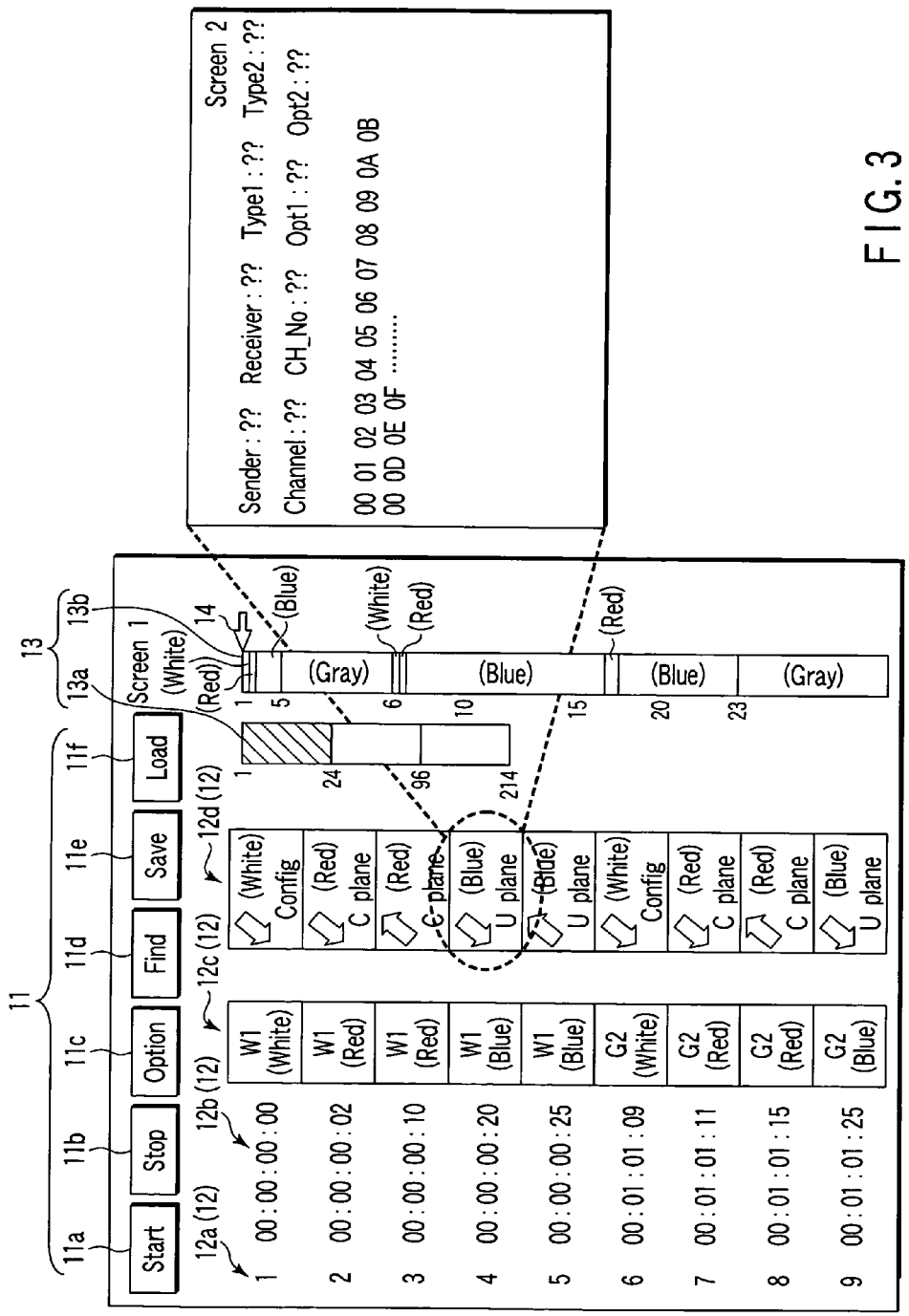
FIG. 3 is a diagram illustrating a configuration of a basic display screen of the performance measurement system for a communication terminal according to the present invention.

Preferably, the trace information display processing control section 4 further comprises a task bar display section 4*c* which displays a task bar 14 as shown in FIG. 3 which will be described later, by which it is possible to select an arbitrary position on the indication bar 13 displayed by the indication bar display section 4*a* based on the configuration input information set by the configuration information setting section 2.

The trace information acquisition section 3 preferably includes a storage section 3 which stores the trace information including the plurality of log information acquired by the trace information acquisition section 3 along with the clock time information provided to the plurality of log information by the trace information acquisition section 3.

The log sequence display section 4*b* preferably comprises a trace information display bar display section 4*b*3 which displays a trace information display bar 12*d* including at least one of a type and a communication direction of a plane of the predetermined message information so as to be shown in FIG. 3 which will be described later, based on the information on the contents and types of the log information with respect to a predetermined number of log information from among the plurality of log information included in the trace information acquired by the trace information acquisition section 3.

It is also preferable that the log sequence display section 4*b* further comprises: a communication system display bar display section 4*b*2 which displays a communication system display bar 12*c* indicating the types of the respective communication systems with respect to a predetermined number of log information among the plurality of log information included in the trace information acquired by the trace information acquisition section 3 so as to correspond to the trace information display bar 12*d* displayed by the trace information display bar display section 4*b*3 based on the information on the contents and types of the log information as shown in FIG. 3 which will be described later; and a time stamp display section 4*b*1 which displays the time stamps 12*b* according to the clock time information provided to each of the predetermined number of log information so as to correspond to the trace information display bar 12 displayed by the trace information display bar display section 4*b*3 and the communication system display bar 12*c* displayed by the communication system display bar display section 4*b*2.

It is also preferable that the log sequence display section 4*b* further comprises an index information display section 4*b*4 which displays index information 12*a* as shown in FIG. 3 which will be described later, which show respective number orders in which a predetermined number of log information among the plurality of log information included in the trace information acquired by the trace information acquisition section 3 have been acquired, so as to correspond to the trace information display bar 12*d* displayed by the trace information display bar display section 4*b*3 and the communication system display bar 12*c* displayed by the communication system display bar display section 4*b*2, along with the time stamps 12*b*.

Figure 20:
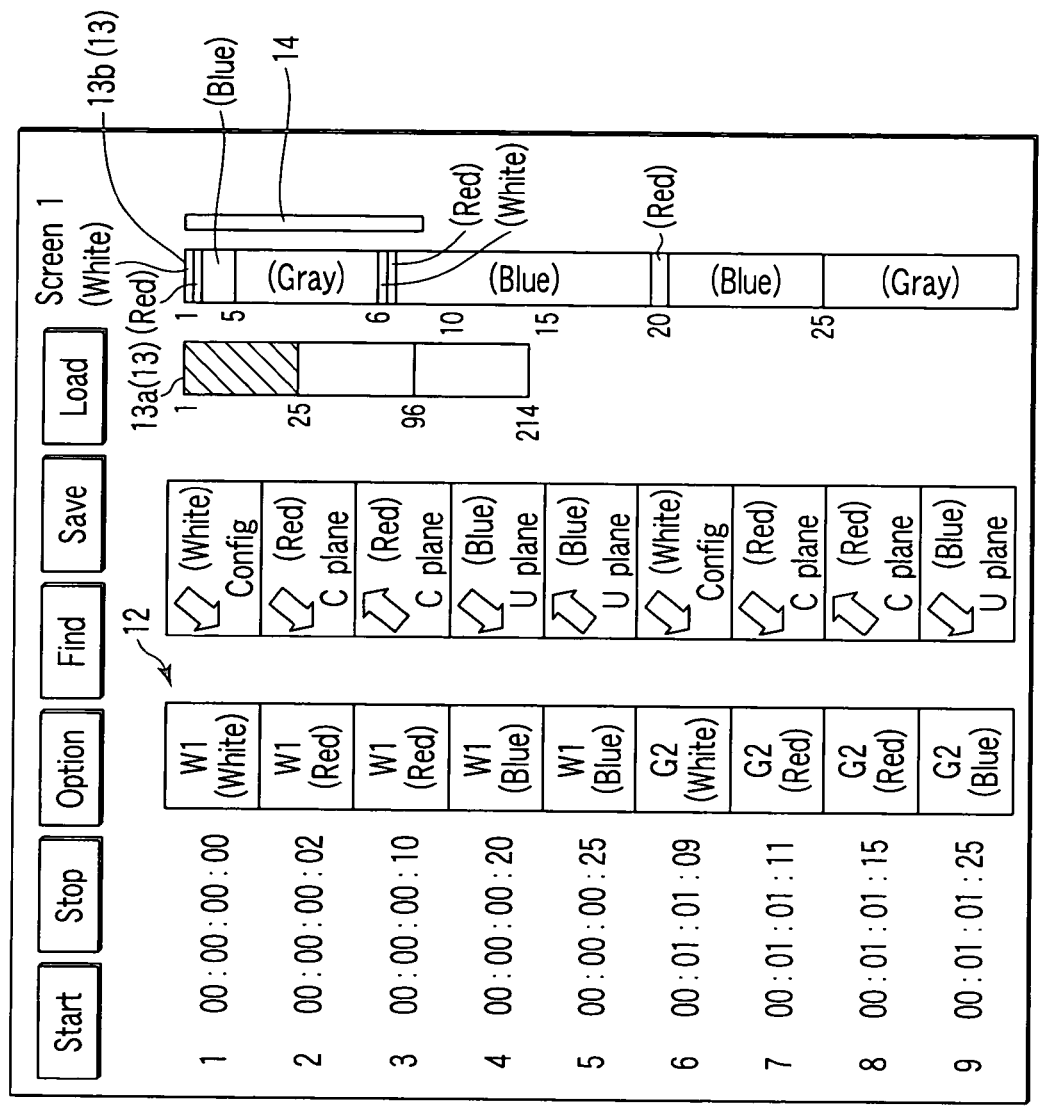
FIG. 20 is a diagram illustrating a display screen when a screen bar is set on the task bar in the performance measurement system for a communication terminal according to the present invention.

In addition, the indication bar display section 4*a* preferably comprises: a first indication bar display section 4*a*1 which displays a predetermined number of log information among the plurality of log information included in the trace information acquired by the trace information acquisition section 3, as a first indication bar 13*b*, as shown in FIG. 20 which will be described later, on which the predetermined number of log information are arranged in a time series based on the clock time information provided to each of the predetermined number of log information so as to be identifiable by being sorted in accordance with the types of the predetermined message information based on the information on the contents and types of the log information; and a second indication bar display section 4*a*2 which displays all the plurality of log information included in the trace information acquired by the trace information acquisition section 3, as a second indication bar 13*a*, as shown in FIG. 20 which will be described later, on which all the plurality of log information are arranged in a time series based on the clock time information provided to each in a state of being substantially compressed without being made to be identifiable by being sorted in accordance with the types of the predetermined message information based on the information on the contents and types of the log information, so as to correspond to the first indication bar 13*b*.

Further, the indication bar display section 4*a* preferably displays an arbitrary position on the second indication bar 13*a* displayed by the second indication bar display section 4*a*2 so as to be selectable based on selection configuration input information set by the configuration input information setting section 2, and displays log information within a predetermined range including the log information at the arbitrary position so as to be enlarged on the first indication bar 13*b* displayed by the first indication bar display section 4*a*1 when an arbitrary position on the second indication bar 13*a* is selected based on selection configuration input information set by the configuration input information setting section 2.

Figure 10:
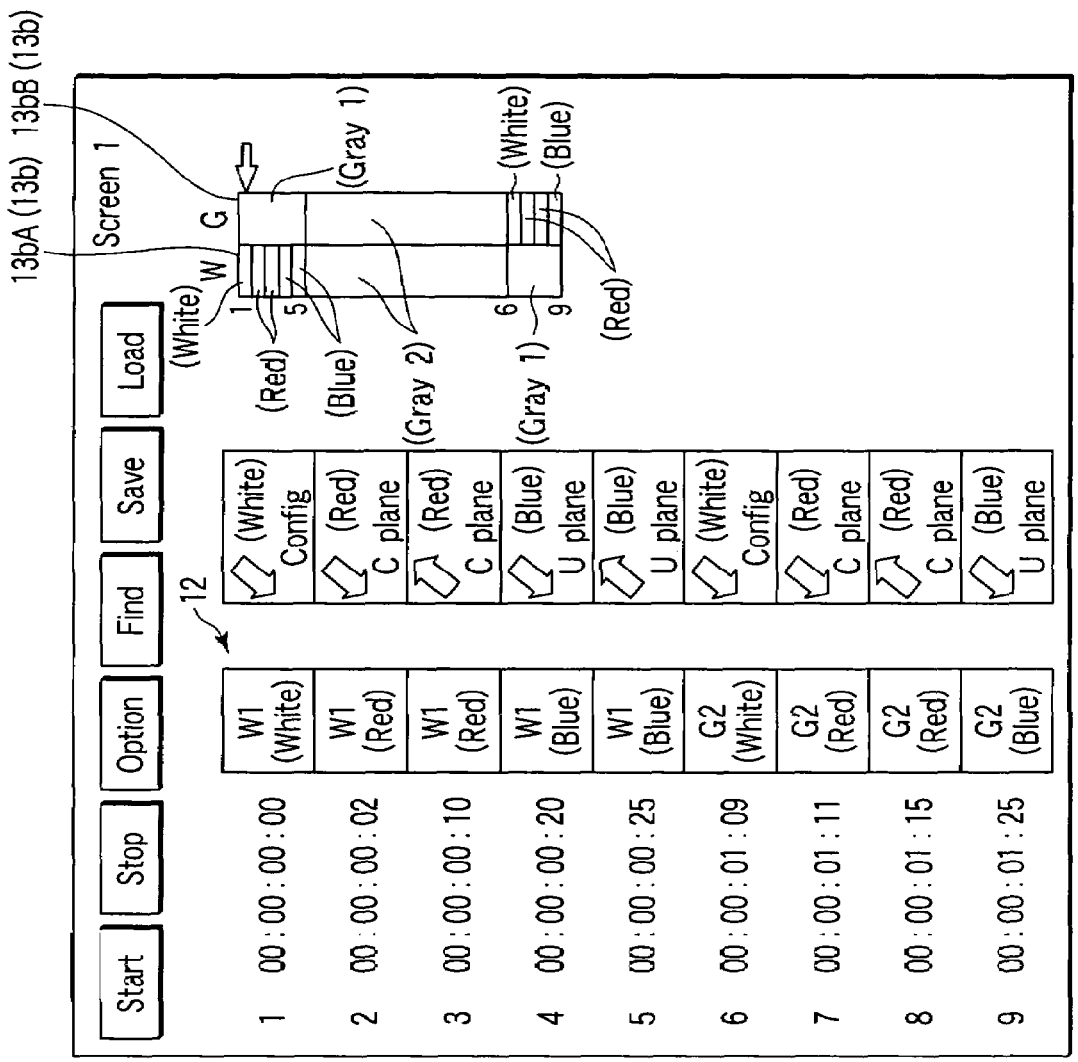
FIG. 10 is a diagram illustrating a display screen when the first indication bar is divided so as to correspond to a plurality of communication systems in the performance measurement system for a communication terminal according to the present invention.

Preferably, the indication bar display section 4*a* comprises a plural-indication-bars display section 4*a*3 which displays a predetermined number of log information among the plurality of log information included in the trace information acquired by the trace information acquisition section 3, as a plurality of indication bars 13*b*A and 13*b*B, as shown in FIG. 10 which will be described later, on which the predetermined number of log information are arranged in a time series based on the clock time information provided to each of the predetermined number of log information so as to be identifiable by being separated into a plurality of bars so as to correspond to the types of the communication systems based on the information on the contents and types of the log information, and so as to be identifiable by being sorted in accordance with the types of the predetermined message information for each bar of the plurality of bars, based on the configuration input information set by the configuration input information setting section 2.

Figure 12:
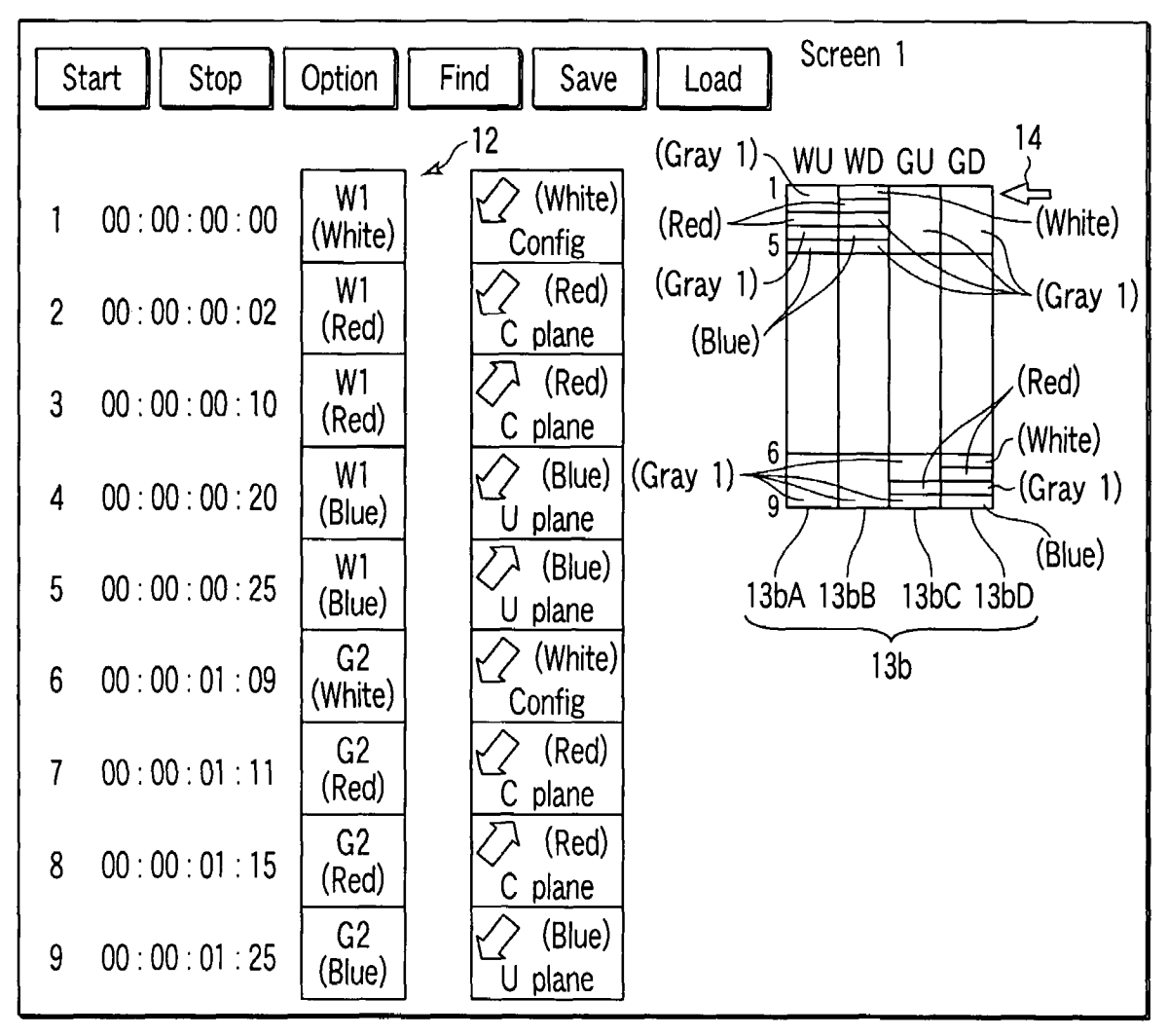

Preferably, the indication bar display section 4*a* has a plural-indication-bars display section 4*a*3 which displays a predetermined number of log information among the plurality of log information included in the trace information acquired by the trace information acquisition section 3, as a plurality of indication bars 13*b*A, 13*b*B, 13*b*C, and 13*b*D as shown in FIG. 12 which will be described later, on which the predetermined number of log information are arranged in a time series based on the clock time information provided to each of the predetermined number of log information so as to be identifiable by being separated into a plurality of bars so as to correspond to the types of the communication systems based on the information on the contents and types of the log information, and so as to be identifiable by being separated into two bars in the up and down communication directions, and so as to be identifiable by being sorted in accordance with the types of the predetermined message information for each bar of the two bars, based on the configuration input information set by the configuration input information setting section 2.

Figure 11:
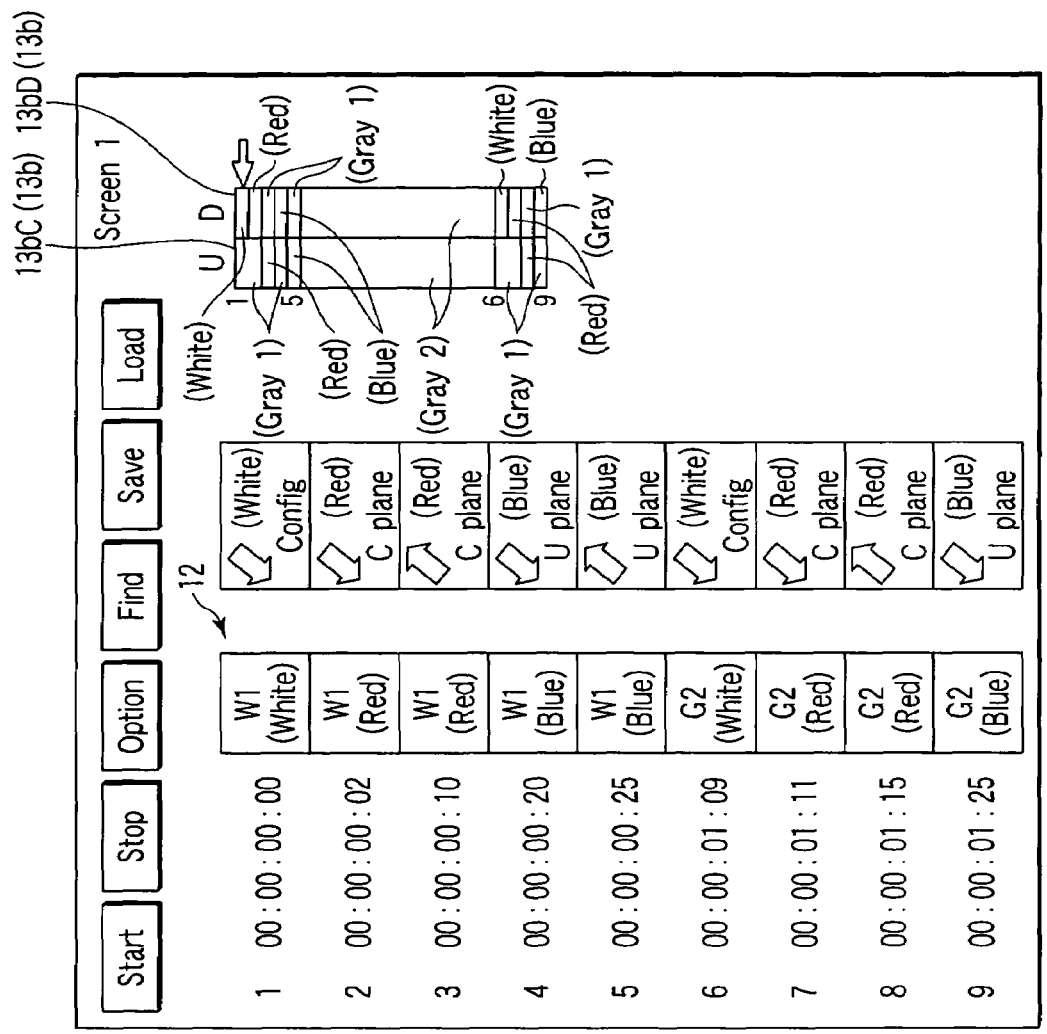
FIG. 11 is a diagram illustrating a display screen when the first indication bar is divided into two in the up and down communication directions in the performance measurement system for a communication terminal according to the present invention.

Furthermore, the indication bar display section 4*a* preferably comprises a two-indication-bars display section 4*a*4 which displays a predetermined number of log information among the plurality of log information included in the trace information acquired by the trace information acquisition section 3, as two indication bars 13*b*C and 13*b*D, as shown in FIG. 11 which will be described later, on which the predetermined number of log information are arranged in a time series based on the clock time information provided to each of the predetermined number of log information so as to be identifiable by being separated into two bars in the up and down communication directions based on the information on the contents and types of the log information, and so as to be identifiable by being sorted in accordance with the types of the predetermined message information for each bar of the two bars, based on the configuration input information set by the configuration input information setting section 2.

Note that, in the above descriptions, suppose that the indication bar display section 4*a*, the log sequence display section 4*b*, and the task bar display section 4*c* which are provided in the trace information display processing control section 4 are provided as a configuration which is realized in a software manner in a display control section 4F of the trace information display processing control section 4 in FIG. 2 which will be described later.

Further, a corresponding place detecting section 4A, an extraction section 4B, an identification section 4C, three editing sections 4D, and a position generating section 4E of the trace information display processing control section 4 in FIG. 2 are also configured to be realized in a software manner.

Then, the performance measurement system 1 for a communication terminal according to the embodiment is schematically configured to comprise, as shown in FIGS. 1 and 2: the communication terminal test measuring instrument 22 which is connected to the communication terminal 21 for being evaluated; the trace information acquisition section 3 which is connected to the communication terminal test measuring instrument 22; the trace information display processing control section 4 which is connected to the trace information acquisition section 3; the configuration input information setting section 2 which is connected to the trace information acquisition section 3 and the trace information display processing control section 4; and the display 5 which is connected to the trace information display processing control section 4.

Figure 26:
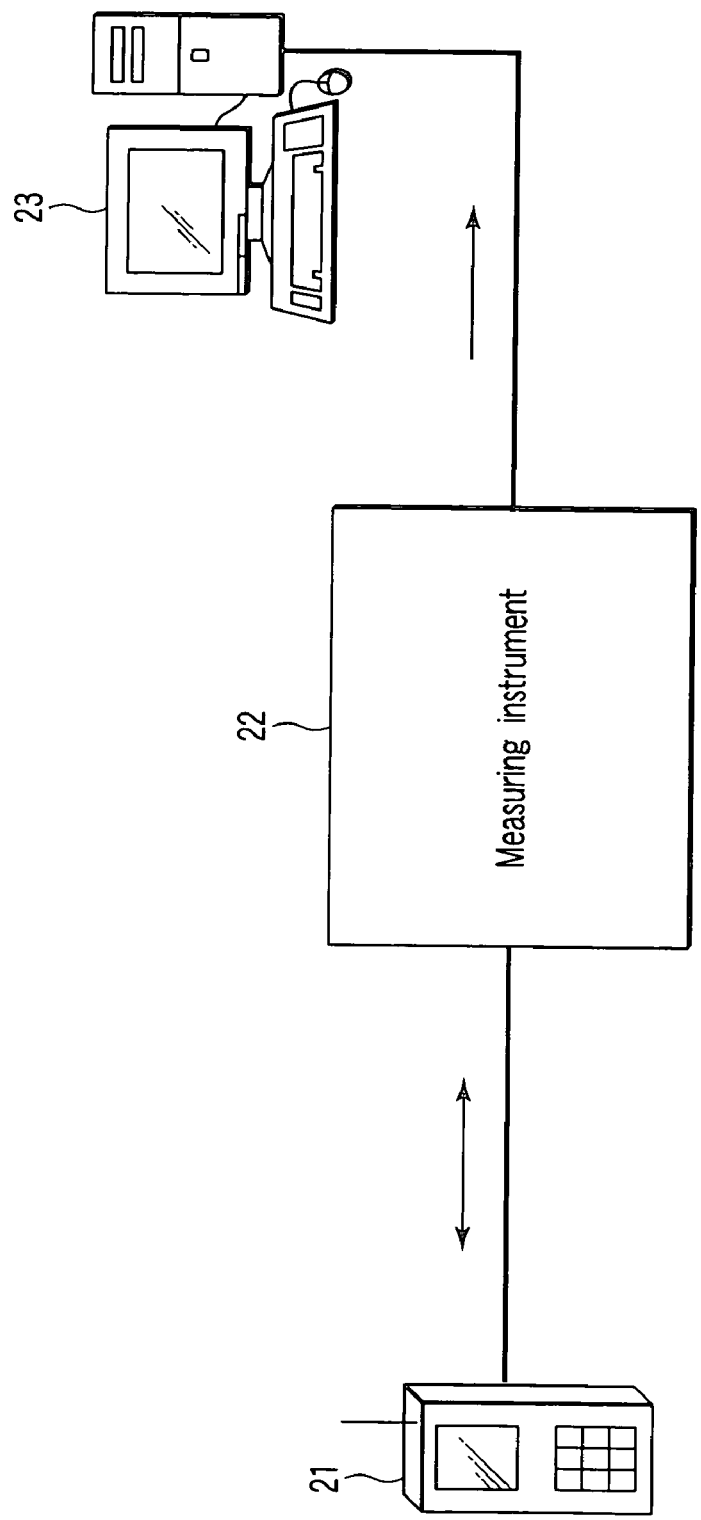
FIG. 26 is a schematic block diagram of a performance measurement system for a communication terminal in a prior art.
Figure 27:
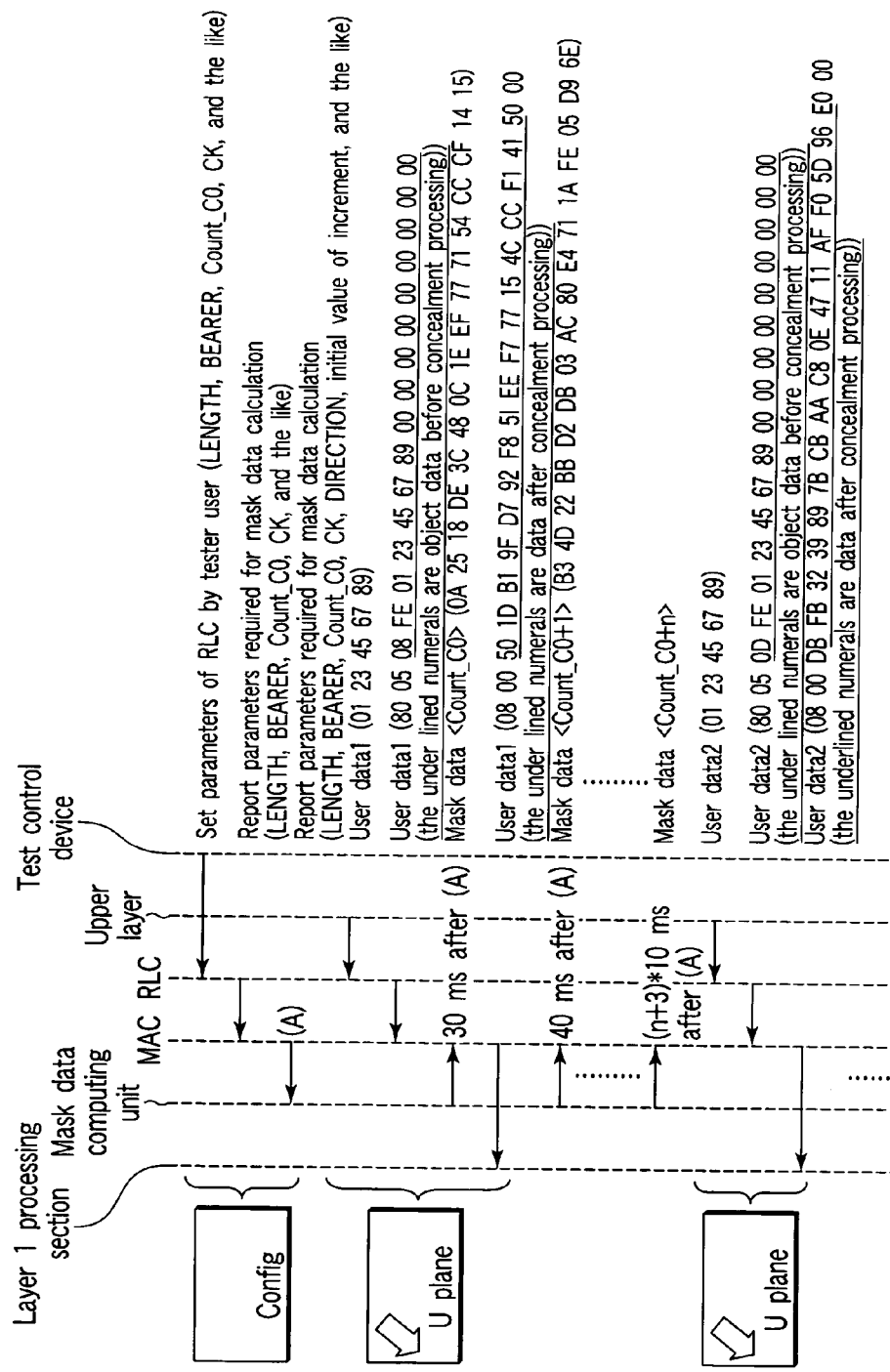
FIG. 27 is a diagram showing a display example of trace information by the conventional performance measurement apparatus for a communication terminal disclosed in Pat. Document 1.

Here, it is sufficient that the communication terminal test measuring instrument 22 basically possesses a series of procedures for predetermined performance measurement which correspond to a plurality of communication systems in a state of connecting the communication terminal 21 for being evaluated, and transmits a series of test signals including internal configuration (Config) information for carrying out a communication test along the procedures and predetermined message information to the communication terminal 21 for being evaluated, and receives a series of reply signals including the predetermined message information corresponding to the series of test signals for predetermined performance measurement from the communication terminal 21 for being evaluated. The communication terminal test measuring instrument 22 shown in FIG. 26, a testing device disclosed in the above-described Pat. Document 1, or the like, in particular, a signaling tester disclosed in non-Pat. Document 1 can be used.

Non-Pat. Document 1: Signaling Tester "MD8470A" Manufactured by ANRITSU CORPORATION (Catalog No. MD8470A-E-A-1-(1.00) Printed in Japan 2004.7 W/CDT)

Further, in the above-described schematic configuration, the configuration input information setting section 2, the trace information acquisition section 3, the display processing control section 4, and the display 5 may be realized, concretely, so as to be mounted in, for example, a personal computer or the like, and may be realized so as to be configured inside the communication terminal test measuring instrument 22.

Accordingly, suppose that input devices (not shown) such as a mouse or a keyboard are incidental to the configuration input information setting section 2.

Specifically, the configuration input information setting section 2 has as one factor thereof as shown in FIG. 3 which will be described later, a plurality of operation keys 11 displayed on the top end portion of the display screen of the display 5 (a screen for ordinary display denoted by screen 1 in FIGS. 3 to 21, hereinafter put down with the screen 1).

In FIG. 3, the plurality of keys 11 are composed of a Start key 11a, a Stop key 11b, an Option key 11c, a Find key 11d, a Save key 11e, and a Load key 11f which are displayed so as to be disposed in single file from left to right on the display screen (screen 1) of the display 5 by an operation key display section (not shown).

The Start key 11a is, as will be described later, operated by an operator at the time of starting acquisition of trace information.

The Stop key 11b is, as will be described later, operated by an operator at the time of stopping acquisition of trace information.

The Option key 11c is, as will be described later, operated by an operator at the time of carrying out setting of the indication bar 13, setting of the types of communication systems to be displayed from trace information to be acquired, setting of the layout of colors of the respective communication systems to be displayed, setting of the task bar 14, setting of search conditions, setting of the trigger key, or the like.

The Find key 11d is, as will be described later, operated at the time of searching objective trace information from among the trace information.

The Save key 11e is, as will be described later, operated by an operator at the time of storing acquired trace information as another file in the storage section 3a of the trace information acquisition section 3.

The Load key 11f is, as will be described later, operated by an operator at the time of reading the trace information which have been acquired and stored in advance as a log file in the storage section 3a of the trace information acquisition section 3.

The plurality of operation keys 11 output instructional information thereof to the display control section 4F of the trace information display processing control section 4.

The configuration input information setting section 2 has, as components other than the operation keys 11, as shown in FIG. 2, a selection section 2a, a communication system switching section (GSM/W-CDMA switching section) 2b, a position switching section (up/down switching section) 2c, a search condition setting section 2d, and a trigger key setting section 2e.

Here, as will be described later, the selection section 2a outputs selected position information at that time to the display control section 4F of the trace information display processing control section 4 which will be described later, when the operator selects arbitrary positions on the log sequences 12, the indication bars 13, and the task bar 14 in the display screen by moving a pointer (not shown) in the display screen (screen 1) displayed on the display 5 with, for example, a mouse, a keyboard, or the like incidental to a personal computer or the like.

The communication system switching section 2b is used for that the operator, as will be described later, carries out switching of W-CDMA (abbr.; W in the illustration) and GSM (abbr.; G in the illustration) which are the protocol types of the communication systems to be displayed (the communication system types) from the acquired trace information, and the communication system switching section 2b outputs switching information at that time to the extraction section 4B of the display processing control section 4 which will be described later.

As will be described later, when the operator scrolls (or drags) up and down the task bar 14 displayed along with the indication bar 13 on the display screen (screen 1) of the display 5 by moving a pointer (not shown) in the display screen (screen 1) displayed on the display 5 with, for example, a mouse, a keyboard, or the like, the position switching section 2c outputs position switching information showing a traveled distance according to the scrolling (or dragging) to the extraction section 4B of the display processing control section 4 which will be described later.

The search condition setting section 2d is used for that the operator carries out setting of predetermined search conditions, as will be described later, at the time of setting of search conditions for searching from the acquired trace information through an operation of the Option key 11c, and the search condition setting section 2d outputs the search conditions at that time to the corresponding place detecting section 4A of the display processing control section 4 which will be described later.

The trigger key setting section 2e is used along with the search condition setting section 2d when the operator carries out setting of a predetermined trigger key, as will be described later, at the time of setting of a trigger key for searching trace information which is currently being acquired as needed based on a trigger key through an operation of the Option key 11c, and the trigger key setting section 2e outputs the setting of the trigger key and the search conditions at that time to the corresponding place detecting section 4A of the display processing control section 4 which will be described later.

The storage section 3a of the trace information acquisition section 3 stores log information of information (including Config information and the like) relating to communication which are obtained by a communication test between the communication terminal 21 for being evaluated such as a mobile cellular phone and the communication terminal test measuring instrument 22 along with the acquired clock time information (time stamps) as log files. This enables the operator to perform performance evaluation of the communication terminal 21 in real time by using the acquired trace information, and the already acquired trace information can be presented to the operator so as to be retroactive.

The storage section 3a of the trace information acquisition section 3 enables the operator to carry out performance evaluation of the communication terminal 21 in off-time due to the already acquired trace information having been stored as log files.

The trace information display processing control section 4 comprises the corresponding place detecting section 4A, the extraction section 4B, the identification section 4C, the 3zk editing sections 4D, the position generating section 4E, and the display control section 4F.

The corresponding place detecting section 4A detects a corresponding place from information inputted from the display control section 4F based on the selected position information from the selection section 2a of the configuration input information setting section 2, and outputs the detected information to the position generating section 4E and the storage section 3a of the trace information acquisition section 3.

Then, the storage section 3a of the trace information acquisition section 3 reads the log information corresponding to the detected information from the corresponding place detecting section 4A, and outputs it to the extraction section 4B.

The extraction section 4B has communication system switching information and position switching information inputted therein from the system switching section 2b and the position switching section 2c of the configuration input information setting section 2, and the extraction section 4B extracts information necessary for a display on the display 5 from among the log information read from the storage section 3a of the trace information acquisition section 3 based on these switching information and the detected information from the corresponding place detecting section 4A.

The identification section 4C identifies Config, and C planes and U planes of the messages based on the information extracted by the extraction section 4B.

Here, Config are internal configuration information with which the communication terminal test measuring instrument 22 makes communication with the communication terminal 21 for being evaluated in a predetermined communication system.

C planes (control planes) show various control information before a call with the communication terminal 21, such as a using frequency and a call timing of the communication terminal 21 for being evaluated.

Moreover, U planes (user planes) show user information (call data and the like).

The editing section 4D has an identification data editing section 4D1, a scenario message editing section 4D2, and a config information editing section 4D3.

The identification data editing section 4D1, not only generates the indication bars 13 based on the identification data from the identification section 4C, but also edits color coding, division number, and the like of the log sequences 12 and the indication bars 13, and outputs those edited information to the display control section 4F.

The scenario message editing section 4D2 carries out editing for a display of a scenario message of the trace information from the storage section 3a of the trace information acquisition section 3 and the details of parameters attached thereto to be displayed on the display screen of the display 5 (a screen for displaying detailed information inscribed with screen 2, and hereinafter, which will be put down with screen 2), and outputs those to the display control section 4F.

When there is an error in a scenario message or the like displayed on the display screen (screen 2) of the display 5 by the editing of the scenario message editing section 4D2, it is easy to correct the scenario message or the like at the communication terminal test measuring instrument 22.

The config information editing section 4D3 edits the detailed contents of the config information used for the initial setting of the measuring instrument 22 in order for the communication terminal 21 for being evaluated such as a mobile cellular phone and the communication terminal test measuring instrument 22 to communicate with each other, as config information based on the trace information from the storage section 3a of the trace information acquisition section 3 to be displayed on the display screen (screen 2) of the display 5, and outputs it to the display control section 4F.

The position generating section 4E outputs positional information showing a display position of the indication bars 13 to the display control section 4F based on the detected information from the corresponding place detecting section 4A.

The display control section 4F controls display contents of the display 5 in order to carry out display of the trace information and configuration display in predetermined formats as shown in FIGS. 3 to 21, and 25, based on the detected information from the corresponding place detecting section 4A based on the selected position information from the selection section 2a of the configuration input information setting section 2, the various editing information from the editing section 4A, and the positional information from the position generating section 4E.

Note that, suppose that the indication bar display section 4a, the log sequence display section 4b, and the task bar display section 4c, which are to be provided in the trace information display processing control section 4 shown in FIG. 1, are provided to be configuration realized in a software manner in the display control section 4F.

The display 5 carries out displays of various display screens (screen 1 and screen 2) as shown in FIGS. 3 to 21, and 25 under the control of the display control section 4F based on the configuration information from the configuration input information setting section 2.

Namely, here, in the display control section 4F of the trace information display processing control section 4, the indication bar display section 4a, the log sequence display section 4b, and the task bar display section 4c as shown in FIG. 1 are realized in a software manner with a functional configuration including the corresponding place detecting section 4b, the extraction section 4B, the identification section 4C, the editing section 4D, the position generating section 4E, and the display control section 4F of the display processing control section 4 of FIG. 2.

Note that, with respect to the screen 2 among the display screens of the display 5, not only the display region thereof is the entire display screen in the same way as the screen 1, but also the display region thereof may be a part of the display screen so as to be displayed as pop-up on the screen 1.

As shown in FIG. 3, on the display screen (screen 1) of the display screen 5, the plurality of operation keys 11 are displayed so as to be lined up in single file from left to right at the top end portion of the display screen (screen 1) by the operation key display section (not shown) in the display control section 4F.

Further, on the display screen (screen 1) of the display 5, the indication bars 13 on which the plurality of log information included in the trace information acquired by the trace information acquisition section 3 are arranged in a time series based on the respective time stamps so as to be identifiable by being sorted in accordance with the respective types are displayed by the indication bar display section 4a.

Furthermore, on the display screen (screen 1) of the display 5, the log sequences 12 of the trace information acquired by the trace information acquisition section 3 are displayed by the log sequence display section 4b.

At that time, the log sequences 12 displayed by the log sequence display section 4b and the indication bars 13 displayed by the indication bar display section 4a are displayed in parallel so as to be associated with one another on the display screen (screen 1).

The log sequences 12 displayed by the log sequence display section 4b and the indication bars 13 displayed by the indication bar display section 4a are updated to be displayed simultaneously every time one log information of the trace information is acquired on the display screen (screen 1) of the display 5.

As shown in FIG. 3, the log sequences 12 displayed on the display screen (screen 1) by the log sequence display section 4b are composed of: the communication system display bar 12c on which the types of acquired communication systems (protocol types of traced communication systems) are displayed by the communication system display bar display section 4b2; the trace information display bar 12d on which Config information which are the configuration information for making communication as the contents of communication of the communication systems, the types of the planes structuring the protocols of the communication systems, and the directions of communication are displayed by the trace information display bar display section 4b3 so as to correspond to the communication system display bar 12c; the trace acquisition numbers 12a serving as index information displayed by the index information display section 4b4 so as to correspond to the communication system display bar 12c and the trace information display bar 12d; and the time stamps 12b on which clock times when the respective sequences have been acquired (trace acquired clock time) are displayed by the time stamp display section 4b1 so as to correspond to the communication system display bar 12c and the trace information display bar 12d.

With respect to a display of the log sequences 12, the communication system display bar 12c and the trace information display bar 12d are displayed so as to be in color coding in accordance with the types.

For example, in the example of FIG. 3, on the communication system display bar 12c and the trace information display bar 12d, the trace acquisition numbers 1 and 6 are displayed by color coding in white as Config information, and the trace acquisition numbers 2, 3, 7, and 8 are displayed by color coding in red as C plane information, and the trace acquisition numbers 4, 5, and 9 are displayed by color coding in blue as U plane information.

Further, when an arbitrary position of the trace information display bar 12d is selected by the operator with respect to a display of the log sequences 12, the log sequence display section 4b displays as pop-up the detailed information of the selected sequence so as to be enlarged on the display screen (screen 2), for example, in the format as shown in FIG. 3.

Note that, when the detailed information of the sequence is displayed, it is sufficient that the operator may select an arbitrary record of the log sequences 12 by, for example, clocking a mouse or the like. Even if the operator selects arbitrary positions of, not only the trace information display bar 12d, but also the trace acquisition numbers 12a, the time stamps 12b, and the communication system display bar 12c by clocking, the detailed information of the sequence can be displayed.

As shown in FIG. 3, the indication bars 13 has the first indication bar (IB-1) 13b displayed by the first indication bar display section 4a1 and the second indication bar (IB-2) 13a displayed by the second indication bar display section 4a2 in parallel with the display of the log sequences 12 (on the right side of the display of the log sequences 12 in FIG. 3).

The fist indication bar 13b is displayed by the first indication bar display section 4a1 such that a plurality of log information included in the log file of the trace information acquired by the trace information acquisition section 3 are made to be identifiable in a time series.

In the example of FIG. 3, the fist indication bar 13b is displayed by the first indication bar display section 4a1 by color coding such that the log information on the trace acquisition numbers 1 to 24 are made to substantially correspond to a part of the log sequences 12.

At that time, the task bar 14 is displayed by the task bar display section 4c in the vicinity of the fist indication bar 13b (on the right side in the illustration).

Further, the log sequences 12 of the trace acquisition numbers 1 to 9 are displayed by the log sequence display section 4b such that the log sequence 12 of the log information corresponding to the position of the task bar 14 is as the top.

Note that the log sequence display section 4b is set so as not to display records of log information in an off-line state at the time of displaying the log sequences 12.

For example, as shown in FIG. 3, a section between the trace acquisition numbers 5 and 6 (the gray part in FIG. 3) on the first indication bar 13b shows an off-line state, and on the other hand, the record of the log information between the trace acquisition numbers 5 and 6 is not displayed as the log sequences 12.

The trace acquisition numbers may be set so as to be provided to log information in an off-line state.

The second indication bar 13a is displayed by the second indication bar display section 4a2 so as to be used when the first indication bar 13b is too long to be fitted into the display screen (screen 1).

In the example of FIG. 3, the log information on the trace acquisition numbers 1 to 214 are displayed on the second indication bar 13a.

When an arbitrary place on the second indication bar 13a (an arbitrary place on the bar display) is selected by the operator in the same way as described above, the first indication bar 13b on a range corresponding to the selected portion is displayed in parallel with the second indication bar 13a by the first indication bar display section 4a1.

In the example of FIG. 3, when one part of the log information 1 to 24 on the second indication bar 13a is selected, the log information on the trace acquisition numbers 1 to 24 on the first indication bar 13b are displayed by color coding by the first indication bar display section 4a1.

Then, the log sequences 12 of the trace acquisition numbers 1 to 9 are displayed by the log sequence display section 4b by color coding so as to correspond to the colors of the respective log information of the first indication bar 13b, with the trace acquisition number 1 at which the task bar 14 is positioned being as the top.

In this way, the second indication bar 13a is displayed by the second indication bar display section 4a2 so as to be in a state of including all the log information included in the log file corresponding to one time communication test stored in the storage section 3a of the trace information acquisition section 3.

Then, the fist indication bar 13b is displayed by the first indication bar display section 4a1 such that the log information on a predetermined range including arbitrary log information (for example, a displayable range on the first indication bar 13b) selected from the second indication bar 13a is enlarged.

Further, the second indication bar 13a may be set so as to be displayed by sectioning a predetermined range by the second indication bar display section 4a2.

Next, the flow of the basic operations of the performance measurement system 1 for a communication terminal having the above-described configuration will be described with reference to the flowchart shown in FIG. 22.

Figure 4:
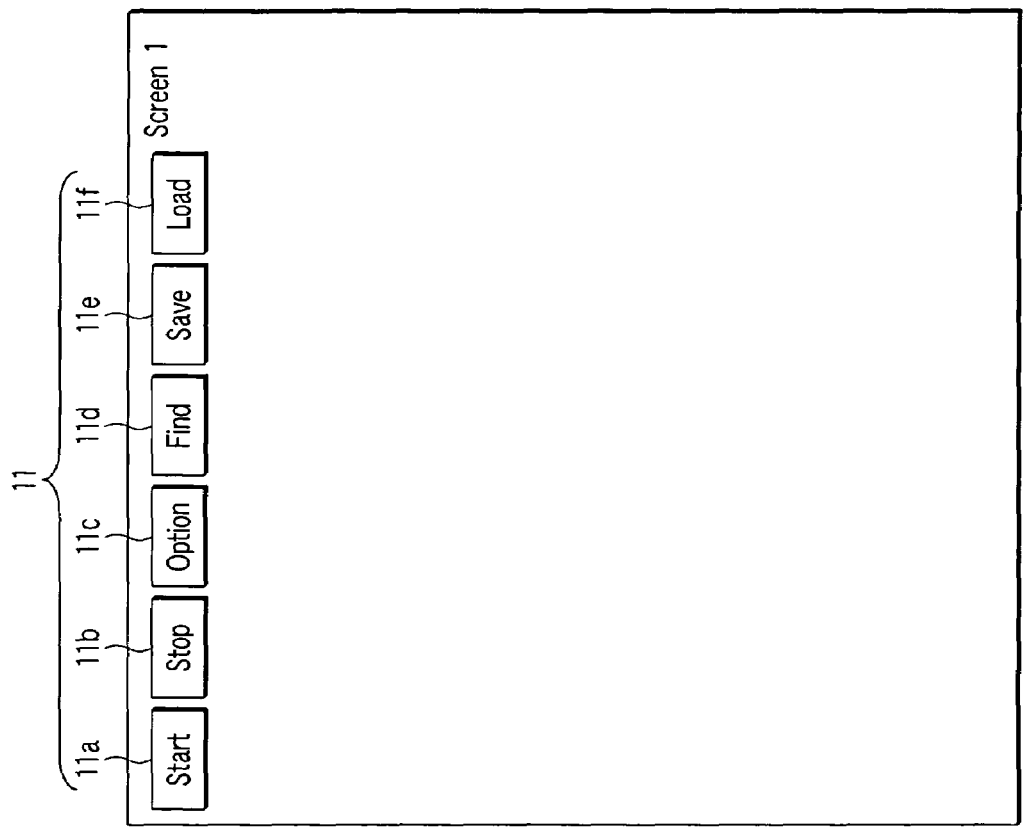
FIG. 4 is a diagram illustrating a display screen before starting trace acquisition of the performance measurement system for a communication terminal according to the present invention.

As shown in FIG. 4, the display screen (screen 1) of the display 5 is in a state in which nothing has been displayed other than the operation keys 11 displayed by the operation key display section described above and an initial screen setting section (not shown) before trace information log acquisition.

In this initial screen state, when the Start key 11a of the operation keys 11 in the display screen (screen 1) of the display 5 is clicked on with, for example, a mouse, a keyboard, or the like, by the operator (step ST1-Yes), trace information log acquisition is started (step ST2).

Namely, in this case, the instructional information of the Start key 11a of the operation keys 11 is issued as an instruction to start trace information log acquisition from the configuration input information setting section 2 shown in FIG. 1 via the display control section 4F and the corresponding place detecting section 4A of the display processing control section 4, and the trace information acquisition section 3. Consequently, a communication test between the communication terminal test measuring instrument 22 and the communication terminal 21 for being evaluated is started via the trace information acquisition section 3.

Figure 5:
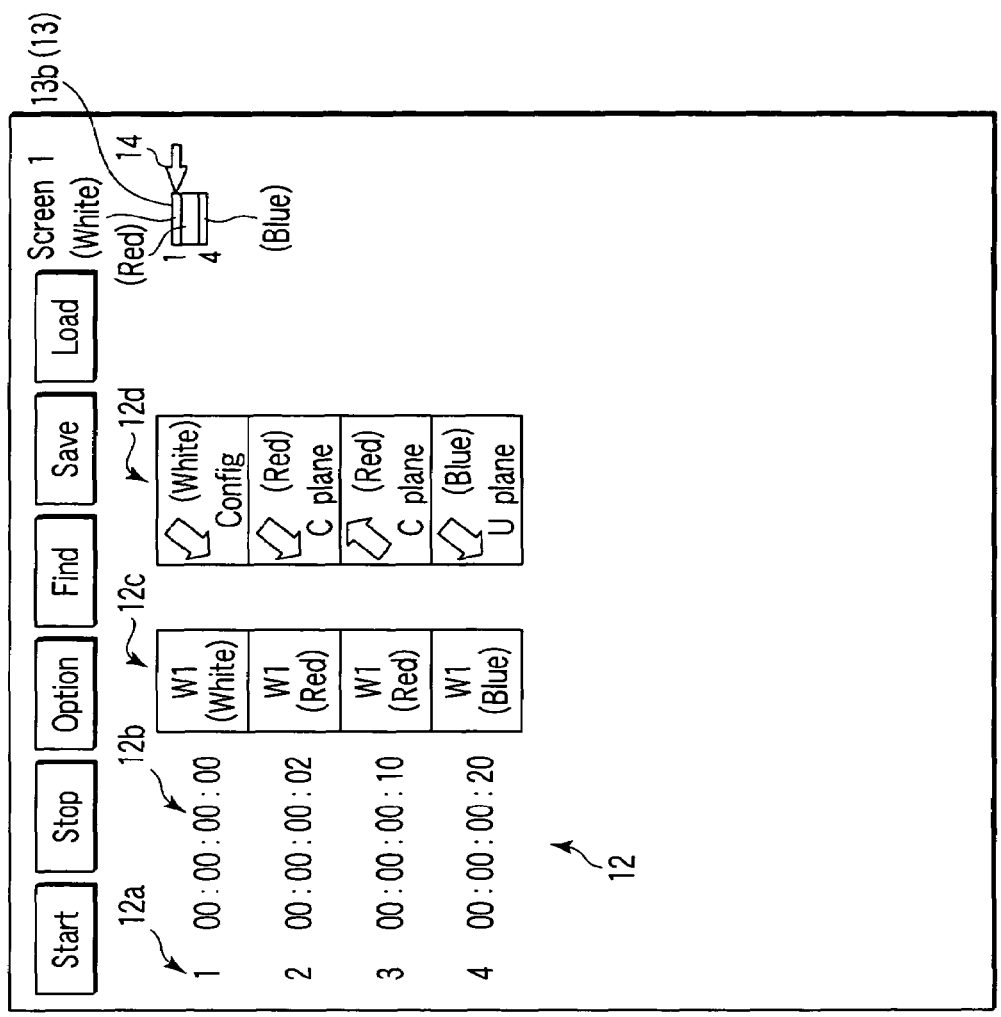
FIG. 5 is a diagram illustrating a display screen immediately after starting trace acquisition of the performance measurement system for a communication terminal according to the present invention.

Then, the log acquisition by the communication test is started by the trace information acquisition section 3. In this case, on the display screen (screen 1) of the display 5, as shown in FIG. 5, the display of the log sequences 12 is updated by the log sequence display section 4b every time one log is acquired, and at the same time, the display of the first indication bar (IB-1) 13b is also updated by the first indication bar display section (4a1) (step ST3).

Then, when the Stop key 11b of the operation keys 11 is clicked on by the operator (step ST4-Yes), the trace information log acquisition by the trace information acquisition section 3 is stopped (step ST5).

Figure 6:
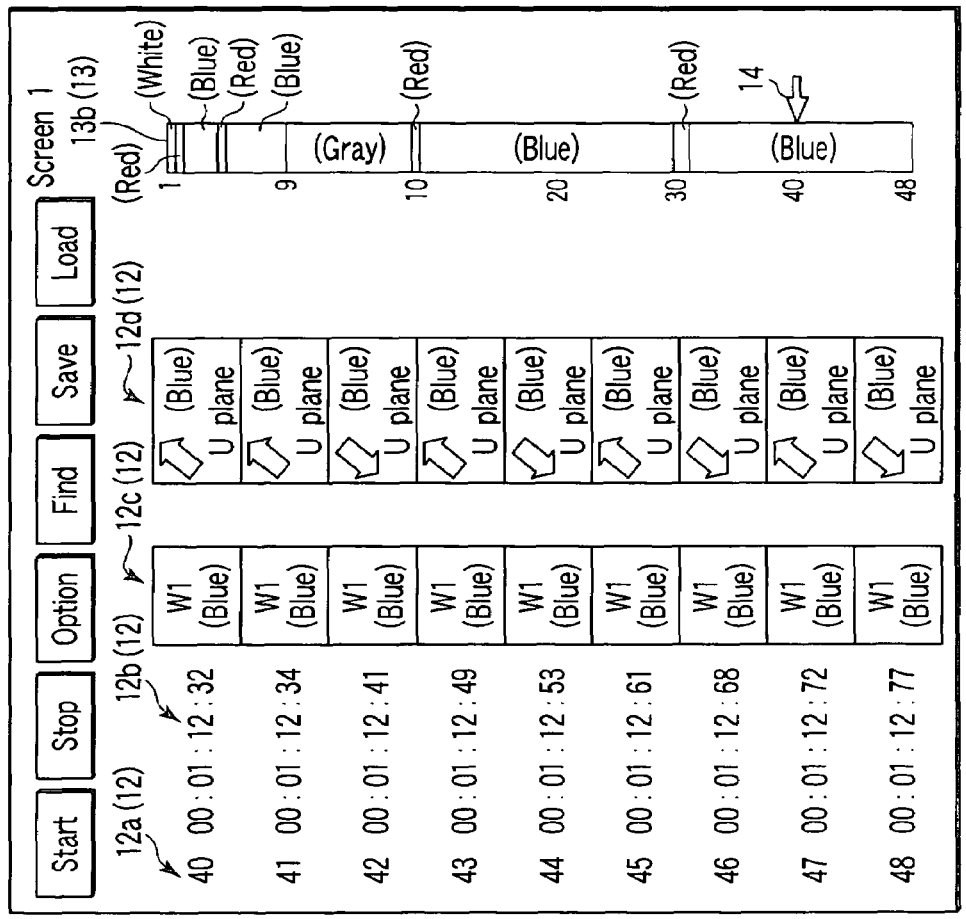
FIG. 6 is a diagram illustrating a display screen immediately after terminating trace acquisition of the performance measurement system for a communication terminal according to the present invention.

FIG. 6 illustrates the display screen (screen 1) of the display 5 immediately after the trace information log acquisition has been stopped.

In the example of FIG. 6, the display screen (screen 1) of the display 5 in a state in which the trace information log acquisition, i.e., the logs of the trace acquisition numbers 1 to 48 have been acquired and stopped is shown.

In the state of the display screen in FIG. 6, the first indication bar 13b is displayed by the first indication bar display section 4a1 by color coding with a bar showing the flow of the trace-information of the trace acquisition numbers 1 to 48.

In addition, in the state of the display screen in FIG. 6, the task bar 14 is displayed by the task bar display section 4c on the right side of the first indication bar 13b so as to be at a position corresponding to the log information (trace acquisition number 40) at the top of the up-to-date log sequence 12 currently displayed by the log sequence display section 4b.

The log sequences 12 of the trace acquisition numbers 40 to 48 are displayed by the log sequence display section 4b by color coding so as to correspond to the colors of the respective log information of the first indication bar 13b with a log acquired last time being as the tail end.

Thereafter, the display control section 4F determines whether or not an arbitrary position on the first indication bar 13b has been selected by the operator (for example, as described above, whether or not the pointer in the display screen serving as the selection section 2a has been moved to the arbitrary position on the first indication bar 13b with a mouse or a keyboard) (step ST6).

Then, when it is determined that an arbitrary position on the first indication bar 13b has been selected by the operator (step ST6-Yes), the display screen (screen 1) is updated such that the trace information (log) at the selected arbitrary position is displayed at the top on the first indication bar 13b by the first indication bar display section 4a1 (step ST7).

Figure 7:
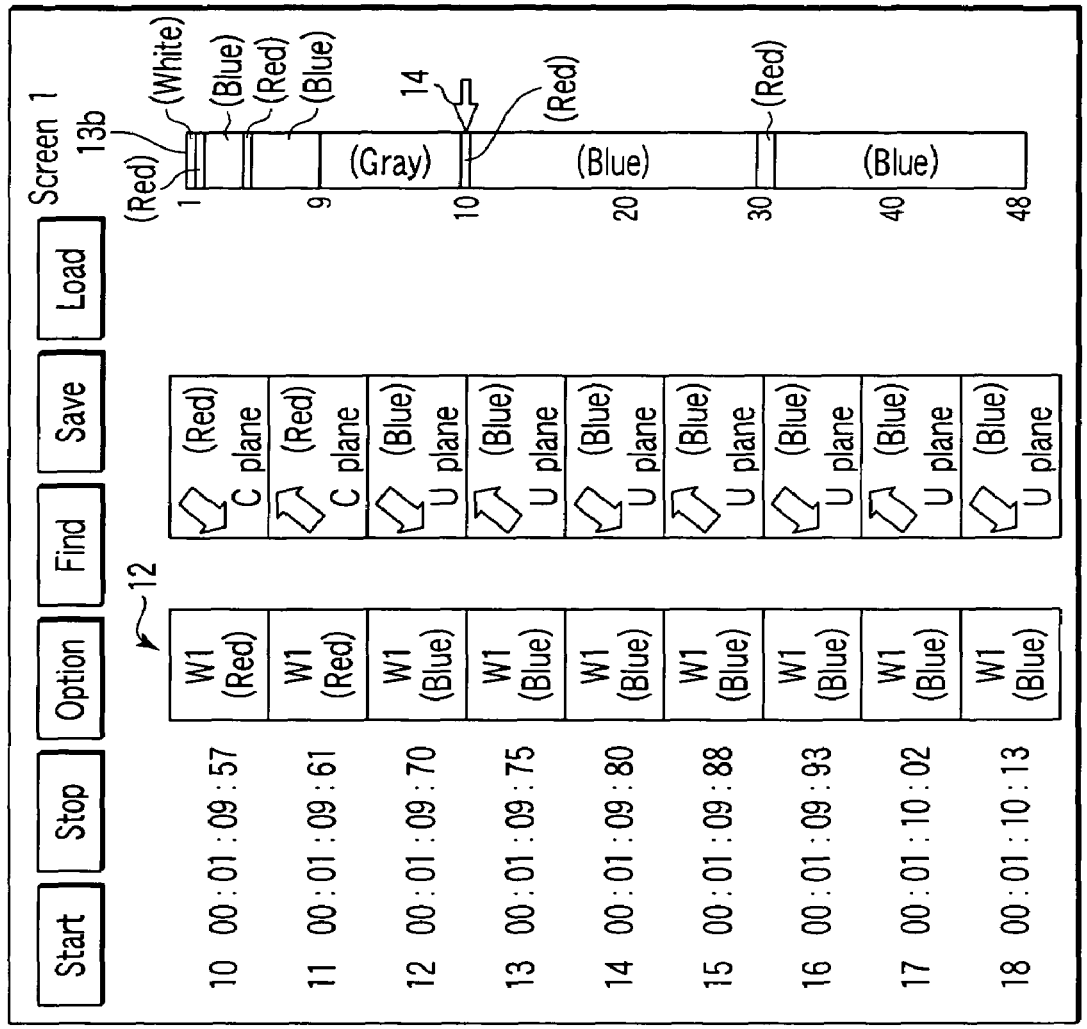
FIG. 7 is a diagram illustrating a display screen when a task bar is dragged up to an arbitrary position in the performance measurement system for a communication terminal according to the present invention.
Figure 8:
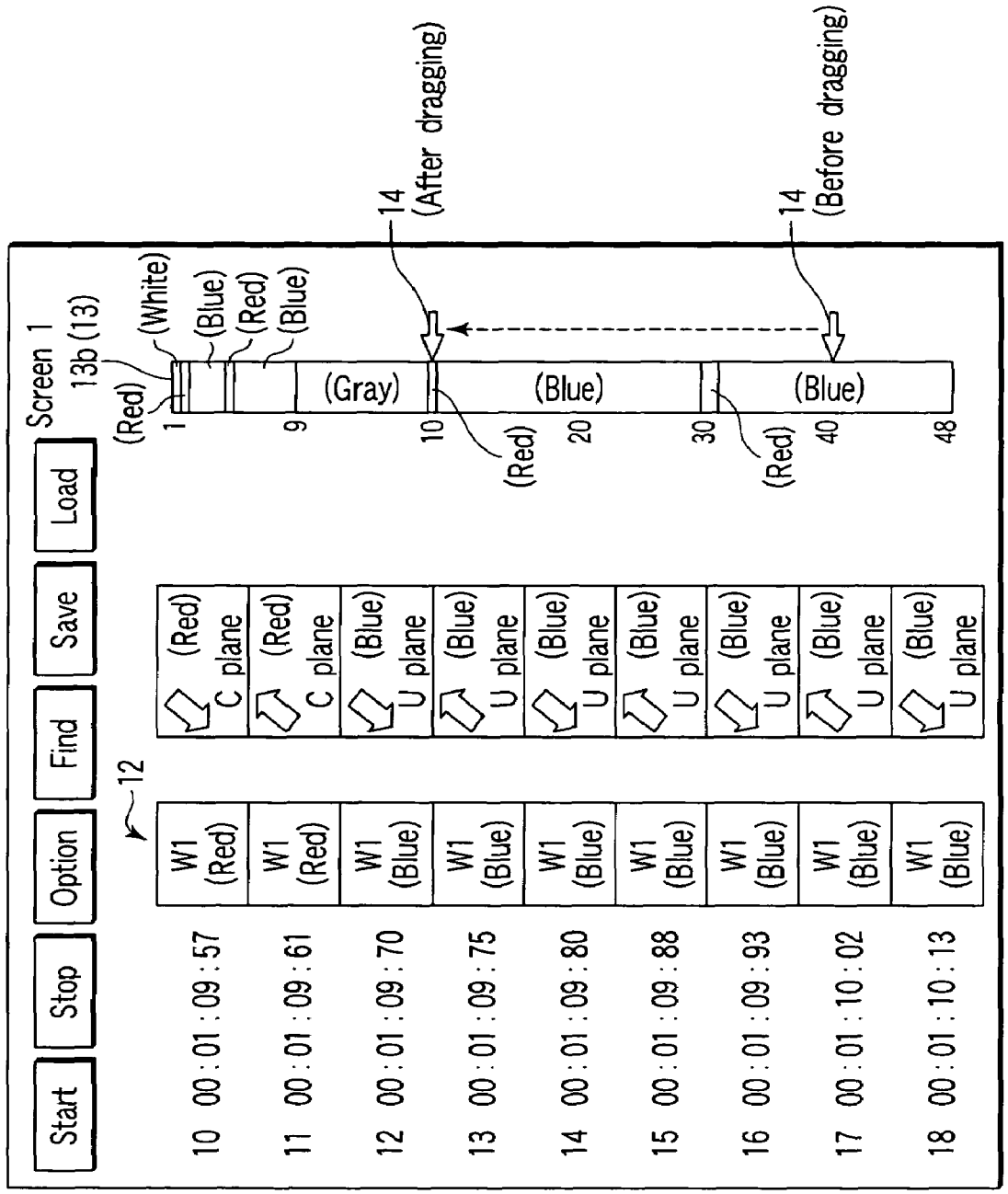
FIG. 8 is a diagram illustrating a display screen immediately after selecting an arbitrary position of a first indication bar in the performance measurement system for a communication terminal according to the present invention.

For example, if the operator selects a portion at which the log of the trace acquisition number 10 on the first indication bar 13b as shown in FIG. 7 from the state of FIG. 6, the display screen (screen 1) is updated such that the log sequences 12 of the trace acquisition numbers 10 to 18 are displayed by the log sequence display section 4b with the log of the trace acquisition number 10 being as the top.

At that time, the task bar 14 as well is moved from the position of the trace acquisition number 40 to the position of the trace acquisition number 10.

Thereafter, the display control section 4F determines whether or not an arbitrary position of the log sequences 12 (a position of one of the trace acquisition numbers 12a, the time stamps 12b, the communication system display bar 12c, and the trace information display bar 12d) on the display screen (screen 1) has been selected (for example, whether or not an arbitrary position of the log sequences 12 has been clicked on with a mouse or the like) by the operator (step ST8).

Here, when it is determined that an arbitrary position on the log sequences 12 has been selected by the operator (step ST8-Yes), the detailed information of the selected log sequence 12 is displayed by the log sequence display section 4b as pop-up on the display screen (screen 2) as shown in FIG. 3 (step ST9).

Next, the flow of the operations at the time of finding an objective log with the task bar 14 will be described with reference to FIG. 23.

Note that, in the flow in the case of FIG. 23 as well, operations from the time the Start key 11a of the operation keys 11 is clicked on up to the time the log acquisition is stopped are the same as in the case of FIG. 22.

In order to find an objective log after the trace information log acquisition is stopped in step ST5, a place between the arbitrary positions on the task bar 14 is dragged with, for example, a mouse or the like by the operator (step ST11).

The display screen (screen 1) is updated in accordance with the dragging of the task bar 14 (ST12).

Namely, the screen (screen 1) is updated such that the log sequence 12 at the position of the task bar 14 is displayed as the top by the log sequence display section 4b.

For example, if the operator moves the task bar 14 positioned at the trace acquisition number 40 to the position of the trace acquisition number 10, the display screen (screen 1) is updated such that the log sequences 12 of the trace acquisition numbers 10 to 18 are displayed by the log sequence display section 4b with the trace acquisition number 10 being as the top.

Then, if the objective log on the display screen (screen 1) is selected by the operator (step ST14) in a state in which a log which the operator wishes to find is on the display screen (screen 1) (step ST13-Yes), the detailed information on the selected log is displayed by the log sequence display section 4b as pop-up on the display screen (screen 2) as shown in FIG. 3 (step ST15).

Next, the flow of the operations at the time of finding an objective log after the data of the already acquired trace information has been loaded from the storage section 3a of the trace information acquisition section 3 will be described with reference to the flowchart shown in FIG. 24.

If the Load key 11f of the operation keys 11 is clicked on with, for example, a mouse, a keyboard, or the like, by the operator when the already acquired trace information has been stored as log files in the storage section 3a of the trace information acquisition section 3 (step ST21-Yes), an instruction to read the trace information is issued with respect to the storage section 3a of the trace information acquisition section 3 via the display control section 4F and the corresponding place detecting section 4A.

Here, when there are a plurality of log files in the storage section 3a of the trace information acquisition section 3, it is sufficient that the file names thereof are displayed on the display screen (screen 1) in accordance with a request from the operator, and it may be possible for the operator to instruct to read the trace information on a desired log file by designating a desired file name.

Accordingly, the display screen (screen 1) as shown in, for example, FIG. 3 or 6 is displayed in accordance with the trace information read from the storage section 3a of the trace information acquisition section 3.

Then, the display control section 4F determines whether or not an arbitrary position on the first indication bar (IB-1) 13b has been selected by the operator in the same way as described above (step ST23).

Here, when it is determined that an arbitrary position on the first indication bar (IB-1) 13b has been selected by the operator, the display screen (screen 1) is updated such that the log sequences 12 are displayed by the log sequence display section 4b with the trace information (log) at the selected arbitrary position being as the top (step ST24-Yes).

For example, if the operator selects a portion at the trace acquisition number 10 on the first indication bar 13b is selected as shown in FIG. 7 from the state of FIG. 6, the display screen (screen 1) is updated such that the log sequences 12 of the trace acquisition numbers 10 to 18 are displayed by the log sequence display section 4b with the trace acquisition number 10 being as the top.

At that time, the task bar 14 as well is displayed by the task bar display section 4c so as to be moved from the position of the trace acquisition number 40 to the position of the trace acquisition number 10.

Thereafter, if it is determined that an objective log on the display screen (screen 1) has been selected by the operator (step ST25-Yes), the detailed information of the selected log is displayed by the log sequence display section 4b as pop-up on the display screen (screen 2) as shown in FIG. 3 (step ST26).

Next, the set contents when the operator clicks on the Option key 11c of the operation keys 11 with, for example, a mouse, a keyboard, or the like, and moreover, clicks on the item of "Indication bar setting (IB setting)" in the option operation screen will be described with reference to FIG. 9.

It is configured so that the operator can carry out various settings with respect to the indication bars 13 on the screen of the Indication bar setting (IB setting) shown in FIG. 9.

To describe concretely, as the setting with respect to the divided display of the indication bars 13, the operator can select whether or not the first indication bar 13b is divided for each of a plurality of communication systems by clicking on "Yes" or "No" on the display screen.

Then, when the operator selects that the first indication bar 13b is divided in a plurality of communication systems ("Yes"), as shown in FIG. 10, the two indication bars 13bA and 13bB are simultaneously displayed in parallel in each communication system of W-CDMA(W) and GSM(G) by the two-indication-bars display section 4a4.

Note that, in FIG. 10, (Gray 1) and (Gray 2) denote displays in gray whose densities are different from each other, and the (Gray 1) at a thin density shows a state of being in communication in other communication systems, but of being out of communication in the self communication system.

Further, in FIG. 10, the (Gray 2) at a thick density shows that there is an off-line state for 1 pixel 10s.

Next, as the setting with respect to the divided display of the indication bars 13, the operator can select whether or not the first indication bar 13b is divided in the up (communication from the communication terminal 21 for being evaluated to the communication terminal test measuring instrument 22) and down (communication from the communication terminal test measuring instrument 22 to the communication terminal 21 for being evaluated) communication directions by clicking on "Yes" or "No" on the display screen.

Then, when the operator selects that the first indication bar 13b is divided in the up and down communication directions ("Yes"), as shown in FIG. 11, the two indication bars 13bC and 13bD are displayed in parallel in each of the up and down communication directions by the two-indication-bars display section 4a4.

Then, when the operator selects that the first indication bar 13b is divided in a plurality of communication systems, and that the first indication bar 13b is divided in the up and down communication directions, as shown in FIG. 12, the four indication bars 13bA, 13bB, 13bC, and 13bD in each communication system of W-CDMA(W) and GSM(G), and in each of the up and down communication directions are simultaneously displayed in parallel by the plural-indication-bars display section 4a3.

Next, setting of how many U planes 1 line of the indication bars 13 is made will be described.

In the example of FIG. 9, it is configured so that the operator can arbitrarily set it within a range from 1 line (1 display unit of log information)/1 pixel (1 dot display unit on the screen) to 10 lines/1 pixel.

Subsequently, setting of how many log information in off-line 1 line of the indication bar is made will be described.

In the example of FIG. 9, it is configured so that the operator can arbitrarily set it within a range from 1 line/1 pixel to 10 lines/1 pixel, and the operator sets to "0" when off-line states are not displayed.

Figure 13:
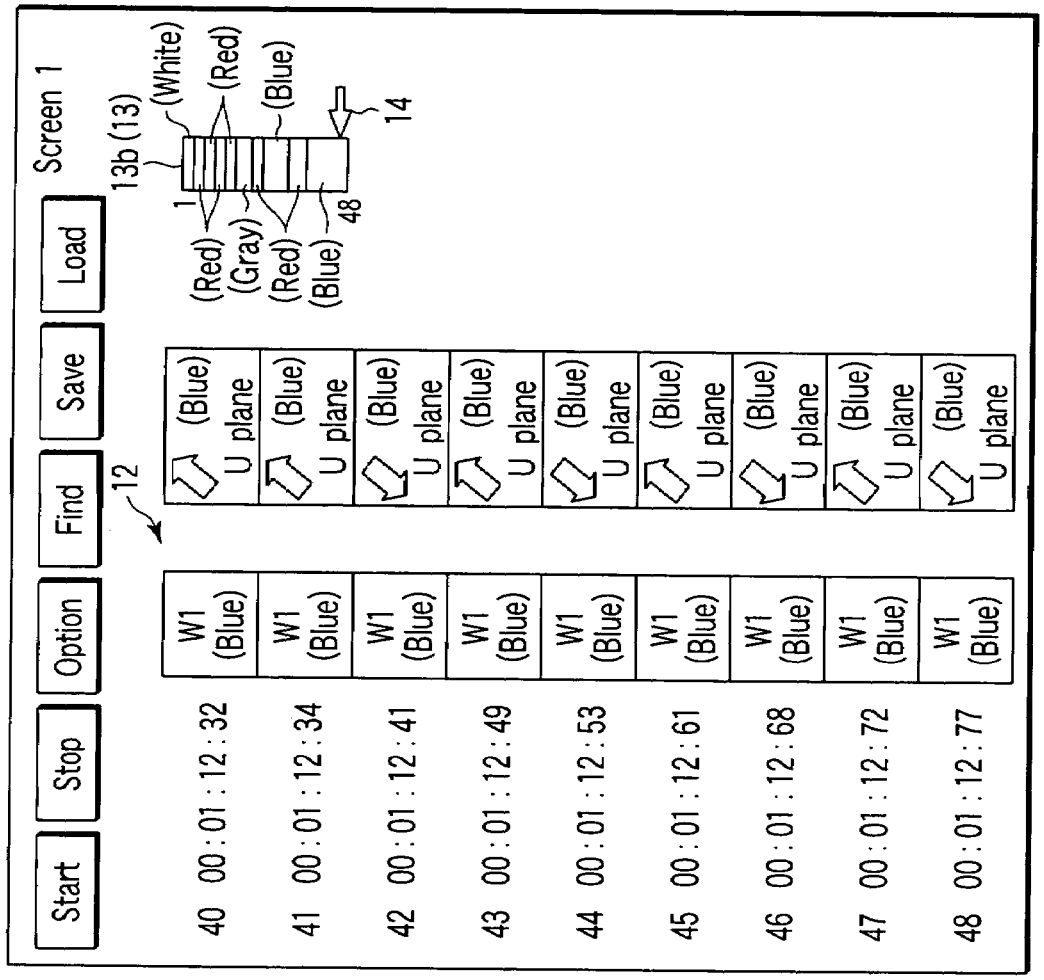
FIG. 13 is a diagram illustrating a display screen when the first indication bar is set such that U planes and 10 lines of off-line are made to be 1 pixel in the performance measurement system for a communication terminal according to the present invention.

For example, FIG. 13 shows a display screen example when the first indication bar 13b is set such that 10 lines of U planes and off-line are made to be 1 pixel by the operator.

In the case of the display in FIG. 13, ten of log information on the display screen (screen 1) are updated every time the task bar 14 is dragged of a distance of one pixel, and the screen is updated at a high speed.

With respect to the portions of C planes and Config, one of log information displayed on the display screen (screen 1) is updated in accordance with a movement of the task bar 14 of a distance of one pixel.

Accordingly, when log information whose protocol types of communication systems are the same are continued, the log information can be displayed such that a display length with respect to one log information is compressed.

This is achieved in such a manner that the indication bar display section 4a displays the continuous log information in the same communication system so as to compress a display length for one log information when the log information in a same communication system are continued among the plurality of log information included in the trace information acquired by the trace information acquisition section 3.

Note that, on the screen of the indication bar setting, it is configured so that the operator can arbitrarily set how many seconds (how many s) may be regarded as off-line.

In the example of FIG. 9, it is configured so that the operator can set it within a range from 10s/1 line to 1s/1 line.

As a result, when there is an off-line state, the log information in an off-line state are displayed on the first indication bar 13b by the first indication bar display section 4a1.

For example, in the example of FIG. 3, there is an off-line state between the trace acquisition numbers 5 and 6 on the first indication bar 13b. Therefore, an insertion width is calculated by the first indication bar display section 4a1 based on the off-line time interval and the above-described configuration information, and the log information in an off-line state is displayed so as to be inserted in a predetermined color (for example, gray) between the trace acquisition numbers 5 and 6.

Further, on the screen of the Indication bar setting, it is configured so that the operator can set what the first indication bar 13*b* is made to work with.

In the example of FIG. 9, the operator can select so as to make the trace acquisition numbers or the log acquisition clock times (time stamps), as scale information (index information) 12*a* denoting the orders in which the respective sequences of the log sequence have been acquired, to work with the first indication bar 13*b*.

Consequently, the scale information, i.e., the index information 12*a* are displayed at desired intervals such that the displays of the respective index information 12*a* are not overlapped so as to correspond to the log information of the first indication bar 13*b*.

When the operator sets that the first indication bar 13*b* is made to work with the trace acquisition numbers, as shown in FIG. 3, the log sequences 12 and the first indication bar 13*b* are updated and displayed so as to work with the trace acquisition numbers every time one log sequence (log information) is acquired.

At that time, in the vicinity of the first indicating bar 13*b* (on the right side in the illustration), trace acquisition numbers are displayed so as to correspond to the log sequences 12 to be displayed.

Figure 14:
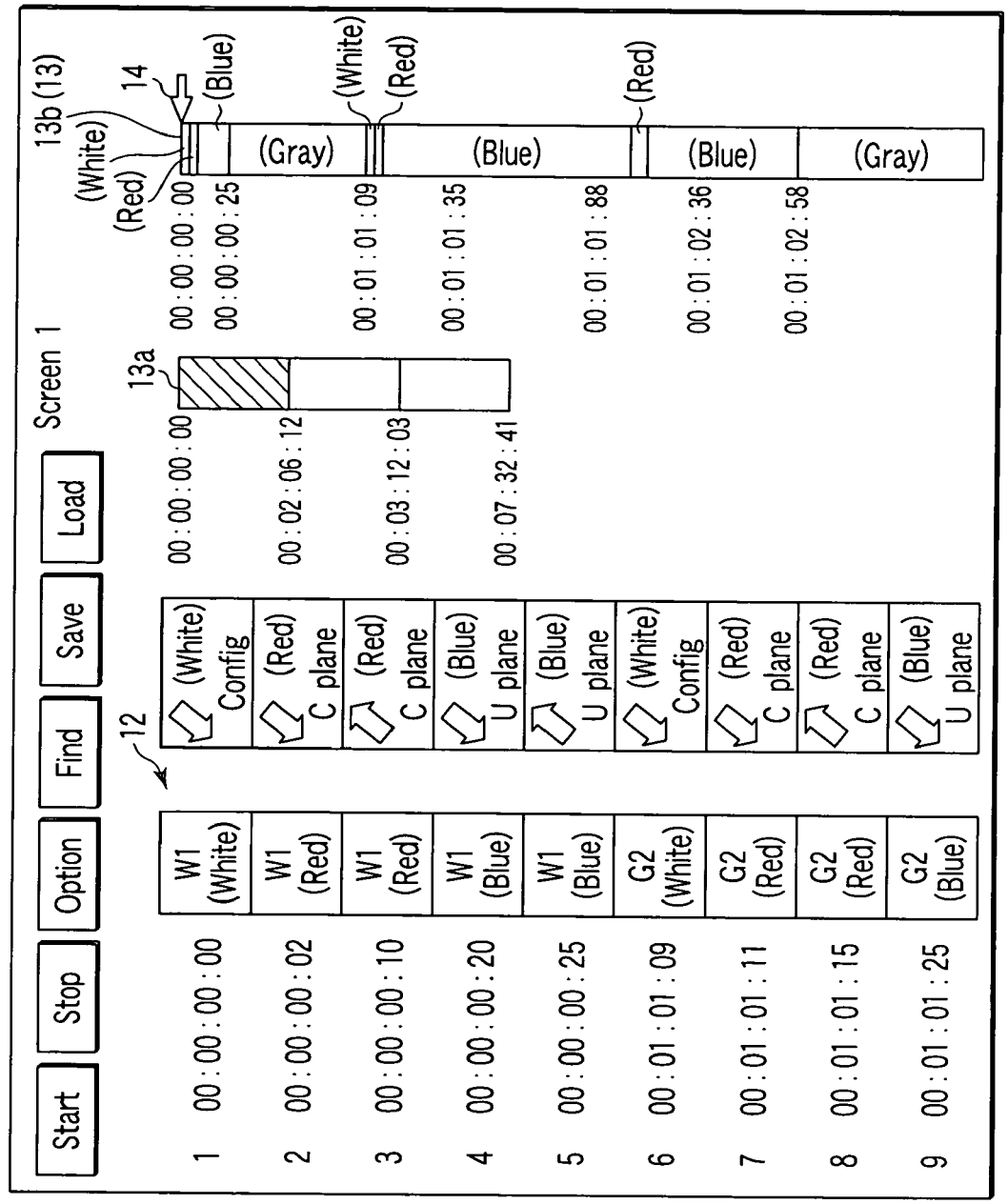
FIG. 14 is a diagram illustrating a display screen when the first indication bar is set so as to work with a log acquisition time in the performance measurement system for a communication terminal according to the present invention.

On the other hand, when the operator sets that the first indication bar 13*b* is made to work with the log acquisition clock times (time stamps), as shown in FIG. 14, the log sequences 12 and the first indication bar 13*b* are updated and displayed so as to work with the log acquisition clock times (time stamps) every time one log sequence (log information) is acquired.

At that time, in the vicinity of the first indication bar 13*b* (on the left side in the illustration), the log acquisition clock times (time stamps) 12*b* are displayed so as to correspond to the log sequences 12 to be displayed.

By the way, in the present embodiment, when the operator clicks on the Option key 11*c* of the operation keys 11, settings with respect to various option items can be carried out by displaying the option operation screen by the option operation screen display section (not shown).

Figure 15:
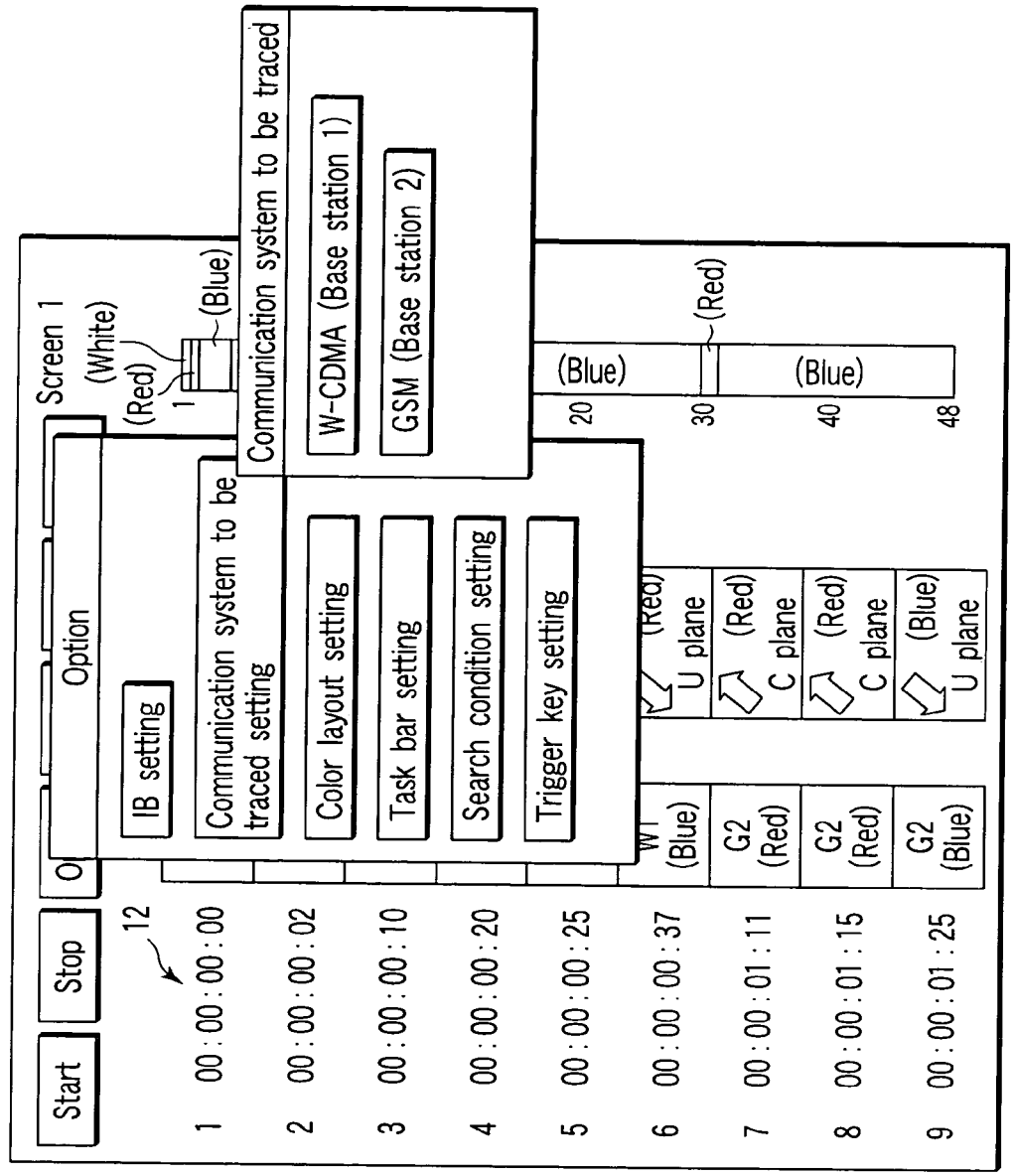
FIG. 15 is a diagram illustrating a display screen when setting of the communication system is further selected by pressing the Option key of the operation keys in the performance measurement system for a communication terminal according to the present invention.

FIG. 15 shows an example of the display screen when the operator has clicked on the Option key 11*c* of the operation keys 11, and further has clicked on the item of "Communication system to be traced setting" in the option operation screen.

In the example of the "Communication system to be traced setting" shown in FIG. 15, it is configured so that the operator can select at least one of W-CDMA (base station 1) and GSM (base station 2).

Figure 16:
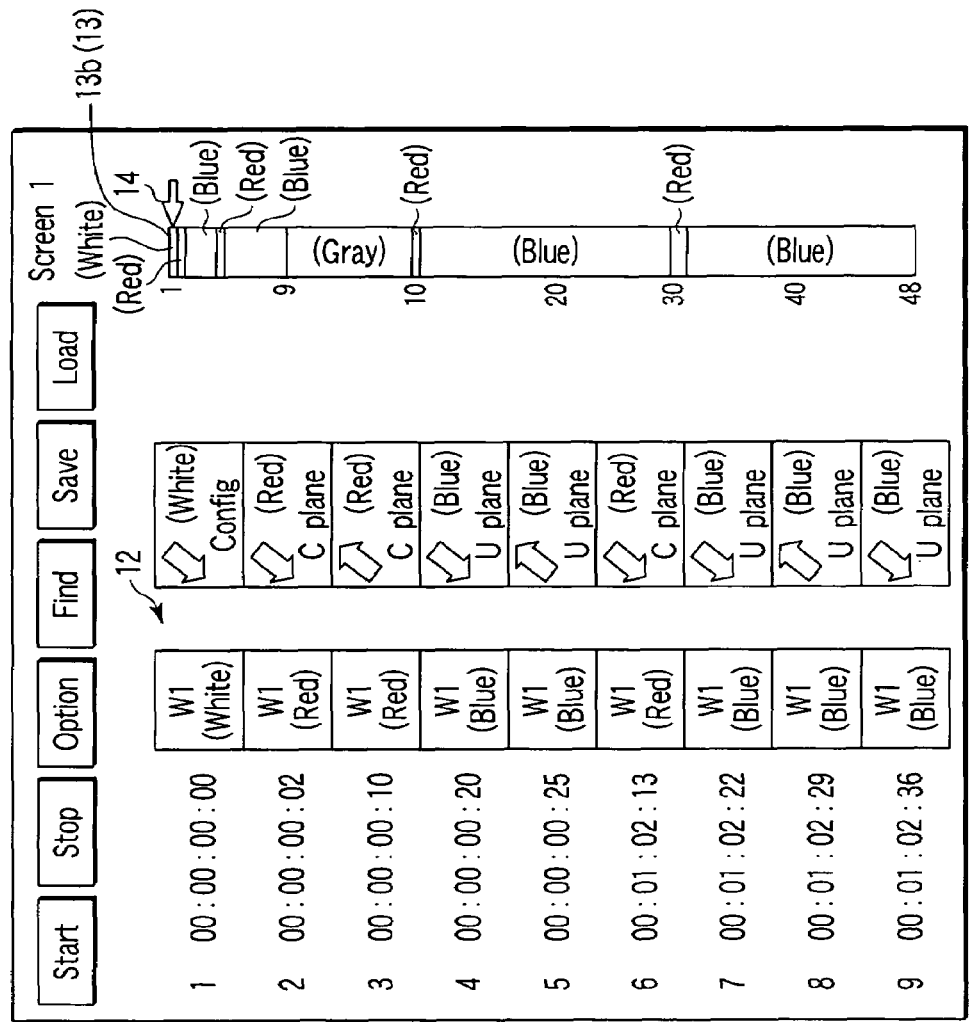
FIG. 16 is a diagram illustrating a display screen when a communication system to be traced is made to be only W-CDMA in the performance measurement system for a communication terminal according to the present invention.

For example, when the operator selects only the W-CDMA (base station 1), as shown in FIG. 16, only the log sequences 12 relating to the W-CDMA (base station 1) are extracted, and the log sequences 12 and the first indication bar 13*b* are displayed so as to be associated with one another on the display screen (screen 1).

In contrast thereto, when the operator selects only the GSM (base station 2), only the log sequences 12 relating to the GSM (base station 2) are extracted, and the log sequences 12 and the first indication bar 13*b* are displayed so as to be associated with one another on the display screen (screen 1) (not shown).

Note that, in the example of the communication system to be traced setting shown in FIG. 15, it is configured so that the operator can simultaneously select both of the W-CDMA (base station 1) and GSM (base station 2).

In this case, the log sequences 12 of both of the W-CDMA (base station 1) and GSM (base station 2) are extracted, and the log sequences 12 and the indication bars 13 are displayed so as to be associated with one another as on the display screen (screen 1) shown in FIG. 3.

Further, it is configured so that the operator can carry out setting of "Transposition of colors" by clicking on the Option key 11*c* of the operation keys 11.

Figure 17:
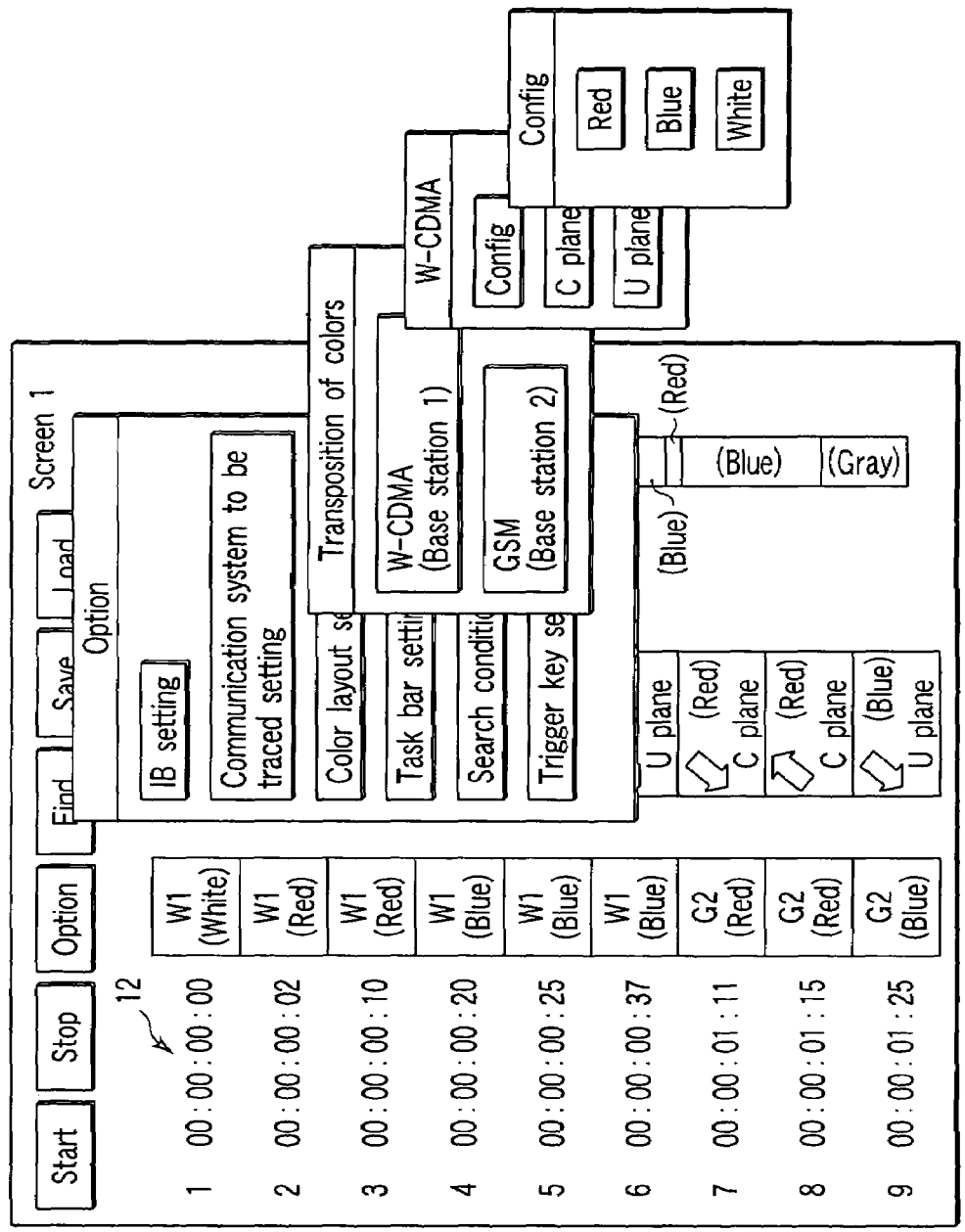
FIG. 17 is a diagram illustrating a display screen when transposition of colors is further selected by pressing the Option key of the operation keys in the performance measurement system for a communication terminal according to the present invention.

FIG. 17 shows an example of the display screen when the operator has clicked on the Option key 11*c* of the operation keys 11, and further clicked on the "Transposition of colors" in the option operation screen.

In setting of the "Transposition of colors", as shown in FIG. 17, it is configured so that the operator can set the colors of Config, C planes, and U planes to arbitrary colors (red, blue, and white in the illustrated example) for each communication system of the W-CDMA (base station 1) and the GSM (base station 2).

Figure 18:
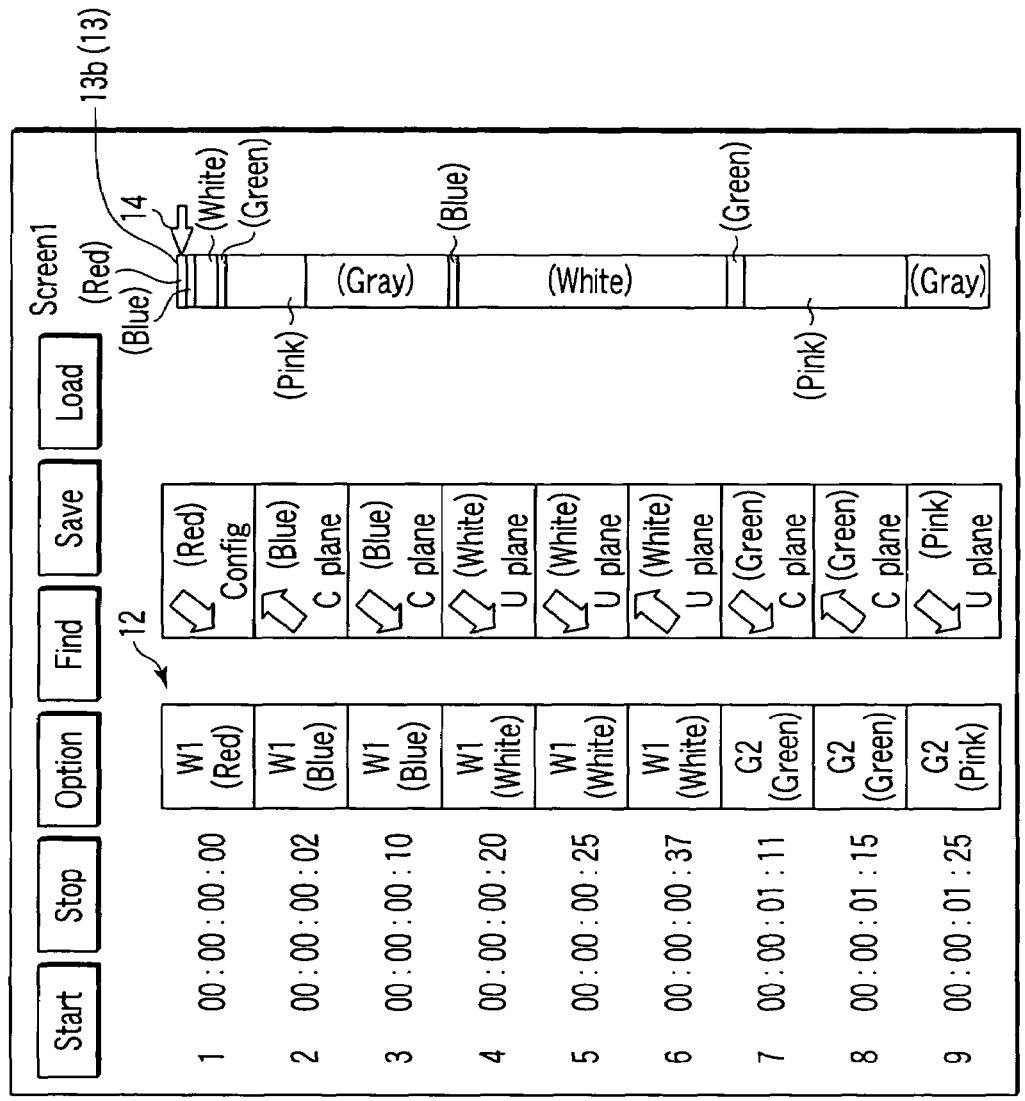
FIG. 18 is a diagram illustrating a display screen when the layout of colors has been changed in the performance measurement system for a communication terminal according to the present invention.

For example, when the operator sets that W-CDMA Config: red, W-CDMA C plane: blue, W-CDMA U plane: white, GSM C plane: green, and GSM U plane: pink, as shown in FIG. 18, the log sequences 12 on which the "Transposition of colors" has been carried out are updated and displayed on the display screen (screen 1).

Moreover, it is configured so that the operator can carry out setting of the task bar 14 by clicking on the Option key 11*c* of the operation keys 11.

Figure 19:
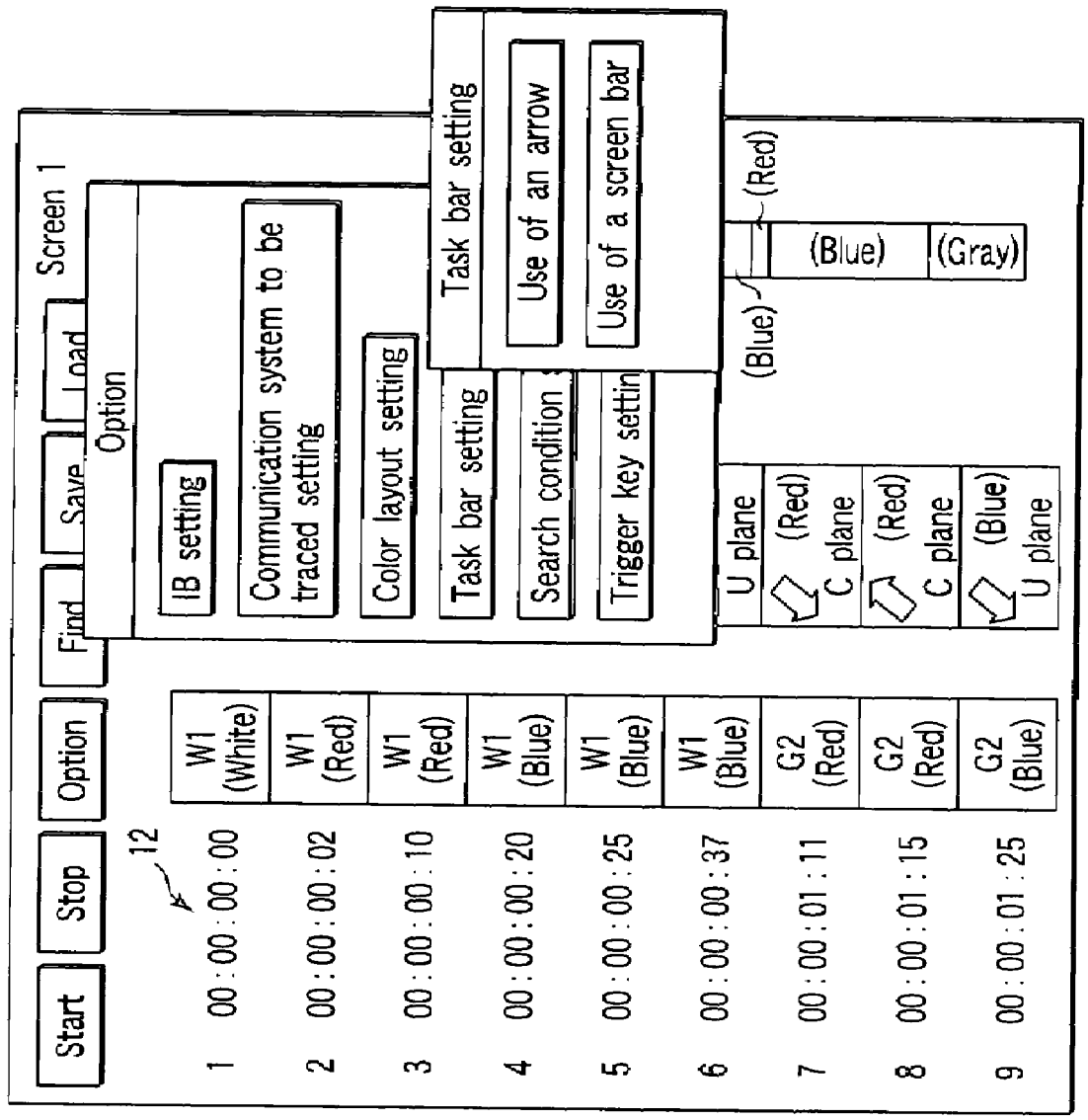
FIG. 19 is a diagram illustrating a display screen when setting of the task bar is further selected by pressing the Option key of the operation keys in the performance measurement system for a communication terminal according to the present invention.

In setting of the task bar 14, as shown in FIG. 19, it is configured so that the operator can select whether a task bar serving as an arrow is displayed as the task bar 14, or a task bar serving as a screen bar showing a certain range is displayed as the task bar 14.

For example, if the operator has selected as setting of the task bar 14 that an arrow is used, as shown in FIG. 3, the task bar 14 serving as an arrow is displayed by the task bar display section 4*c* in the vicinity of the first indication bar 13*a* (on the right side in the illustration).

Then, the plurality of log sequences 12 are displayed by the log sequence display section 4*b* with the log sequence shown by the arrow of the task bar 14 being as the top.

On the other hand, if the operator has selected as setting of the task bar 14 that an screen bar is used, as shown in FIG. 20, the task bar 14 serving as a screen bar is displayed by the task bar display section 4*c* in the vicinity of the first indication bar 13*b* (on the right side in the illustration).

In this case, the length of the task bar 14 shows the range of the log sequences 12 which have been currently shown.

In the example of FIG. 20, the length of the task bar 14 to be displayed ranges over the trace acquisition numbers 1 to 9, the log sequences 12 of the trace acquisition numbers 1 to 9 are displayed on the display screen (screen 1).

Further, in the present embodiment, when the Find key 11*d* of the operation keys 11 is clicked on by the operator, one or a plurality of arbitrary trace information are automatically searched from the already acquired trace information, and it is possible to identify places at which the log information which have been searched and found are positioned.

To further describe, when the Find key 11*d* of the operation keys 11 is clicked on by the operator in a state in which search conditions are set as will be described later by the search condition setting section 2*d* of the setting input information setting section 2, a state in which the corresponding place detecting section 4A searches a corresponding place which conforms with the search condition from the already acquired trace information from the second indication bar 13*a*.

When a corresponding place which conforms with the search condition set by the search condition setting section 2d is found by the corresponding section detecting section 4A, a predetermined range including the corresponding place of the second indication bar 13a is displayed so as to blink on and off on the display screen (screen 1).

When the operator selects the part in which the second indication bar 13a is displayed so as to blink on and off, the first indication bar 13b to be an object is displayed, and a corresponding place of the first indication bar 13b suitable for the search condition is displayed so as to blink on and off.

The task bar 14 is automatically moved to the part which is displayed so as to blink on and off, and the display screen (screen 1) is automatically switched to the display screen (screen 1) with the first log sequence 12 corresponding to the search being as the top.

Figure 21:
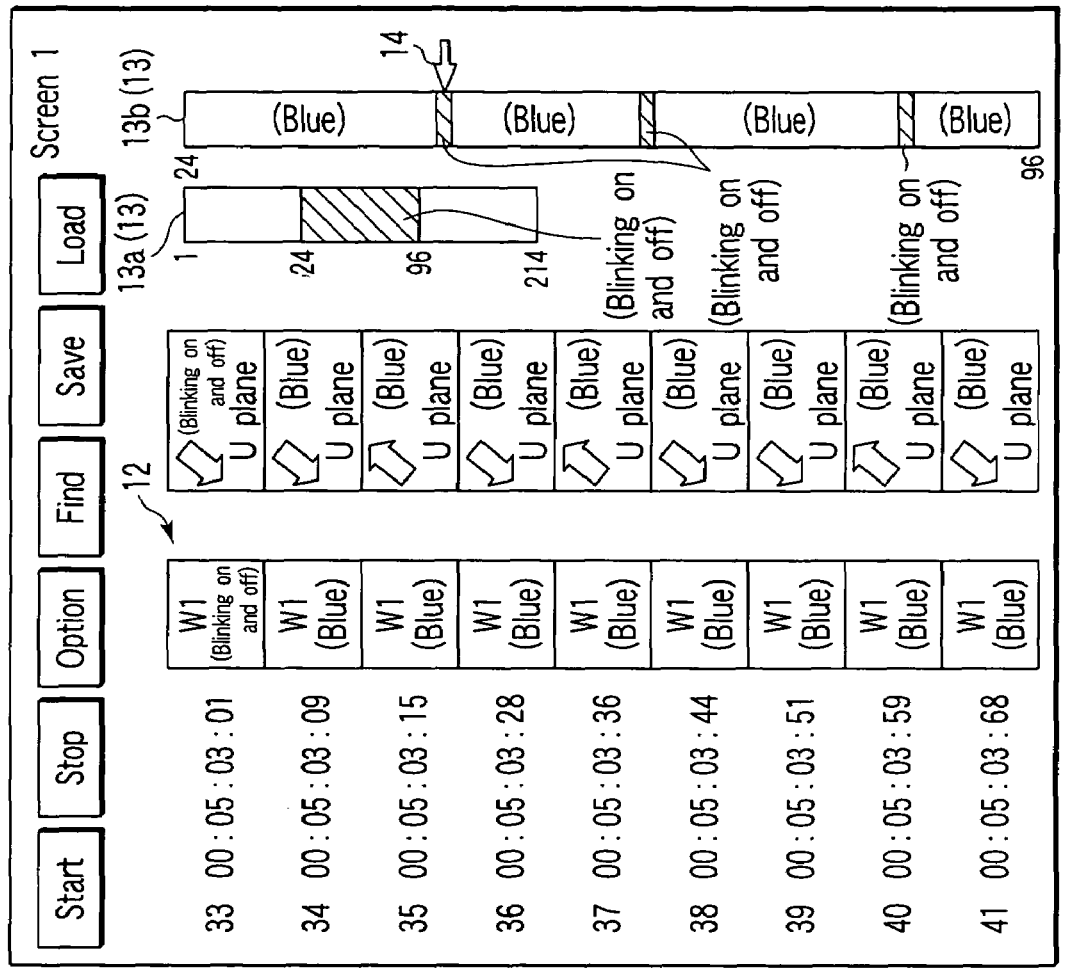
FIG. 21 is a diagram illustrating a display screen when objective trace information is designated by a Find key of the operation keys, and when the objective trace information is set in advance by a trigger key and it hits a corresponding log, in the performance measurement system for a communication terminal according to the present invention.

In the example of FIG. 21, the corresponding place which conforms with the search condition is the trace acquisition numbers 24 to 96 of the second indication bar 13a, and the first indication bar 13b displays the log information of the trace acquisition numbers 24 to 96 on the bar.

Then, the corresponding places of the first indication bar 13b which conform with the search condition (three places of the shaded areas in the drawing) are displayed so as to blink on and off, and the task bar 14 is moved to the position of the log information of the first part which is displayed so as to blink on and off among those, and the log sequences 12 of the trace acquisition numbers 33 to 41 are displayed with the log sequence 12 of the first part which is displayed so as to blink on and off being as the top.

Note that, when there are a plurality of corresponding places which conform with the search condition, not that the log sequences 12 are displayed with the log sequence 12 of the first corresponding place being as the top, but the log sequences 12 are displayed may be displayed with the log sequence of a place set as the search condition in advance being as the top by setting a condition about a display position of the log sequence of the corresponding place (for example, the top, the center, the tail end, or the like) as the search condition in advance.

Here, to describe the setting of Search condition, it is necessary for the operator, first, to click on the Option key 11c of the operation keys 11 in order to operate the setting condition setting section 2d of the setting input information setting section 2 of FIG. 2, and further, to click on the item of "Search condition" from the display screen (screen 1) for option operations shown in FIGS. 9, 15, 17 and 19, and the like.

Figure 25:
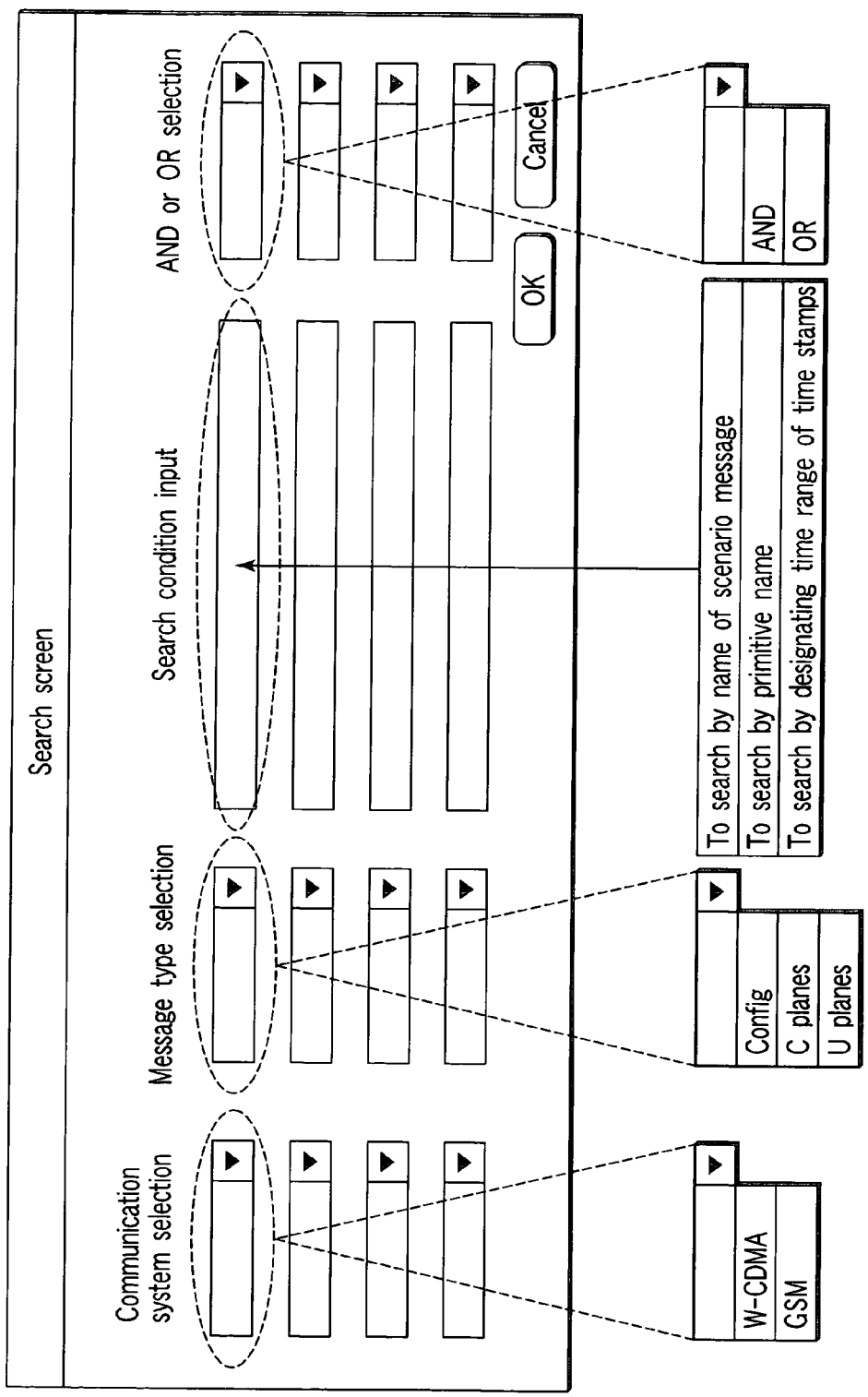
FIG. 25 is a diagram illustrating a display screen for setting search conditions when an objective log is found in the performance measurement system for a communication terminal according to the present invention.

As a consequence, the retrieval screen shown in FIG. 25 is displayed on the display screen (screen 1) based on an instruction to search issued in the same way as described above. Therefore, it is sufficient that the operator appropriately sets respectively the respective items of "Communication system selection", "Message type selection", "Search condition input", "AND or OR selection", and the like in the screen, based on the guide displays which are displayed as attachment.

The "AND or OR selection" is an item for allowing the operator to select to search by using AND of the respective conditions set by "System selection", "Message type selection", and "Search condition input", or to search by using OR thereof.

In the case of FIG. 25, with respect to the item of "Search condition input", as the guide display which is displayed as attachment, "To search by a name of a scenario message", "To search by a primitive name", and "To search by a time range of a time stamp" are illustrated as examples.

Note that, on the display screen of FIG. 25, when the operator clicks on "OK", the settings for the respective items described above are settled and taken in, and when the operator clicks on "Cancel", the screen returns to the original display screen.

Moreover, in the present embodiment, the operator internally sets the conditions of objective trace information (for example, a keyword, a type of a scenario message, and the like) in advance by the trigger key from the trigger key seeing section 2e of the configuration input information setting section 2, and the display is automatically switched when the conditions hit a corresponding log.

To further describe, it is necessary for the operator, first, to click on the Option key 11c of the operation keys 11 in order to operate the trigger key setting section 2e and the setting condition setting section 2d of the setting input information setting section 2 of FIG. 2 as an operation for setting the condition of the objective trace in advance by the trigger key, and further, to click on the item of "Trigger key setting" from the display screen (screen 1) for option operations shown in FIGS. 9, 15, 17 and 19, and the like, and moreover, to click on the item of the setting of "Search condition".

Accordingly, the retrieval screen shown in FIG. 25 is displayed on the display screen (screen 1) in the same way as in the case where one or a plurality of arbitrary trace information are automatically searched from the already acquired trace information described above. Therefore, it is sufficient that the operator appropriately sets respectively the respective items of "System selection", "Message type selection", "Search condition input", and "AND or OR selection" in the screen based on the guide displays which are displayed as attachment.

At this time, the trigger key itself is not displayed on the display screen (screen 1). However, when trace information corresponding to the condition of the objective trace information set by the trigger key is acquired, it is determined that the condition hits the corresponding log, which causes the trace information to be displayed on the display screen (screen 1) as the top.

Then, the corresponding trace information and a corresponding part on the first indication bar 13b are displayed so as to blink on and off.

Thereafter, even if the trace acquisition progresses, the display screen (screen 1) is not updated, and the corresponding part on the first indication bar 13b is displayed so as to blink on and off every time the condition hits corresponding trace information.

Note that, in the display of a search by the trigger key as well, in the same way as in the display of a search by the Find key 11d described above, the condition for a display position of the corresponding place of the log sequence (for example, the top, the center, the tail end, or the like) may be set in advance.

As described above, in the performance measurement system 1 for a communication terminal according to the embodiment, when a trace information acquisition is started, the first indication bar 13b is continued to be updated every time one log sequence of the log information is acquired and displayed.

At that time, the log sequences 12 are displayed in a time series so as to be associated with the first indication bar 13b.

At that time, it is possible for the operator to identify the communication protocol types (W-CDMA, GSM) of a plurality of communication systems due to the displays by bar-dividing for each communication protocol and color coding on the first indication bar 13b, and to identify the communication protocol types due to the marks (W, G) on the log sequences 12.

When the operator selects an arbitrary place from the first indication bar 13b after the trace information acquisition, the display screen is updated to be the display screen (screen 1) with the log sequence 12 corresponding to the selected place being as the top.

Further, when the task bar 14 attached to the first indication bar 13b is moved by the operator, the display of the log sequences 12 is updated in accordance with a traveled distance of the task bar 14.

This makes it possible for the operator to bring the top position in the display of the log sequences 12 to an arbitrary position.

Further, when the fist indication bar 13b is too long to be fitted into the display screen (screen 1), the second indication bar 13a which more displays the entire thereof is used.

The second indication bar 13a is displayed in parallel with the first indication bar 13b.

Then, when the operator selects an arbitrary place from the second indication bar 13a, the first indication bar 13b of a range corresponding to the selected place of the second indication bar 13a is displayed.

When the operator selects an arbitrary log sequence 12 in the display screen (screen 1), the detailed information of the selected log sequence 12 is displayed, for example, as pop-up, on the detail screen (screen 2).

Accordingly, in the performance measurement system for a communication terminal in accordance with the present embodiment, the first indication bar and the log sequence are displayed so as to be associated with each other. When an arbitrary position on the first indication bar is selected by the operator, it is displayed such that the log sequence corresponding to the selected position of the first indication bar is made to be the top.

Then, when an arbitrary position on the log sequence is selected by the operator, the detailed information of the selected log sequence is displayed.

As a result, in accordance with the performance measurement system for a communication terminal according to the embodiment, the operator can overlook the entire log sequences of the trace information acquired by the indication bars (the first indication bar 13b, the second indication bar 13a), and can easily obtain objective trace information from among the trace information having an enormous length, and at that time, the operator can immediately find the objective trace information by minimal operations.

Moreover, in the performance measurement system for a communication terminal in accordance with the present embodiment, color coding when the communication system display bar 12c and the trace information display bar 12d of the log sequences 12, and the log information of the first indication bar 13b are displayed by color coding so as to correspond to one another can be arbitrarily set, the operator can achieve color coding in order to more easily identify trace information in accordance with the types thereof.

Because scale information (the trace acquisition numbers and the trace acquisition clock times (time stamps)) serving as index information denoting the orders of the respective sequence acquisitions of the log sequences 12 are displayed so as to correspond to the respective log information on the first indication bar 13b, the operator can confirm at one view what part of the log sequences 12 corresponding to the first indication bar 13b has been displayed.

Further, the indication bars 13 are composed of the first indication bar 13b and the second indication bar 13a, and the second indication bar 13a displays all the log information included in the log file. Moreover, the log information in a predetermined range including the selected arbitrary log information selected from the second indication bar 13a are indicated so as to be enlarged on the first indication bar 13b.

Consequently, the operator can shorten a time for finding objective trace information from the enormous trace information by making a short list of the display range by the first indication bar 13b from the range of the second indication bar 13a.

The first indication bar 13b can indicate the bar so as to be divided for each communication system so as to correspond to the communication protocol types of a plurality of communication systems, and moreover, the first indication bar 13b divided in each type of the communication system types can be indicated so as to be divided into two bars in the up and down directions of communication information, so that the operator can grasp the rough situation of the communication information in each type of the communication systems.

Further, due to a search by using the Find key 11d, the operator can easily find corresponding log information from a plurality of log information included in the log files in the storage section 3a in which the already acquired trace information have been stored.

At that time, because the corresponding place is displayed so as to blink on and off, the operator can distinguish the corresponding place at one view. Moreover, because the first log sequence corresponding to the search is displayed as the top, anyone can find corresponding log information instantaneously.

In addition, a corresponding place on the first indication bar 13b corresponding to the log information which has hit the trigger information at the time of acquiring the trace information is displayed so as to blink on and off due to the operator internally setting trigger information with respect to the first indication bar display section 4a1. Therefore, the operator can know a position at which the log information which has hit the trigger information exists at one view.

Further, because the log sequences 12 displayed on the display screen (screen 1) do not include a display of an off-line state, only the exchange in actual communication can be displayed, and vain displays can be omitted.

At that time, it is possible for the operator to estimate an off-line state in accordance with the time stamps 12b of the log sequences 12 to some extent.

The operator can schematically know the range of the log sequences 12 displayed on the display screen (screen 1) by using a screen bar as the task bar 14 displayed in the vicinity of the first indication bar 13b.

Also, the operator can know the log sequence 12 displayed at the top by using an arrow as the task bar 14.

Because the first indication bar 13b can be displayed so as to be compressed in accordance with a type of trace information, for example, the operator can rapidly find the information on C planes buried among U planes which are greater by far than the C planes, and moreover, the operator can handle the acquisition of a certain amount of trace information.

Further, the operator can display all the log information acquired by using the second indication bar 13a on the display screen (screen 1) when it is impossible to handle the acquisition by only the first indication bar 13b.

Furthermore, because a display of an off-line state as well is inserted into the first indication bar 13b, the operator can recognize that the display of the first indication bar 13b is in a state of being close to being in real-time.

By the way, the plurality of first indication bars 13b in the present embodiment are not displayed so as to be arranged vertically as illustrated, but may be displayed so as to be arranged horizontally to be a multi-stage structure. However, in this case, there is the problem of the way of moving the task bar 14.

Then, in the present embodiment, the indication bars 13 are composed of only two of the first indication bar 13b and the second indication bar 13a, and all the log information included in the log files are displayed by the second indication bar 13a. Moreover, log information in a predetermined range including arbitrary log information selected from the second indication bar 13a are displayed so as to be enlarged on the first indication bar 13b.

It is configured so that the task bar 14 displayed on the right side of the one first indication bar 13b is movable up and down.

Further, in the present embodiment, it is configured so that the displays of the log sequences 12 and the indication bars 13 are carried out on one display screen (screen 1). However, it may be configured so that the display screen (screen 1) is scrolled in the up and down directions and the left and right directions.

Accordingly, as described above in detail, in accordance with the present invention, in an evaluation system for a communication terminal in which a trace information group including log sequence information showing the flow of communication test information between a communication terminal in a plurality of communication systems and a measuring instrument for evaluation is displayed to be provided for performance evaluation for a communication terminal, a performance measurement system for a communication terminal and a performance measurement method for a communication terminal by which it is possible for the operator to easily find objective log sequence information from among the trace information group having an enormous information amount by supporting with a trace information analysis software built in for realizing an efficient trace information display function can be provided.

The invention claimed is:

1. A performance measurement system for a communication terminal, characterized by comprising:
    a communication terminal test measuring instrument which possesses a series of procedures for predetermined performance measurement corresponding to types of communication systems in a state of connecting a communication terminal for being evaluated, the communication terminal test measuring instrument transmitting test signals including predetermined message information along the procedures to the communication terminal for being evaluated, and receiving a series of reply signals including the predetermined message information corresponding to the series of test signals for predetermined performance measurement from the communication terminal for being evaluated;
    a trace information acquisition section which acquires trace information including a plurality of log information which have information on contents and types of log information based on the predetermined message information of each of the series of test signals transmitted by the communication terminal test measuring instrument and the series of reply signals received by the test measuring instrument, and which provides clock time information expressing clock times at which the respective predetermined message information have been acquired to the plurality of log information included in the trace information; and
    a trace information display processing control section which displays on a display the trace information including the plurality of log information acquired by the trace information acquisition section in predetermined formats,
    wherein the trace information display processing control section comprises:
    an indication bar display section which displays an indication bar on which the plurality of log information included in the trace information acquired by the trace information acquisition section are arranged in a time series based on the clock time information provided to each of the plurality of log information so as to be identifiable by being sorted in accordance with types of the predetermined message information based on the information on the contents and types of the log information; and
    a log sequence display section which displays flows of the series of test signals and the series of replay signals with respect to a predetermined number of log information among the plurality of log information included in the trace information acquired by the trace information acquisition section so as to be associated with the indication bar, as log sequences having time stamps according to the clock time information provided to each of the predetermined number of log information based on the information on the contents and types of the log information.

2. The performance measurement system for a communication terminal according to claim 1, characterized by further comprising a configuration input information setting section which sets predetermined configuration input information with respect to at least one of the trace information acquisition section and the trace information display processing control section.

3. The performance measurement system for a communication terminal according to claim 2, characterized in that the trace information display processing control section further comprises a task bar display section which displays a task bar by which an arbitrary position on the indication bar displayed by the indication bar display section is selected based on selection configuration input information set by the configuration input information setting section.

4. The performance measurement system for a communication terminal according to claim 1, characterized in that the trace information acquisition section includes a storage section which stores the trace information including the plurality of log information acquired by the trace information acquisition section along with the clock time information provided to the plurality of log information by the trace information acquisition section.

5. The performance measurement system for a communication terminal according to claim 1, characterized in that communication system information showing the types of the communication systems are included in each of the plurality of log information included in the trace information acquired by the trace information acquisition section, and the indication bar display section displays the indication bar such that the types of the respective communication systems of the plurality of log information are made to be identifiable based on the communication system information.

6. The performance measurement system for a communication terminal according to claim 2, characterized in that the log sequence display section comprises a trace information display bar display section which displays a trace information display bar including at least one of types of planes of the predetermined message information and communication directions based on the information on the contents and types of the log information with respect to at least a predetermined number of log information among the plurality of log information included in the trace information acquired by the trace information acquisition section.

7. The performance measurement system for a communication terminal according to claim 6, characterized in that, the types of planes comprise at least one of a control plane showing various configuration information for test included in the series of test signals and the series of reply signals, and a user plane showing user data which are included in the series of test signals and the series of reply signals to be communicated.

8. The performance measurement system for a communication terminal according to claim 6, characterized in that configuration information showing configuration information inside the communication terminal test measuring instrument for communication test by the series of test signals and the series of reply signals are included in the trace information display bar displayed by the trace information display bar display section.

9. The performance measurement system for a communication terminal according to claim 6, characterized in that
the log sequence display section further comprises:
a communication system display bar display section which displays a communication system display bar showing the types of the respective communication systems relating to a predetermined number of log information among the plurality of log information included in the trace information acquired by the trace information acquisition section so as to correspond to the trace information display bar displayed by the trace information display bar display section based on the information on the contents and types of the log information; and
a time stamp display section which displays time stamps according to the clock time information provided to each of the predetermined number of log information so as to correspond to the trace information display bar displayed by the trace information display bar display section and the communication system display bar displayed by the communication system display bar display section.

10. The performance measurement system for a communication terminal according to claim 9, characterized in that the communication system display bar display section displays the types of the communication systems to be displayed on the communication system display bar so as to be selectable based on selection configuration input information set by the configuration input information setting section.

11. The performance measurement system for a communication terminal according to claim 9, characterized in that the communication system display bar display section displays the communication system display bar by color coding so as to correspond to the types of the respective communication systems relating to the predetermined number of log information.

12. The performance measurement system for a communication terminal according to claim 6, characterized in that the trace information display bar display section displays the trace information display bar by color coding so as to correspond to the types of the planes of the predetermined message information on each of the predetermined number of log information.

13. The performance measurement system for a communication terminal according to claim 11, characterized in that the communication system display bar display section enables a color coding display based on color-coding configuration input information set by the configuration input information setting section at the time of displaying the communication system display bar by color coding so as to correspond to the types of the respective communication systems relating to the predetermined number of log information.

14. The performance measurement system for a communication terminal according to claim 12, characterized in that the trace information display bar display section enables a color coding display based on color-coding configuration input information set by the configuration input information setting section at the time of displaying the trace information display bar by color coding so as to correspond to the types of the planes of the predetermined message information on each of the predetermined number of log information.

15. The performance measurement system for a communication terminal according to claim 8, characterized in that
the trace information display bar display section
displays an arbitrary position on the trace information display bar including the types of the planes of the predetermined message information on each of the predetermined number of log information, the communication directions, and the configuration information showing the configuration information inside the communication terminal test measuring instrument for communication test so as to be selectable based on the selection configuration input information set by the configuration input information setting section, and
displays detailed information on log information corresponding to the arbitrary position on the trace information display bar selected based on selection configuration input information set by the configuration input information setting section.

16. The performance measurement system for a communication terminal according to claim 2, characterized in that the indication bar display section displays the plurality of log information included in the trace information acquired by the trace information acquisition section by color coding on the indication bar in each type in accordance with the types of the predetermined message information.

17. The performance measurement system for a communication terminal according to claim 9, characterized in that the log sequence display section further comprises an index information display section which displays index information showing respective orders in which a predetermined number of log information among the plurality of log information included in the trace information acquired by the trace information acquisition section have been acquired, so as to correspond to the trace information display bar displayed by the trace information display bar display section and the communication system display bar displayed by the communication system display bar display section.

18. The performance measurement system for a communication terminal according to claim 17, characterized in that
the indication bar display section comprises:
a first indication bar display section which displays a predetermined number of log information among the plurality of log information included in the trace information acquired by the trace information acquisition section, as a first indication bar on which the predetermined number of log information are arranged in a time series based on the clock time information provided to each of the predetermined number of log information so as to be identifiable by being sorted in accordance with the types of the predetermined message information based on the information on the contents and types of the log information; and a second indication bar display section which, when there are log information which cannot be displayed on the first indication bar displayed by the first indication bar display section, displays all of the plurality of log information included in the trace information acquired by the trace information acquisition section as a second indication bar on which all the information are arranged in a time series based on the clock time information provided to each of the plurality of log information in a state of being substantially compressed without being made to be identifiable by being sorted in accordance with the types of the predetermined message information based on the information on the contents and types of the log information so as to correspond to the first indication bar.

19. The performance measurement system for a communication terminal according to claim 18, characterized in that the indication bar display section displays an arbitrary position on the second indication bar displayed by the second indication bar display section so as to be selectable based on selection configuration input information set by the configuration input information setting section, and when an arbitrary position on the second indication bar is selected based on selection configuration input information set by the configuration input information setting section, displays log information in a predetermined range including log information at the arbitrary position so as to be enlarged on the first indication bar displayed by the first indication bar display section.

20. The performance measurement system for a communication terminal according to claim 2, characterized in that the indication bar display section comprises a plural-indication-bars display section which displays a predetermined number of log information among the plurality of log information included in the trace information acquired by the trace information acquisition section as a plurality of indication bars on which the predetermined number of log information are arranged in a time series based on the clock time information provided to each of the predetermined number of log information so as to be identifiable by being divided into a plurality of bars in correspondence to the types of the communication systems based on the information on the contents and types of the log information, and so as to be identifiable by being sorted in accordance with the types of the predetermined message information for each bar of the plurality of bars, based on configuration input information set by the configuration input information setting section.

21. The performance measurement system for a communication terminal according to claim 2, characterized in that the indication bar display section comprises a two-indication-bars display section which displays a predetermined number of log information among the plurality of log information included in the trace information acquired by the trace information acquisition section as two indication bars on which the predetermined number of log information are arranged in a time series based on the clock time information provided to each of the predetermined number of log information so as to be identifiable by being divided into two bars in up and down communication directions based on the information on the contents and types of the log information, and so as to be identifiable by being sorted in accordance with the types of the predetermined message information for each bar of the two bars, based on configuration input information set by the configuration input information setting section.

22. The performance measurement system for a communication terminal according to claim 2, characterized in that the indication bar display section comprises a plural-indication-bars display section which displays a predetermined number of log information among the plurality of log information included in the trace information acquired by the trace information acquisition section as a plurality of indication bars on which the predetermined number of log information are arranged in a time series based on the clock-time information provided to each of the predetermined number of log information so as to be identifiable by being divided into a plurality of bars in correspondence to the types of the communication systems based on the information on the contents and types of the log information, and so as to be identifiable by being divided into two bars in the up and down communication directions, and so as to be identifiable by being sorted in accordance with the types of the predetermined message information for each bar of the two bars, based on configuration input information set by the configuration input information setting section.

23. The performance measurement system for a communication terminal according to claim 18, characterized in that, when a search of arbitrary log information is selected based on configuration input information set by the configuration input information setting section, the indication bar display section instructs to search the arbitrary log information from log information corresponding to a display of the first indication bar, and displays a place on the first indication bar at which the log information found by the search has been positioned so as to be identifiable on the first indication bar.

24. The performance measurement system for a communication terminal according to claim 23, characterized in that the indication bar display section displays a corresponding place on the first indication bar at which the log information found by the search has been positioned so as to blink on and off.

25. The performance measurement system for a communication terminal according to claim 23, characterized in that, when a plurality of log information are found by the search, the log sequence display section displays a log sequence at a place at which first log information among the plurality of log information has been positioned, as the log sequence displayed so as to be associated with the indication bar.

26. The performance measurement system for a communication terminal according to claim 18, characterized in that when a search of arbitrary log information is selected based on a search condition due to configuration input information set by the configuration input information setting section, a search of the arbitrary log information is started from log information corresponding to a display of the second indication bar, and the indication bar display section displays a place at which the log information found by the search has been positioned so as to be identifiable on the second indication bar, and when a place displayed so as to be identifiable on the second indication bar is selected based on configuration input information set by the configuration input information setting section, the indication bar display section displays a corresponding place which conforms with the search condition so as to be identifiable on the first indication bar.

27. The performance measurement system for a communication terminal according to claim 26, characterized in that the indication bar display section displays a corresponding place on the second indication bar at which the log information found by the search has been positioned so as to blink on and off, and displays a corresponding place on the first indication bar at which the log information found by the search has been positioned so as to blink on and off.

28. The performance measurement system for a communication terminal according to claim 26, characterized in that, when a plurality of log information are found by the search, the log sequence display section displays a log sequence at a place at which the first log information among the plurality of log information has been positioned, as the log sequence displayed so as to be associated with the indication bar.

29. The performance measurement system for a communication terminal according to claim 18, characterized in that the indication bar display section allows trigger information serving as a condition for trace information intended for search to be internally set in advance based on configuration input information set by the configuration input information setting section, and displays a position at a corresponding place on the first indication bar so as to be identifiable when trace information which conforms with the trigger information set in advance is obtained from the trace information acquisition section.

30. The performance measurement system for a communication terminal according to claim 29, characterized in that the indication bar display section displays the position of the corresponding place on the first indication bar so as to blink on and off when trace information which conforms with the trigger information set in advance is obtained from the trace information acquisition section.

31. The performance measurement system for a communication terminal according to claim 29, characterized in that, when trace information which conforms with the trigger information set in advance is obtained from the trace information acquisition section, the log sequence display section displays a log sequence of log information included in the trace information as the log sequence displayed so as to be associated with the indication bar.

32. The performance measurement system for a communication terminal according to claim 1, characterized in that, when a plurality of log information included in the trace information acquired by the trace information acquisition section include log information in an off-line state, the log sequence display section displays a log sequence of the log information so as to omit records of the log information in an off-line state, as the log sequence displayed so as to be associated with the indication bar.

33. The performance measurement system for a communication terminal according to claim 3, characterized in that the task bar display section displays a task bar showing a range of the log sequence displayed at this point in time by the log sequence display section in the vicinity of the indication bar displayed by the indication bar display section based on selection configuration input information set by the configuration input information setting section.

34. The performance measurement system for a communication terminal according to claim 3, characterized in that the task bar display section displays a task bar showing a top of the log sequence displayed at this point in time by the log sequence display section with a point, in the vicinity of the indication bar displayed by the indication bar display section based on selection configuration input information set by the configuration input information setting section.

35. The performance measurement system for a communication terminal according to claim 18, characterized in that, when log information in which the types of the predetermined message information are the same, and the types of the communication systems are the same are continued in the plurality of log information included in the trace information acquired by the trace information acquisition section, the first indication bar display section displays the continuous log information so as to compress a length corresponding to one item of log information on the first indication bar.

36. The performance measurement system for a communication terminal according to claim 18, characterized in that, when the plurality of log information included in the trace information acquired by the trace information acquisition section include log information in an off-line state, the first indication bar display section displays entire log information on the first indication bar so as to include the records of the log information in an off-line state.

37. The performance measurement system for a communication terminal according to claim 18, characterized in that the second indication bar display section displays the second indication bar so as to be divided into a plurality of ranges at each range which can be displayed on the first indication bar displayed by the first indication bar display section.

38. The performance measurement system for a communication terminal according to claim 18, characterized in that the first indication bar display section displays the first indication bar so as to work with at least one of the time stamps and the index information displayed in the vicinity of the first indication bar, based on configuration input information set by the configuration input information setting section.

39. The performance measurement system for a communication terminal according to claim 18, characterized in that the second indication bar display section displays the second indication bar so as to work with at least one of the time stamps and the index information displayed in the vicinity of the second indication bar, based on configuration input information set by the configuration input information setting section.

40. The performance measurement system for a communication terminal according to claim 2, characterized in that the configuration input information setting section has a plurality of operation keys which are displayed on a display screen of the display and which are composed of soft keys, the plurality of operation keys including a Start key which is operated at the time of starting acquisition of the trace information, a Stop key which is operated at the time of stopping acquisition of the trace information, an Option key which is operated at the time of various settings, a Find key which is operated at the time of searching objective trace information from among the trace information, a Save key which is operated at the time of storing acquired trace information, and a Load key which is operated at the time of reading stored trace information.

41. A performance measurement method for a communication terminal, characterized by comprising:

a step of preparing a communication terminal test measuring instrument which possesses a series of procedures for predetermined performance measurement corresponding to types of communication systems in a state of connecting a communication terminal for being evaluated, the communication terminal test measuring instrument transmitting test signals including predetermined message information along the procedures to the communication terminal for being evaluated, and receiving a series of reply signals including the predetermined message information corresponding to the series of test signals for predetermined performance measurement from the communication terminal for being evaluated;

a step of acquiring trace information including a plurality of log information which have information on contents and types of log information based on the predetermined message information of each of the series of test signals transmitted by the communication terminal test measuring instrument and the series of reply signals received by the communication terminal test measuring instrument, and of providing clock time information showing clock times at which the respective predetermined message information have been acquired to the plurality of log information included in the trace information; and a step of displaying on a display trace information including the plurality of log information acquired by the step of acquiring trace information, wherein the step of displaying trace information comprises:

a step of displaying an indication bar on which the plurality of log information included in the trace information acquired by the step of acquiring trace information are arranged in a time series based on the clock time information provided to each of the plurality of log information so as to be identifiable by being sorted in accordance with the types of the predetermined message information based on the information on the contents and types of the log information; and a step of displaying flows of the series of test signals and the series of replay signals with respect to a predetermined number of log information from among the plurality of log information included in the trace information acquired by the step of acquiring the trace information so as to be associated with the indication bar, as log sequences having time stamps according to the clock time information provided to each of the predetermined number of log information based on the information on the contents and types of the log information.

42. The performance measurement method for a communication terminal according to claim 41, characterized by further comprising a step of setting predetermined configuration input information with respect to at least one of the step of acquiring trace information and the step of displaying trace information.

43. The performance measurement method for a communication terminal according to claim 42, characterized in that the step of displaying trace information further comprises a step of displaying a task bar by which an arbitrary position on the indication bar is selected based on selection configuration input information set by the step of setting configuration input information.

44. The performance measurement method for a communication terminal according to claim 41, characterized in that the step of acquiring trace information includes a step of storing in a storage section the trace information including the plurality of log information acquired by the step of acquiring trace information along with the clock time information provided to the plurality of log information by the step of acquiring trace information.

45. The performance measurement method for a communication terminal according to claim 41, characterized in that communication system information showing the types of the communication systems are included in each of the plurality of log information included in the trace information acquired by the step of acquiring trace information, and the step of displaying an indication bar displays the indication bar such that the types of the respective communication systems of the plurality of log information are made to be identifiable based on the communication system information.

46. The performance measurement method for a communication terminal according to claim 42, characterized in that the step of displaying a log sequence comprises at least a step of displaying a trace information display bar including at least one of types of planes of the predetermined message information and communication directions based on the information on the contents and types of the log information at least on a predetermined number of log information among the plurality of log information included in the trace information acquired by the step of acquiring trace information.

47. The performance measurement method for a communication terminal according to claim 46, characterized in that, the types of planes comprise at least one of a control plane showing various configuration information for test included in the series of test signals and the series of reply signals, and a user plane showing user data which are included in the series of test signals and the series of reply signals to be communicated.

48. The performance measurement method for a communication terminal according to claim 46, characterized in that configuration information showing configuration information inside the communication terminal test measuring instrument for communication test by the series of test signals and the series of reply signals are included in the trace information display bar displayed by the step of displaying a trace information display bar.

49. The performance measurement method for a communication terminal according to claim 46, characterized in that the step of displaying a log sequence further comprises:

a step of displaying a communication system display bar showing the types of the respective communication systems relating to a predetermined number of log information among the plurality of log information included in the trace information acquired by the step of acquiring trace information so as to correspond to the trace information display bar displayed by the step of displaying a trace information display bar based on the information on the contents and types of the log information; and a step of displaying time stamps according to the clock time information provided to each of the predetermined number of log information so as to correspond to the trace information display bar displayed by the step of displaying a trace information display bar and the communication system display bar displayed by the step of displaying a communication system display bar.

50. The performance measurement method for a communication terminal according to claim 49, characterized in that the step of displaying a communication system display bar displays the types of the communication systems to be displayed on the communication system display bar so as to be selectable based on selection configuration input information set by the step of setting-configuration input information.

51. The performance measurement method for a communication terminal according to claim 49, characterized in that the step of displaying a communication system display bar displays the communication system display bar by color coding so as to correspond to the types of the respective communication systems relating to the predetermined number of log information.

52. The performance measurement method for a communication terminal according to claim 46, characterized in that the step of displaying a trace information display bar displays the trace information display bar by color coding so as to correspond to the types of the planes of the predetermined message information on each of the predetermined number of log information.

53. The performance measurement method for a communication terminal according to claim 51, characterized in that the step of displaying a communication system display bar enables a color coding display based on color-coding configuration input information set by the step of setting configuration input information at the time of displaying the communication system display bar by color coding so as to correspond to the types of the respective communication systems relating to the predetermined number of log information.

54. The performance measurement method for a communication terminal according to claim 52, characterized in that the step of displaying a trace information display bar enables a color coding display based on color-coding configuration input information set by the step of setting configuration input information at the time of displaying the trace information display bar by color coding so as to correspond to the types of the planes of the predetermined message information on each of the predetermined number of log information.

55. The performance measurement method for a communication terminal according to claim 48, characterized in that
the step of displaying a trace information display bar comprises:
a step of displaying an arbitrary position on the trace information display bar including the types of the planes of the predetermined message information on each of the predetermined number of log information, the communication directions, and the configuration information showing configuration information inside the communication terminal test measuring instrument for communication test, so as to be selectable based on selection configuration input information set by the step of setting configuration input information; and
a step of displaying detailed information on log information corresponding to the arbitrary position on the trace information display bar selected based on selection configuration input information set by the step of setting configuration input information.

56. The performance measurement method for a communication terminal according to claim 42, characterized in that the step of displaying an indication bar displays the plurality of log information included in the trace information acquired by the step of acquiring trace information by color coding on the indication bar in each type in accordance with the types of the predetermined message information.

57. The performance measurement method for a communication terminal according to claim 49, characterized in that the step of displaying a log sequence further comprises a step of displaying index information showing respective orders in which a predetermined number of log information among the plurality of log information of log information included in the trace information acquired by the step of acquiring trace information have been acquired, so as to correspond to the trace information display bar displayed by the step of displaying a trace information display bar and the communication system display bar displayed by the step of a displaying communication system display bar.

58. The performance measurement method for a communication terminal according to claim 57, characterized in that the step of displaying an indication bar comprises:
a step of displaying a first indication bar on which a predetermined number of log information among the plurality of log information included in the trace information acquired by the step of acquiring trace information are arranged in a time series based on the clock time information provided to each of the predetermined number of log information so as to be identifiable by being sorted in accordance with the types of the predetermined message information based on the information on the contents and types of the log information; and
a step of, when there are log information which cannot be displayed on the first indication bar displayed by the step of displaying a first indication bar, displaying a second indication bar on which all of the plurality of log information included in the trace information acquired by the step of acquiring trace information are arranged in a time series based on the clock time information provided to each in a state of being substantially compressed without being made to be identifiable by being sorted in accordance with the types of the predetermined message information based on the information on the contents and types of the log information, so as to correspond to the first indication bar.

59. The performance measurement method for a communication terminal according to claim 58, characterized in that the step of displaying an indication bar comprises:
a step of displaying an arbitrary position on the second indication bar displayed by the step of displaying a second indication bar so as to be selectable based on selection configuration input information set by the step of setting configuration input information; and
a step of, when an arbitrary position on the second indication bar is selected based on selection configuration input information set by the step of setting configuration input information, displaying log information in a predetermined range including log information at the arbitrary position so as to be enlarged on the first indication bar displayed by the step of displaying a first indication bar.

60. The performance measurement method for a communication terminal according to claim 42, characterized in that the step of displaying an indication bar comprises a step of displaying a plurality of indication bars on which a predetermined number of log information among the plurality of log information included in the trace information acquired by the step of acquiring trace information are arranged in a time series based on the clock time information provided to each of the predetermined number of log information so as to be identifiable by being divided into a plurality of bars in correspondence to the types of the communication systems based on the information on the contents and types of the log information, and so as to be identifiable by being sorted in accordance with the types of the predetermined message information for each bar of the plurality of bars, based on configuration input information set by the step of setting configuration input information.

61. The performance measurement method for a communication terminal according to claim 42, characterized in that the step of displaying an indication bar comprises a step of two indication bars on which a predetermined number of log information among the plurality of log information included in the trace information acquired by the step of acquiring trace information are arranged in a time series based on the clock time information provided to each of the predetermined number of log information so as to be identifiable by being divided into two bars in up and down communication directions based on the information on the contents and types of the log information, and so as to be identifiable by being sorted in accordance with the types of the predetermined message information for each bar of the two bars, based on configuration input information set by the step of setting configuration input information.

62. The performance measurement method for a communication terminal according to claim 42, characterized in that the step of displaying an indication bar comprises a step of displaying a plurality of indication bars on which a predetermined number of log information among the plurality of log information included in the trace information acquired by the step of acquiring trace information are arranged in a time series based on the clock time information provided to each of the predetermined number of log information so as to be identifiable by being divided into a plurality of bars in correspondence to the types of the communication systems based on the information on the contents and types of the log information, and so as to be identifiable by being divided into two bars in up and down communication directions, and so as to be identifiable by being sorted in accordance with the types of the predetermined message information for each bar of the two bars, based on configuration input information set by the step of setting configuration input information.

63. The performance measurement method for a communication terminal according to claim 58, characterized in that, when a search of arbitrary log information is selected based on configuration input information set by the step of setting configuration input information, the step of displaying an indication bar instructs to search the arbitrary log information from log information corresponding to a display of the first indication bar, and displays a place on the first indication bar at which log information found by the search has been positioned so as to be identifiable on the first indication bar.

64. The performance measurement method for a communication terminal according to claim 63, characterized in that the step of displaying an indication bar displays a corresponding place on the first indication bar at which the log information found by the search has been positioned so as to blink on and off.

65. The performance measurement method for a communication terminal according to claim 63, characterized in that, when a plurality of log information are found by the search, the step of displaying a log sequence displays a log sequence at a place at which the first log-information among the plurality of log information has been positioned as the log sequence displayed so as to be associated with the indication bar.

66. The performance measurement method for a communication terminal according to claim 58, characterized in that the step of displaying an indication bar comprises:
a step of, when a search of arbitrary log information is selected based on a search condition due to configuration input information set by the step of setting configuration input information, starting a search of the arbitrary log information from the log information corresponding to a display of the second indication bar, and displaying a place at which the log information found by the search has been positioned so as to be identifiable on the second indication bar; and
a step of, when a place displayed so as to be identifiable on the second indication bar is selected based on the configuration input information set by the step of setting configuration input information, displaying a corresponding place which conforms with the search condition so as to be identifiable on the first indication bar.

67. The performance measurement method for a communication terminal according to claim 66, characterized in that the step of displaying an indication bar comprises:
a step of displaying a corresponding place on the second indication bar at which the log information found by the search has been positioned so as to blink on and off; and
a step of displaying a corresponding place on the first indication bar at which the log information found by the search has been positioned so as to blink on and off.

68. The performance measurement method for a communication terminal according to claim 66, characterized in that when a plurality of log information are found by the search, the step of displaying a log sequence displays a log sequence at a place at which the first log information among the plurality of log information has been positioned as the log sequence displayed so as to be associated with the indication bar.

69. The performance measurement method for a communication terminal according to claim 58, characterized in that the step of displaying an indication bar comprises:
a step of allowing trigger information serving as a condition of trace information intended for search to be internally set in advance based on configuration input information set by the step of setting configuration input information; and
a step of displaying a position of a corresponding place on the first indication bar so as to be identifiable when trace information which conforms with the trigger information set in advance is obtained from the trace information acquired by the step of acquiring trace information.

70. The performance measurement method for a communication terminal according to claim 69, characterized in that the step of displaying an indication bar displays the position of the corresponding place on the first indication bar so as to blink on and off when trace information which conforms with the trigger information set in advance is obtained from the trace information acquired by the step of acquiring trace information.

71. The performance measurement method for a communication terminal according to claim 69, characterized in that, when trace information which conforms with the trigger information set in advance is obtained from the trace information acquired by the step of acquiring trace information, the step of displaying a log sequence displays a log sequence of log information included in the trace information as the log sequence displayed so as to be associated with the indication bar.

72. The performance measurement method for a communication terminal according to claim 41, characterized in that, when a plurality of log information included in the trace information acquired by the step of acquiring trace information include log information in an off-line state, the step of displaying a log sequence displays a log sequence of the log information so as to omit records of the log information in an off-line state as the log sequence displayed so as to be associated with the indication bar.

73. The performance measurement method for a communication terminal according to claim 43, characterized in that the step of displaying a task bar displays a task bar showing a range of the log sequence displayed at this point in time by the step of displaying a log sequence, in the vicinity of the indication bar displayed by the step of displaying an indication bar, based on selection configuration input information set by the step of setting configuration input information.

74. The performance measurement method for a communication terminal according to claim 43, characterized in that the step of displaying a task bar displays a task bar showing a top of the log sequence displayed at this point in time by the step of displaying a log sequence with a point, in the vicinity of the indication bar displayed by the step of displaying an indication bar, based on selection configuration input information set by the step of setting configuration input information.

75. The performance measurement method for a communication terminal according to claim 58, characterized in that, when log information in which the types of the predetermined message information are the same, and the types of the communication systems are the same are continued in the plurality of log information included in the trace information acquired by the step of acquiring trace information, the step of displaying a first indication bar displays the continuous log information so as to compress a length corresponding to one item of log information on the first indication bar.

76. The performance measurement method for a communication terminal according to claim 58, characterized in that, when the plurality of log information included in the trace information acquired by the step of acquiring trace information include log information in an off-line state, the step of displaying a first indication bar displays entire log information on the first indication bar so as to include the records of the log information in an off-line state.

77. The performance measurement method for a communication terminal according to claim 58, characterized in that the step of displaying a second indication bar displays the second indication bar so as to be divided into a plurality of ranges at each range which can be displayed on the first indication bar displayed by the step of displaying a first indication bar.

78. The performance measurement method for a communication terminal according to claim 58, characterized in that the step of displaying a first indication bar displays the first indication bar so as to work with at least one of the time stamps and the index information displayed in the vicinity of the first indication bar based on configuration input information set by the step of setting configuration input information.

79. The performance measurement method for a communication terminal according to claim 58, characterized in that the step of displaying a second indication bar displays the second indication bar so as to work with at least one of the time stamps and the index information displayed in the vicinity of the second indication bar based on configuration input information set by the step of setting configuration input information.

80. The performance measurement method for a communication terminal according to claim 58, characterized in that the step of setting configuration input information uses at least one of a plurality of operation keys which are displayed on a display screen of the display and which are composed of soft keys, the plurality of operation keys including a Start key which is operated at the time of starting acquisition of the trace information, a Stop key which is operated at the time of stopping acquisition of the trace information, an Option key which is operated at the time of various settings, a Find key which is operated at the time of searching objective trace information from among the trace information, a Save key which is operated at the time of storing acquired trace information, and a Load key which is operated at the time of reading stored trace information.

\* \* \* \* \*